US011947529B2

(12) United States Patent
Gasper et al.

(10) Patent No.: US 11,947,529 B2
(45) Date of Patent: *Apr. 2, 2024

(54) GENERATING AND ANALYZING A DATA MODEL TO IDENTIFY RELEVANT DATA CATALOG DATA DERIVED FROM GRAPH-BASED DATA ARRANGEMENTS TO PERFORM AN ACTION

(71) Applicant: data.world, Inc., Austin, TX (US)

(72) Inventors: Tim Gasper, Austin, TX (US); Juan Sequeda, Austin, TX (US); Lydia Guarino, Austin, TX (US); Sharon Brener, Austin, TX (US); Jessica Lin, Austin, TX (US)

(73) Assignee: data.world, Inc., Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/707,896

(22) Filed: Mar. 29, 2022

(65) Prior Publication Data

US 2022/0327119 A1 Oct. 13, 2022

Related U.S. Application Data

(63) Continuation-in-part of application No. 17/333,914, filed on May 28, 2021, which is a continuation of
(Continued)

(51) Int. Cl.
*G06F 16/242* (2019.01)
*G06F 16/248* (2019.01)
(Continued)

(52) U.S. Cl.
CPC ........ *G06F 16/2428* (2019.01); *G06F 16/248* (2019.01); *G06F 16/258* (2019.01); *G06F 16/9024* (2019.01); *G06F 21/6218* (2013.01)

(58) Field of Classification Search
None
See application file for complete search history.

(56) References Cited

U.S. PATENT DOCUMENTS

| 4,755,809 A | * | 7/1988 | Ikegami | ........... G09G 5/14 715/785 |
| 4,835,735 A | * | 5/1989 | Ikegami | ........... G06F 16/2428 715/804 |

(Continued)

FOREIGN PATENT DOCUMENTS

| AU | 2012289936 A1 | 2/2014 |
| CA | 2820994 A1 | 1/2014 |

(Continued)

OTHER PUBLICATIONS

"Data.World Comes Out Of Stealth To Make Open Data Easier." Americaninno.com, AustinInno, Jul. 11, 2016, Retrieved from the Internet; URL: www.americaninno.com/austin/open-data-tech-brett-hurts-startup-data-world-launches/ [retrieved Jan. 27, 2020].

(Continued)

*Primary Examiner* — Kim T Nguyen
(74) *Attorney, Agent, or Firm* — KOKKA & BACKUS, PC

(57) ABSTRACT

Various embodiments relate generally to data science and data analysis, computer software and systems, and data-driven control systems and algorithms based on graph-based data arrangements, and, more specifically, to a computing platform configured to receive and analyze datasets to implement a data model with which to identify relevant data catalog data derived from graph-based data arrangements, whereby a processor may be configured to cause implementation of subsets of programmatic executable instructions based on relevant data catalog data, at least one example of which generates a concept interface portion adapted to an associated concept, among other things. In some examples, (Continued)

a method may include identifying attributes associated with data values linked to a conceptual entity, determining criteria data of a targeted application, selecting programmatic executable instructions based on the criteria data, and extracting data from a graph data arrangement as a function of the attributes, among other things.

20 Claims, 30 Drawing Sheets

Related U.S. Application Data application No. 15/985,702, filed on May 22, 2018, now Pat. No. 11,068,475.

(51) Int. Cl.
  *G06F 16/25* (2019.01)
  *G06F 16/901* (2019.01)
  *G06F 21/62* (2013.01)

(56) References Cited

U.S. PATENT DOCUMENTS

| | | |
|---|---|---|
| 5,845,285 A | 12/1998 | Klein |
| 6,144,962 A | 11/2000 | Weinberg et al. |
| 6,317,752 B1 | 11/2001 | Lee et al. |
| 6,529,909 B1 | 3/2003 | Bowman-Amuah |
| 6,768,986 B2 | 7/2004 | Cras et al. |
| 6,961,728 B2 | 11/2005 | Wynblatt et al. |
| 7,080,090 B2 | 7/2006 | Shah et al. |
| 7,143,046 B2 | 11/2006 | Babu et al. |
| 7,146,375 B2 | 12/2006 | Egilsson et al. |
| 7,680,862 B2 | 3/2010 | Chong et al. |
| 7,702,639 B2 | 4/2010 | Stanley et al. |
| 7,761,407 B1 | 7/2010 | Stern |
| 7,818,352 B2 | 10/2010 | Krishnamoorthy et al. |
| 7,836,063 B2 | 11/2010 | Salazar et al. |
| 7,853,081 B2 | 12/2010 | Thint |
| 7,856,416 B2 | 12/2010 | Hoffman et al. |
| 7,877,350 B2 | 1/2011 | Stanfill et al. |
| 7,953,695 B2 | 5/2011 | Roller et al. |
| 7,974,966 B2 * | 7/2011 | Robie .................. G06F 9/542 707/802 |
| 7,987,179 B2 | 7/2011 | Ma et al. |
| 8,037,108 B1 | 10/2011 | Chang |
| 8,060,472 B2 | 11/2011 | Itai et al. |
| 8,099,382 B2 | 1/2012 | Liu et al. |
| 8,170,981 B1 | 5/2012 | Tewksbary |
| 8,275,784 B2 | 9/2012 | Cao et al. |
| 8,296,200 B2 | 10/2012 | Mangipudi et al. |
| 8,312,389 B2 | 11/2012 | Crawford et al. |
| 8,429,179 B1 | 4/2013 | Mirhaji |
| 8,521,565 B2 | 8/2013 | Faulkner et al. |
| 8,538,985 B2 | 9/2013 | Betawadkar-Norwood et al. |
| 8,583,631 B1 | 11/2013 | Ganapathi et al. |
| 8,616,443 B2 | 12/2013 | Butt et al. |
| 8,640,056 B2 | 1/2014 | Helfman et al. |
| 8,719,252 B2 | 5/2014 | Miranker et al. |
| 8,762,160 B2 | 6/2014 | Lulla |
| 8,799,240 B2 | 8/2014 | Stowe et al. |
| 8,831,070 B2 | 9/2014 | Huang et al. |
| 8,843,502 B2 | 9/2014 | Elson et al. |
| 8,856,643 B2 | 10/2014 | Drieschner |
| 8,892,513 B2 | 11/2014 | Forsythe |
| 8,935,272 B2 | 1/2015 | Ganti et al. |
| 8,943,313 B2 | 1/2015 | Glew et al. |
| 8,965,915 B2 | 2/2015 | Ganti et al. |
| 8,990,236 B2 | 3/2015 | Mizrahy et al. |
| 8,996,559 B2 | 3/2015 | Ganti et al. |
| 8,996,978 B2 | 3/2015 | Richstein et al. |
| 9,002,860 B1 | 4/2015 | Ghemawat |
| 9,171,077 B2 | 10/2015 | Balmin et al. |
| 9,218,365 B2 | 12/2015 | Irani et al. |
| 9,244,952 B2 | 1/2016 | Ganti et al. |
| 9,268,820 B2 | 2/2016 | Henry |
| 9,268,950 B2 | 2/2016 | Gkoulalas-Divanis et al. |
| 9,335,885 B1 * | 5/2016 | Brocato ................ G06F 3/0489 |
| 9,396,283 B2 | 7/2016 | Miranker et al. |
| 9,454,611 B2 | 9/2016 | Henry |
| 9,495,429 B2 | 11/2016 | Miranker |
| 9,560,026 B1 | 1/2017 | Worsley |
| 9,607,042 B2 | 3/2017 | Long |
| 9,613,152 B2 | 4/2017 | Kucera |
| 9,659,081 B1 | 5/2017 | Ghodsi et al. |
| 9,690,792 B2 | 6/2017 | Bartlett et al. |
| 9,696,981 B2 | 7/2017 | Martin et al. |
| 9,710,526 B2 | 7/2017 | Couris et al. |
| 9,710,568 B2 | 7/2017 | Srinivasan et al. |
| 9,720,958 B2 | 8/2017 | Bagehorn et al. |
| 9,760,602 B1 | 9/2017 | Ghodsi et al. |
| 9,769,032 B1 | 9/2017 | Ghodsi et al. |
| 9,798,737 B2 | 10/2017 | Palmer |
| 9,836,302 B2 | 12/2017 | Hunter et al. |
| 9,959,337 B2 | 5/2018 | Ghodsi et al. |
| 9,990,230 B1 | 6/2018 | Stoica et al. |
| 10,095,735 B2 | 10/2018 | Ghodsi et al. |
| 10,102,258 B2 | 10/2018 | Jacob et al. |
| 10,176,234 B2 | 1/2019 | Gould et al. |
| 10,216,860 B2 | 2/2019 | Miranker et al. |
| 10,248,297 B2 | 4/2019 | Beechuk et al. |
| 10,296,329 B2 | 5/2019 | Hunter et al. |
| 10,318,567 B2 | 6/2019 | Henry |
| 10,324,925 B2 | 6/2019 | Jacob et al. |
| 10,346,429 B2 | 7/2019 | Jacob et al. |
| 10,353,911 B2 | 7/2019 | Reynolds et al. |
| 10,361,928 B2 | 7/2019 | Ghodsi et al. |
| 10,438,013 B2 | 10/2019 | Jacob et al. |
| 10,452,677 B2 | 10/2019 | Jacob et al. |
| 10,452,975 B2 | 10/2019 | Jacob et al. |
| 10,474,501 B2 | 11/2019 | Ghodsi et al. |
| 10,474,736 B1 | 11/2019 | Stoica et al. |
| 10,545,986 B2 | 1/2020 | Tappan et al. |
| 10,546,001 B1 | 1/2020 | Nguyen et al. |
| D876,454 S | 2/2020 | Knowles et al. |
| 10,558,664 B2 | 2/2020 | Armbrust et al. |
| D877,167 S | 3/2020 | Knowles et al. |
| D879,112 S | 3/2020 | Hejazi et al. |
| 10,606,675 B1 | 3/2020 | Luszczak et al. |
| 10,645,548 B2 | 5/2020 | Reynolds et al. |
| 10,664,509 B1 | 5/2020 | Reeves et al. |
| 10,673,887 B2 | 6/2020 | Crabtree et al. |
| 10,678,536 B2 | 6/2020 | Hunter et al. |
| 10,691,299 B2 | 6/2020 | Broek et al. |
| 10,691,433 B2 | 6/2020 | Shankar et al. |
| 10,713,314 B2 | 7/2020 | Yan et al. |
| 10,769,130 B1 | 9/2020 | Armbrust et al. |
| 10,769,535 B2 | 9/2020 | Lindsley |
| 10,810,051 B1 | 10/2020 | Shankar et al. |
| 10,922,308 B2 | 2/2021 | Griffith |
| 10,984,008 B2 | 4/2021 | Jacob et al. |
| 11,042,556 B2 | 6/2021 | Griffith et al. |
| 11,042,560 B2 | 6/2021 | Griffith et al. |
| 11,068,453 B2 | 7/2021 | Griffith |
| 11,068,475 B2 | 7/2021 | Boutros et al. |
| 11,068,847 B2 | 7/2021 | Boutros et al. |
| 11,093,539 B2 | 8/2021 | Henry |
| 11,294,972 B2 | 4/2022 | George et al. |
| 11,327,991 B2 | 5/2022 | Reynolds et al. |
| 11,468,049 B2 | 10/2022 | Griffith et al. |
| 11,500,831 B2 | 11/2022 | Griffith et al. |
| 2002/0133476 A1 | 9/2002 | Reinhardt |
| 2002/0143755 A1 | 10/2002 | Wynblatt et al. |
| 2003/0093597 A1 | 5/2003 | Marshak et al. |
| 2003/0120681 A1 | 6/2003 | Baclawski |
| 2003/0208506 A1 | 11/2003 | Greenfield et al. |
| 2004/0064456 A1 | 4/2004 | Fong et al. |
| 2005/0004888 A1 | 1/2005 | McCrady et al. |
| 2005/0010550 A1 | 1/2005 | Potter et al. |
| 2005/0010566 A1 | 1/2005 | Cushing et al. |
| 2005/0234957 A1 | 10/2005 | Olson et al. |
| 2005/0246357 A1 | 11/2005 | Geary et al. |
| 2005/0278139 A1 | 12/2005 | Glaenzer et al. |

(56) References Cited

U.S. PATENT DOCUMENTS

| | | |
|---|---|---|
| 2006/0100995 A1 | 5/2006 | Albornoz et al. |
| 2006/0117057 A1 | 6/2006 | Legault et al. |
| 2006/0129605 A1 | 6/2006 | Doshi |
| 2006/0161545 A1 | 7/2006 | Pura |
| 2006/0168002 A1 | 7/2006 | Chesley |
| 2006/0218024 A1 | 9/2006 | Lulla |
| 2006/0235837 A1 | 10/2006 | Chong et al. |
| 2007/0027904 A1 | 2/2007 | Chow et al. |
| 2007/0055662 A1 | 3/2007 | Edelman et al. |
| 2007/0139227 A1 | 6/2007 | Speirs et al. |
| 2007/0179760 A1 | 8/2007 | Smith |
| 2007/0203933 A1 | 8/2007 | Iversen et al. |
| 2007/0271604 A1 | 11/2007 | Webster et al. |
| 2007/0276875 A1 | 11/2007 | Brunswig et al. |
| 2008/0046427 A1 | 2/2008 | Lee et al. |
| 2008/0091634 A1 | 4/2008 | Seeman |
| 2008/0140609 A1 | 6/2008 | Werner et al. |
| 2008/0162550 A1 | 7/2008 | Fey |
| 2008/0162999 A1 | 7/2008 | Schlueter et al. |
| 2008/0216060 A1 | 9/2008 | Vargas |
| 2008/0240566 A1 | 10/2008 | Thint |
| 2008/0256026 A1 | 10/2008 | Hays |
| 2008/0294996 A1 | 11/2008 | Hunt et al. |
| 2008/0319829 A1 | 12/2008 | Hunt et al. |
| 2009/0006156 A1 | 1/2009 | Hunt et al. |
| 2009/0013281 A1 | 1/2009 | Helfman et al. |
| 2009/0018996 A1 | 1/2009 | Hunt et al. |
| 2009/0064053 A1 | 3/2009 | Crawford et al. |
| 2009/0094416 A1 | 4/2009 | Baeza-Yates et al. |
| 2009/0106734 A1 | 4/2009 | Riesen et al. |
| 2009/0119254 A1 | 5/2009 | Cross et al. |
| 2009/0132474 A1 | 5/2009 | Ma et al. |
| 2009/0132503 A1 | 5/2009 | Sun et al. |
| 2009/0138437 A1 | 5/2009 | Krishnamoorthy et al. |
| 2009/0150313 A1 | 6/2009 | Heilper et al. |
| 2009/0157630 A1 | 6/2009 | Yuan |
| 2009/0182710 A1 | 7/2009 | Short et al. |
| 2009/0198693 A1 | 8/2009 | Pura |
| 2009/0234799 A1 | 9/2009 | Betawadkar-Norwood et al. |
| 2009/0248714 A1 | 10/2009 | Liu |
| 2009/0300054 A1 | 12/2009 | Fisher et al. |
| 2010/0114885 A1 | 5/2010 | Bowers et al. |
| 2010/0138388 A1 | 6/2010 | Wakeling et al. |
| 2010/0223266 A1 | 9/2010 | Balmin et al. |
| 2010/0235384 A1 | 9/2010 | Itai et al. |
| 2010/0241644 A1 | 9/2010 | Jackson et al. |
| 2010/0250576 A1 | 9/2010 | Bowers et al. |
| 2010/0250577 A1 | 9/2010 | Cao et al. |
| 2010/0268722 A1 | 10/2010 | Yalamanchi et al. |
| 2010/0332453 A1 | 12/2010 | Prahlad et al. |
| 2011/0153047 A1 | 6/2011 | Cameron et al. |
| 2011/0202560 A1 | 8/2011 | Bowers et al. |
| 2011/0283231 A1 | 11/2011 | Richstein et al. |
| 2011/0298804 A1 | 12/2011 | Hao et al. |
| 2012/0016895 A1 | 1/2012 | Butt et al. |
| 2012/0036162 A1 | 2/2012 | Gimbel |
| 2012/0102022 A1 | 4/2012 | Miranker et al. |
| 2012/0154633 A1 | 6/2012 | Rodriguez |
| 2012/0179644 A1 | 7/2012 | Miranker |
| 2012/0190386 A1 | 7/2012 | Anderson |
| 2012/0254192 A1 | 10/2012 | Gelbard |
| 2012/0278902 A1 | 11/2012 | Martin et al. |
| 2012/0284301 A1 | 11/2012 | Mizrahy et al. |
| 2012/0310674 A1 | 12/2012 | Faulkner et al. |
| 2012/0323887 A1* | 12/2012 | Marum ............... G06F 16/248 707/E17.016 |
| 2012/0323889 A1* | 12/2012 | Marum ............... G06F 16/248 707/E17.014 |
| 2012/0330908 A1 | 12/2012 | Stowe et al. |
| 2012/0330979 A1 | 12/2012 | Elson et al. |
| 2013/0031208 A1 | 1/2013 | Linton et al. |
| 2013/0031364 A1 | 1/2013 | Glew et al. |
| 2013/0041893 A1 | 2/2013 | Strike |
| 2013/0054517 A1 | 2/2013 | Beechuk et al. |
| 2013/0110775 A1 | 5/2013 | Forsythe |
| 2013/0110825 A1 | 5/2013 | Henry |
| 2013/0114645 A1 | 5/2013 | Huang et al. |
| 2013/0138681 A1 | 5/2013 | Abrams et al. |
| 2013/0156348 A1 | 6/2013 | Irani et al. |
| 2013/0238667 A1 | 9/2013 | Carvalho et al. |
| 2013/0262443 A1 | 10/2013 | Leida et al. |
| 2013/0263019 A1 | 10/2013 | Castellanos et al. |
| 2013/0318070 A1 | 11/2013 | Wu et al. |
| 2013/0321458 A1 | 12/2013 | Miserendino et al. |
| 2014/0006448 A1 | 1/2014 | McCall |
| 2014/0019426 A1 | 1/2014 | Palmer |
| 2014/0067762 A1 | 3/2014 | Carvalho |
| 2014/0113638 A1 | 4/2014 | Zhang et al. |
| 2014/0115013 A1 | 4/2014 | Anderson |
| 2014/0119611 A1 | 5/2014 | Prevrhal et al. |
| 2014/0164431 A1 | 6/2014 | Tolbert |
| 2014/0198097 A1 | 7/2014 | Evans |
| 2014/0214857 A1 | 7/2014 | Srinivasan et al. |
| 2014/0229869 A1 | 8/2014 | Chiantera et al. |
| 2014/0236933 A1 | 8/2014 | Schoenbach et al. |
| 2014/0244623 A1 | 8/2014 | King |
| 2014/0279640 A1 | 9/2014 | Moreno et al. |
| 2014/0279845 A1 | 9/2014 | Ganti et al. |
| 2014/0280067 A1 | 9/2014 | Ganti et al. |
| 2014/0280286 A1 | 9/2014 | Ganti et al. |
| 2014/0280287 A1 | 9/2014 | Ganti et al. |
| 2014/0337331 A1 | 11/2014 | Hassanzadeh et al. |
| 2014/0337436 A1 | 11/2014 | Hoagland et al. |
| 2014/0372434 A1 | 12/2014 | Smith et al. |
| 2015/0046547 A1 | 2/2015 | Vohra et al. |
| 2015/0052125 A1 | 2/2015 | Ellis et al. |
| 2015/0052134 A1 | 2/2015 | Bornea et al. |
| 2015/0066387 A1 | 3/2015 | Yamada et al. |
| 2015/0081666 A1 | 3/2015 | Long |
| 2015/0095391 A1 | 4/2015 | Gajjar et al. |
| 2015/0120643 A1 | 4/2015 | Dantressangle et al. |
| 2015/0142829 A1 | 5/2015 | Lee et al. |
| 2015/0143248 A1 | 5/2015 | Beechuk et al. |
| 2015/0149879 A1 | 5/2015 | Miller et al. |
| 2015/0186653 A1 | 7/2015 | Gkoulalas-Divanis et al. |
| 2015/0213109 A1 | 7/2015 | Kassko et al. |
| 2015/0234884 A1 | 8/2015 | Henriksen |
| 2015/0242867 A1 | 8/2015 | Prendergast et al. |
| 2015/0269223 A1 | 9/2015 | Miranker et al. |
| 2015/0277725 A1 | 10/2015 | Masterson et al. |
| 2015/0278273 A1 | 10/2015 | Wigington et al. |
| 2015/0278335 A1 | 10/2015 | Opitz et al. |
| 2015/0339572 A1 | 11/2015 | Achin et al. |
| 2015/0356144 A1 | 12/2015 | Chawla et al. |
| 2015/0372915 A1 | 12/2015 | Shen et al. |
| 2015/0379079 A1 | 12/2015 | Kota |
| 2016/0004820 A1 | 1/2016 | Moore |
| 2016/0012059 A1 | 1/2016 | Balmin et al. |
| 2016/0019091 A1 | 1/2016 | Leber et al. |
| 2016/0055184 A1 | 2/2016 | Fokoue-Nkoutche et al. |
| 2016/0055261 A1 | 2/2016 | Reinhardt et al. |
| 2016/0063017 A1 | 3/2016 | Bartlett et al. |
| 2016/0063271 A1 | 3/2016 | Bartlett et al. |
| 2016/0092090 A1 | 3/2016 | Stojanovic et al. |
| 2016/0092474 A1 | 3/2016 | Stojanovic et al. |
| 2016/0092475 A1 | 3/2016 | Stojanovic et al. |
| 2016/0092476 A1 | 3/2016 | Stojanovic et al. |
| 2016/0092527 A1 | 3/2016 | Kang et al. |
| 2016/0098418 A1 | 4/2016 | Dakshinamurthy et al. |
| 2016/0100009 A1 | 4/2016 | Zoldi et al. |
| 2016/0103908 A1 | 4/2016 | Fletcher et al. |
| 2016/0117358 A1 | 4/2016 | Schmid et al. |
| 2016/0117362 A1 | 4/2016 | Bagehorn et al. |
| 2016/0125057 A1 | 5/2016 | Gould et al. |
| 2016/0132572 A1 | 5/2016 | Chang et al. |
| 2016/0132608 A1 | 5/2016 | Rathod |
| 2016/0132787 A1 | 5/2016 | Drevo et al. |
| 2016/0147837 A1 | 5/2016 | Nguyen et al. |
| 2016/0162785 A1 | 6/2016 | Grobman |
| 2016/0171380 A1 | 6/2016 | Kennel et al. |
| 2016/0173338 A1 | 6/2016 | Wolting |
| 2016/0188789 A1 | 6/2016 | Kisiel et al. |
| 2016/0203196 A1 | 7/2016 | Schnall-Levin et al. |
| 2016/0210364 A1 | 7/2016 | Henry |

(56) References Cited

U.S. PATENT DOCUMENTS

| | | |
|---|---|---|
| 2016/0225271 A1 | 8/2016 | Robichaud et al. |
| 2016/0232457 A1 | 8/2016 | Gray et al. |
| 2016/0275204 A1 | 9/2016 | Miranker et al. |
| 2016/0283551 A1 | 9/2016 | Fokoue-Nkoutche et al. |
| 2016/0292206 A1 | 10/2016 | Velazquez et al. |
| 2016/0314143 A1 | 10/2016 | Hiroshige |
| 2016/0321316 A1 | 11/2016 | Pennefather et al. |
| 2016/0322082 A1 | 11/2016 | Davis et al. |
| 2016/0350414 A1 | 12/2016 | Henry |
| 2016/0352592 A1 | 12/2016 | Sasaki et al. |
| 2016/0358102 A1 | 12/2016 | Bowers et al. |
| 2016/0358103 A1 | 12/2016 | Bowers et al. |
| 2016/0371288 A1* | 12/2016 | Le Biannic ....... G06F 16/24578 |
| 2016/0371355 A1 | 12/2016 | Massari et al. |
| 2017/0017537 A1 | 1/2017 | Razin et al. |
| 2017/0032259 A1 | 2/2017 | Goranson et al. |
| 2017/0053130 A1 | 2/2017 | Hughes et al. |
| 2017/0075973 A1 | 3/2017 | Miranker |
| 2017/0132401 A1 | 5/2017 | Gopi et al. |
| 2017/0161323 A1 | 6/2017 | Simitsis et al. |
| 2017/0161341 A1 | 6/2017 | Hrabovsky et al. |
| 2017/0177729 A1 | 6/2017 | Duke et al. |
| 2017/0213004 A1 | 7/2017 | Fox et al. |
| 2017/0220615 A1 | 8/2017 | Bendig et al. |
| 2017/0220667 A1 | 8/2017 | Ghodsi et al. |
| 2017/0228405 A1 | 8/2017 | Ward et al. |
| 2017/0236060 A1 | 8/2017 | Ignatyev |
| 2017/0316070 A1 | 11/2017 | Krishnan et al. |
| 2017/0318020 A1 | 11/2017 | Kamath et al. |
| 2017/0357653 A1 | 12/2017 | Bicer et al. |
| 2017/0364538 A1 | 12/2017 | Jacob et al. |
| 2017/0364539 A1 | 12/2017 | Jacob et al. |
| 2017/0364553 A1 | 12/2017 | Jacob et al. |
| 2017/0364564 A1 | 12/2017 | Jacob et al. |
| 2017/0364568 A1 | 12/2017 | Reynolds et al. |
| 2017/0364569 A1 | 12/2017 | Jacob et al. |
| 2017/0364570 A1 | 12/2017 | Jacob et al. |
| 2017/0364694 A1 | 12/2017 | Jacob et al. |
| 2017/0364703 A1 | 12/2017 | Jacob et al. |
| 2017/0371881 A1 | 12/2017 | Reynolds et al. |
| 2017/0371926 A1 | 12/2017 | Shiran et al. |
| 2018/0025027 A1 | 1/2018 | Palmer |
| 2018/0025307 A1 | 1/2018 | Hui et al. |
| 2018/0031703 A1 | 2/2018 | Ngai et al. |
| 2018/0032327 A1 | 2/2018 | Adami et al. |
| 2018/0040077 A1 | 2/2018 | Smith et al. |
| 2018/0046668 A1 | 2/2018 | Ghodsi et al. |
| 2018/0048536 A1 | 2/2018 | Ghodsi et al. |
| 2018/0075115 A1 | 3/2018 | Murray et al. |
| 2018/0121194 A1 | 5/2018 | Hunter et al. |
| 2018/0210936 A1 | 7/2018 | Reynolds et al. |
| 2018/0262864 A1 | 9/2018 | Reynolds et al. |
| 2018/0300354 A1 | 10/2018 | Liang et al. |
| 2018/0300494 A1 | 10/2018 | Avidan et al. |
| 2018/0314556 A1 | 11/2018 | Ghodsi et al. |
| 2018/0314705 A1 | 11/2018 | Griffith et al. |
| 2018/0314732 A1 | 11/2018 | Armbrust et al. |
| 2018/0330111 A1 | 11/2018 | Käbisch et al. |
| 2019/0005104 A1 | 1/2019 | Prabhu et al. |
| 2019/0034491 A1 | 1/2019 | Griffith et al. |
| 2019/0042606 A1 | 2/2019 | Griffith et al. |
| 2019/0050445 A1 | 2/2019 | Griffith et al. |
| 2019/0050459 A1 | 2/2019 | Griffith et al. |
| 2019/0057107 A1 | 2/2019 | Bartlett et al. |
| 2019/0065567 A1 | 2/2019 | Griffith et al. |
| 2019/0065569 A1 | 2/2019 | Boutros et al. |
| 2019/0066052 A1 | 2/2019 | Boutros et al. |
| 2019/0079968 A1 | 3/2019 | Griffith et al. |
| 2019/0095472 A1 | 3/2019 | Griffith |
| 2019/0121807 A1 | 4/2019 | Boutros et al. |
| 2019/0138538 A1 | 5/2019 | Stojanovic et al. |
| 2019/0155852 A1 | 5/2019 | Miranker et al. |
| 2019/0258479 A1 | 8/2019 | Hunter et al. |
| 2019/0266155 A1 | 8/2019 | Jacob et al. |
| 2019/0272279 A1 | 9/2019 | Jacob et al. |
| 2019/0278793 A1 | 9/2019 | Henry |
| 2019/0286617 A1 | 9/2019 | Abu-Abed et al. |
| 2019/0295296 A1 | 9/2019 | Gove, Jr. |
| 2019/0317961 A1 | 10/2019 | Brener et al. |
| 2019/0332606 A1 | 10/2019 | Kee et al. |
| 2019/0347244 A1 | 11/2019 | Jacob et al. |
| 2019/0347258 A1 | 11/2019 | Jacob et al. |
| 2019/0347259 A1 | 11/2019 | Jacob et al. |
| 2019/0347268 A1 | 11/2019 | Griffith |
| 2019/0347347 A1 | 11/2019 | Griffith |
| 2019/0370230 A1 | 12/2019 | Jacob et al. |
| 2019/0370262 A1 | 12/2019 | Reynolds et al. |
| 2019/0370266 A1 | 12/2019 | Jacob et al. |
| 2019/0370481 A1 | 12/2019 | Jacob et al. |
| 2019/0384571 A1 | 12/2019 | Oberbreckling et al. |
| 2020/0073644 A1 | 3/2020 | Shankar et al. |
| 2020/0073865 A1 | 3/2020 | Jacob et al. |
| 2020/0074298 A1 | 3/2020 | Jacob et al. |
| 2020/0097504 A1 | 3/2020 | Sequeda et al. |
| 2020/0117665 A1 | 4/2020 | Jacob et al. |
| 2020/0117688 A1 | 4/2020 | Sequeda et al. |
| 2020/0175012 A1 | 6/2020 | Jacob et al. |
| 2020/0175013 A1 | 6/2020 | Jacob et al. |
| 2020/0201854 A1 | 6/2020 | Miller |
| 2020/0218723 A1 | 7/2020 | Jacob et al. |
| 2020/0241950 A1 | 7/2020 | Luszczak et al. |
| 2020/0252766 A1 | 8/2020 | Reynolds et al. |
| 2020/0252767 A1 | 8/2020 | Reynolds et al. |
| 2020/0257689 A1 | 8/2020 | Armbrust et al. |
| 2020/0301684 A1 | 9/2020 | Shankar et al. |
| 2020/0380009 A1 | 12/2020 | Reynolds et al. |
| 2020/0409768 A1 | 12/2020 | Shankar et al. |
| 2021/0011901 A1 | 1/2021 | Armbrust et al. |
| 2021/0019327 A1 | 1/2021 | Reynolds et al. |
| 2021/0042299 A1 | 2/2021 | Migliori |
| 2021/0081414 A1 | 3/2021 | Jacob et al. |
| 2021/0109629 A1 | 4/2021 | Reynolds et al. |
| 2021/0173848 A1 | 6/2021 | Jacob et al. |
| 2021/0224250 A1 | 7/2021 | Griffith |
| 2021/0224330 A1 | 7/2021 | Miranker et al. |
| 2021/0294465 A1 | 9/2021 | Reynolds et al. |
| 2021/0374134 A1 | 12/2021 | He et al. |
| 2021/0374171 A1 | 12/2021 | Henry |
| 2021/0374555 A1 | 12/2021 | Beguerisse-Díaz et al. |
| 2021/0390098 A1 | 12/2021 | Reynolds et al. |
| 2021/0390141 A1 | 12/2021 | Jacob et al. |
| 2021/0390507 A1 | 12/2021 | Reynolds et al. |
| 2021/0397589 A1 | 12/2021 | Griffith et al. |
| 2021/0397611 A1 | 12/2021 | Boutres et al. |
| 2021/0397626 A1 | 12/2021 | Griffith et al. |
| 2022/0229838 A1 | 7/2022 | Jacob et al. |
| 2022/0229847 A1 | 7/2022 | Jacob et al. |
| 2022/0261411 A1 | 8/2022 | Reynolds et al. |
| 2022/0277004 A1 | 9/2022 | Griffith et al. |
| 2022/0327119 A1* | 10/2022 | Gasper .................. G06F 16/906 |
| 2022/0337978 A1 | 10/2022 | Reynolds et al. |

FOREIGN PATENT DOCUMENTS

| | | |
|---|---|---|
| CN | 103425734 B | 6/2017 |
| EP | 2631817 A1 | 8/2013 |
| EP | 2631819 A1 | 8/2013 |
| EP | 2685394 A3 | 6/2017 |
| EP | 2740053 B1 | 6/2019 |
| GB | 2519779 A | 5/2015 |
| JP | 2013175181 A | 9/2013 |
| JP | 2013246828 A | 12/2013 |
| JP | 2014524124 A | 9/2014 |
| WO | 2012054860 A1 | 4/2012 |
| WO | 2013020084 A1 | 2/2013 |
| WO | 2017190153 A1 | 11/2017 |
| WO | 2017222927 A1 | 12/2017 |
| WO | 2018156551 A1 | 8/2018 |

(56) References Cited

FOREIGN PATENT DOCUMENTS

| WO | 2018164971 A1 | 9/2018 |
|---|---|---|
| WO | 2021252805 A1 | 12/2021 |

OTHER PUBLICATIONS

Alaoui et al., "SQL to SPARQL Mapping for RDF querying based on a new Efficient Schema Conversion Technique," International Journal of Engineering Research & Technology (IJERT); ISSN: 2278-0181; vol. 4 Issue 10, Oct. 1, 2015, Retrieved from internet: https://www.ijert.org/research/sql-to-sparql-mapping-for-rdf-querying-based-on-a-new-efficient-schema-conversion-technique-IJERTV4IS1-- 1-5.pdf. Retrieved on Oct. 6, 2020.

Angles, R., Gutierrez. C., "The Expressive Power of SPARQL," Proceedings of the 7th International Semantic Web Conference (ISWC2008). 2008.

Arenas, M., et al., "A Direct Mapping of Relational Data to RDF," W3C Recommendation, Sep. 27, 2012, Retrieved from the Internet; URL: https://www.w3.org/TR/rdb-direct-mapping/ [retrieved Mar. 7, 2019].

Beckett, D., Berners-Lee, T., "Turtle—Terse RDF Triple Language," W3C Team Submission, Jan. 14, 2008, Retrieved from the Internet URL: https://www.w3.org/TeamSubmission/2008/SUBM-turtle-20080114/ [retrieved Mar. 7, 2019].

Beckett, D., Broekstra, J., "SPARQL Query Results XML Format," W3C Recommendation, Jan. 15, 2008, Retrieved from the Internet URL: https://www.w3.org/TR/2008/REC-rdf-sparql/XMLres-20080115/ [retrieved Mar. 7, 2019].

Beckett, Dave, "RDF/XML Syntax Specification (Revised)," W3C Recommendation, Feb. 10, 2004, Retrieved from the Internet; URL: https://www.w3.org/TR/2004/REC-rdf-syntax-grammar-20040210/ [retrieved Mar. 7, 2019].

Berners-Lee, Tim, "Notation 3," 2006, Retrieved from the Internet; URL: https://www.w3.org/DesignIssues/Notation3 html [retrieved on Mar. 7, 2019].

Berners-Lee, Tim, "Linked Data," 2009, Retrieved from the Internet; URL: https://www.w3.org/DesignIssues/LinkedData.html [retrieved on Mar. 7, 2019].

Boutros et al., "Computerized Tools to Develop and Manage Data-Driven Projects Collaboratively Via a Networked Computing Platform and Collaborative Datasets," U.S. Appl. No. 15/985,702, filed May 22, 2018.

Boutros et al., "Computerized Tools to Facilitate Data Project Development Via Data Access Layering Logic in a Networked Computing Platform Including Collaborative Datasets," U.S. Appl. No. 15/985,704, filed May 22, 2018.

Boutros et al., "Dynamic Composite Data Dictionary to Facilitate Data Operations Via Computerized Tools Configured to Access Collaborative Datasets in a Networked Computing Platform," U.S. Appl. No. 15/985,705, filed May 22, 2018.

Boutros et al., "Graphical User Interface for a Display Screen or Portion Thereof," U.S. Appl. No. 29/648,465, filed May 22, 2018.

Boutros et al., "Graphical User Interface for a Display Screen or Portion Thereof," U.S. Appl. No. 29/648,466, filed May 22, 2018.

Boutros et al., "Graphical User Interface for a Display Screen or Portion Thereof," U.S. Appl. No. 29/648,467, filed May 22, 2018.

Brener et al., "Computerized Tools Configured to Determine Subsets of Graph Data Arrangements for Linking Relevant Data to Enrich Datasets Associated With a Data-Driven Collaborative Dataset Platform," U.S. Appl. No. 16/395,036, filed Apr. 25, 2019.

Brickley, D., Guha, R.V., "RDF Vocabulary Description Language 1.0: RDF Schema," W3C Recommendation, Feb. 10, 2004, Retrieved from the Internet; URL: https://www.w3.org/TR/2004/REC-rdf-schema-2004/0210/ [retrieved Mar. 7, 2019].

Buche et al., "Flexible SPARQL Querying of Web Data Tables Driven by an Ontology," FQAS 2009, LNAI 5822, Springer, 2009, pp. 345-357.

Bullock, Joshua, Final Office Action dated Jan. 22, 2019 for U.S. Appl. No. 15/439,908.

Bullock, Joshua, Final Office Action dated Jan. 22, 2019 for U.S. Appl. No. 15/439,911.

Bullock, Joshua, Final Office Action dated Oct. 30, 2018 for U.S. Appl. No. 15/186,517.

Bullock, Joshua, Non-Final Office Action dated Dec. 20, 2021 for U.S. Appl. No. 16/457,759.

Bullock, Joshua, Non-Final Office Action dated Dec. 7, 2021 for U.S. Appl. No. 16/457,750.

Bullock, Joshua, Non-Final Office Action dated Jul. 12, 2018 for U.S. Appl. No. 15/186,517.

Bullock, Joshua, Non-Final Office Action dated Jun. 28, 2018 for U.S. Appl. No. 15/439,908.

Bullock, Joshua, Non-Final Office Action dated Jun. 28, 2018 for U.S. Appl. No. 15/439,911.

Bullock, Joshua, Notice of Allowance and Fee(s) Due dated Dec. 22, 2021 for U.S. Appl. No. 16/395,049.

Bullock, Joshua, Notice of Allowance and Fee(s) Due dated Feb. 23, 2022 for U.S. Appl. No. 16/457,750.

Caiado, Antonio J., Non-Final Office Action dated Sep. 16, 2022 for U.S. Appl. No. 17/365,214.

Clark, K., Feigenbaum, L., Torres, E., "SPARQL Protocol for RDF," W3C Recommendation, Jan. 15, 2008, Retrieved from the Internet; URL: https://www.w3.org/TR/2008/REC-rdf-sparql-protocol-20080115/ [retrieved Mar. 7, 2019].

Copenheaver, Blaine R., Notification of Transmittal of the International Search Report and the Written Opinion of the International Searching Authority, or the Declaration dated Jul. 5, 2017 for International Patent Application No. PCT/US2017/030474.

Czajkowski, K., et al., "Grid Information Services for Distributed Resource Sharing," 10th IEEE International Symposium on High Performance Distributed Computing, pp. 181-184. IEEE Press, New York (2001).

Dean, M., Schreiber, G., "Owl Web Ontology Language Reference," W3C Recommendation, Feb. 10, 2004, Retrieved from the Internet; URL: https://www.w3.org/TR/2004/REC-owl-ref-20040210/ [retrieved Mar. 7, 2019].

Doung, Hien, Non-Final Office Action dated Dec. 9, 2020 for U.S. Appl. No. 16/899,544.

Duong, Hien Luongvan, Non-Final Office Action dated May 5, 2022 for U.S. Appl. No. 17/185,917.

Duong, Hien, Notice of Allowance and Fee(s) Due dated Oct. 27, 2022 for U.S. Appl. No. 17/185,917.

Dwivedi, Mahesh H., Non-Final Office Action dated Jan. 30, 2020 for U.S. Appl. No. 15/454,955.

Ellis, Matthew J., Non-Final Office Action dated Sep. 25, 2020 for U.S. Appl. No. 16/139,374.

European Patent Office, Extended European Search Report for European Patent Application No. 18757122.9 dated Oct. 15, 2020.

European Patent Office, Extended European Search Report for European Patent Application No. 18763855.6 dated Sep. 28, 2020.

Feigenbaum, L., et al., "Semantic Web in Action," Scientific American, pp. 90-97, Dec. 2007.

Fernandez, J., et al., "Lightweighting the Web of Data through Compact RDF/HDT," Lozano J.A., Moreno J.A. (eds) Advances in Artificial Intelligence. CAEPIA 2011. Lecture Notes in Computer Science, vol. 7023. Springer, Berlin, Hidelberg.

Foster, I., Kesselman, C., "The Grid: Blueprint for a New Computing Infrastructure," Morgan Kaufmann, San Francisco (1999).

Foster, I., Kesselman, C., Nick, J., Tuecke, S., "The Physiology of the Grid: An Open Grid Services Architecture for Distributed Systems Integration," Technical Report, Global Grid Forum (2002).

Ganti et al., U.S. Appl. No. 61/802,743, filed Mar. 18, 2013 and entitled, "Creating a Data Catalog by Mining Queries."

Ganti et al., U.S. Appl. No. 61/802,744, filed Mar. 18, 2013 and entitled, "Auto-Completion of Queries With Data Object Names and Data Profiles."

Garay, Peter, Examination Report No. 1 for Standard Patent Application for Australia Patent Application No. 2017282656 dated Jul. 21, 2021, Intellectual Property Office of Australia.

Garcia-Molina, H., Ullman, J., Widom, J., Database Systems: The Complete Book. Editorial Pearson Prentice Hall. Second Edition. Published Jan. 11, 2011. (Year: 2011).

(56) References Cited

OTHER PUBLICATIONS

Gawinecki, Maciej, "How schema mapping can help in data integration?—integrating the relational databases with ontologies," ITC School, Computer Science, XXIII Cycle DII, University of Modena and Reggio Emilia, Italy, 2008.
Gillin, Paul, "Neo4j Connector Integrates Graph Data With Business Intelligence Tools," SiliconANGLE, Published Mar. 24, 2020, Retrieved from https://siliconangle.com/2020/03/24/neo4j-connector-integrates-graph-data-business-intelligence-tools/ on Mar. 25, 2020.
Girma, Anteneh B., Final Office Action for U.S. Appl. No. 13/278,907, dated Apr. 18, 2013.
Girma, Anteneh B., Non-Final Office Action for U.S. Appl. No. 13/278,907, dated Jul. 25, 2012.
Grant, J., Beckett, D., "RDF Test Cases," W3C Recommendation, Feb. 10, 2004, Retrieved from the Internet; URL: https://www.w3.org/TR/2004/REC-rdf-testcases-20040210/ [retrieved Mar. 7, 2019].
Griffith et al., "Aggregation of Ancillary Data Associated With Source Data in a System of Networked Collaborative Datasets," U.S. Appl. No. 15/927,006, filed Mar. 20, 2018.
Griffith et al., "Data Ingestion to Generate Layered Dataset Interrelations to Form a System of Networked Collaborative Datasets," U.S. Appl. No. 15/926,999, filed Mar. 20, 2018.
Griffith et al., "Extended Computerized Query Language Syntax for Analyzing Multiple Tabular Data Arrangements in Data-Driven Collaborative Projects," U.S. Appl. No. 16/036,834, filed Jul. 16, 2018.
Griffith et al., "Layered Data Generation and Data Remediation to Facilitate Formation of Interrelated Data in a System of Networked Collaborative Datasets," U.S. Appl. No. 15/927,004, filed Mar. 20, 2018.
Griffith et al., "Link-Formative Auxiliary Queries Applied at Data Ingestion to Facilitate Data Operations in a System of Networked Collaborative Datasets," U.S. Appl. No. 15/943,633, filed Apr. 2, 2018.
Griffith et al., "Localized Link Formation to Perform Implicitly Federated Queries Using Extended Computerized Query Language Syntax," U.S. Appl. No. 16/036,836, filed Jul. 16, 2018.
Griffith et al., "Transmuting Data Associations Among Data Arrangements to Facilitate Data Operations in a System of Networked Collaborative Datasets," U.S. Appl. No. 15/943,629, filed Apr. 2, 2018.
Griffith, David Lee, "Determining a Degree of Similarity of a Subset of Tabular Data Arrangements to Subsets of Graph Data Arrangements at Ingestion Into a Data-Driven Collaborative Dataset Platform," U.S. Appl. No. 16/137,297, filed Sep. 20, 2018.
Griffith, David Lee, "Matching Subsets of Tabular Data Arrangements To Subsets of Graphical Data Arrangements at Ingestion Into Data Driven Collaborative Datasets," U.S. Appl. No. 16/137,292, filed Sep. 20, 2018.
Griffith, David Lee, "Predictive Determination of Constraint Data for Application With Linked Data in Graph-Based Datasets Associated With a Data-Driven Collaborative Dataset Platform," U.S. Appl. No. 16/139,374, filed Sep. 24, 2018.
Haveliwala et al., "Evaluating Strategies for Similarity Search on the Web," Proceedings of the 11th international conference on World Wide Web, May 7-11, 2002, Honolulu, Hawaii, USA (ACM), p. 432-442.
Hayes, Patrick, "RDF Semantics," W3C Recommendation, Feb. 10, 2004, Retrieved from the Internet; URL: https://www.w3.org/TR/2004/REC-rdf-mt-20040210/ [retrieved Mar. 7, 2019].
Heflin, J., "Owl Web Ontology Language Use Cases and Requirements," W3C Recommendation, Feb. 10, 2004, Retrieved from the Internet; URL: https://www.w3.org/TR/2004/REC-webnot-req-20040210 [retrieved Mar. 7, 2019].
Henry, Jerome William, U.S. Appl. No. 61/515,305, filed Aug. 4, 2011 entitled, "Apparatus and Method for Supplying Search Results With a Knowledge Card."
Hoang, Hau Hai, Final Office Action dated Jul. 30, 2019 for U.S. Appl. No. 15/186,515.
Hoang, Hau Hai, Final Office Action dated Nov. 26, 2018 for U.S. Appl. No. 15/186,515.
Hoang, Hau Hai, Non-Final Office Action dated Apr. 16, 2019 for U.S. Appl. No. 15/186,515.
Hoang, Hau Hai, Non-Final Office Action dated May 3, 2018 for U.S. Appl. No. 15/186,515.
Hoang, Hau Hai, Notice of Allowance and Fee(s) Due dated Aug. 19, 2021 for U.S. Appl. No. 16/697,132.
Htay, Lin Lin M., Non-Final Office Action dated Sep. 14, 2018 for U.S. Appl. No. 15/186,516.
Htay, Lin Lin M., Notice of Allowance and Fee(s) Due and Notice of Allowability for U.S. Appl. No. 15/186,516, dated Jan. 25, 2019.
Hu, Xiaoqin, Final Office Action dated Apr. 5, 2019 for U.S. Appl. No. 15/454,969.
Hu, Xiaoqin, Final Office Action dated Apr. 5, 2019 for U.S. Appl. No. 15/454,981.
Hu, Xiaoqin, Final Office Action dated Oct. 31, 2019 for U.S. Appl. No. 15/454,969.
Hu, Xiaoqin, Final Office Action dated Sep. 24, 2019 for U.S. Appl. No. 15/454,981.
Hu, Xiaoqin, Non-Final Office Action for U.S. Appl. No. 15/454,969 dated Dec. 7, 2018.
Hu, Xiaoqin, Non-Final Office Action for U.S. Appl. No. 15/454,981 dated Dec. 12, 2018.
Hu, Xiaoqin, Non-Final Office Action dated Aug. 1, 2019 for U.S. Appl. No. 15/454,981.
Hu, Xiaoqin, Non-Final Office Action dated Jul. 26, 2019 for U.S. Appl. No. 15/454,969.
Hu, Xiaoqin, Non-Final Office Action dated Jul. 30, 2021 for U.S. Appl. No. 16/732,261.
Hu, Xiaoqin, Non-Final Office Action dated Sep. 2, 2021 for U.S. Appl. No. 16/732,263.
J. Perez, M. Arenas, C. Gutierrez, "Semantics and Complexity of SPARQL," ACM Transactions on Database Systems (TODS), Vo. 34, No. 3, Article 16, Publication Date: Aug. 2009.
Jacob et al., "Collaborative Dataset Consolidation Via Distributed Computer Networks," U.S. Appl. No. 16/120,057, filed Aug. 31, 2018.
Jacob et al., "Collaborative Dataset Consolidation Via Distributed Computer Networks," U.S. Appl. No. 16/287,967, filed Feb. 27, 2019.
Jacob et al., "Dataset Analysis and Dataset Attribute Inferencing to Form Collaborative Datasets," U.S. Appl. No. 16/271,263, filed Feb. 8, 2019.
Joshi, Amit Krishna et al., "Alignment-based Querying of Linked Open Data," Lecture Notes in Computer Science, 7566, 807-824, 2012.
Kahn, Yasar et al., "SAFE: Policy Aware SPARQL Query Federation Over RDF Data Cubes," Proceedings of the 7th International Workshop on Semantic Web Applications and Tools for Life Sciences, Berlin, Germany, Dec. 9-11, 2014.
Khong, Alexander, Non-Final Office Action for U.S. Appl. No. 15/165,775, dated Jun. 14, 2018.
Kim, Harry C., Notification of Transmittal of the International Search Report and the Written Opinion of the International Searching Authority, or the Declaration, dated Sep. 28, 2021 for International Application No. PCT/US2021/036880.
Klyne, G., Carroll, J., "Resource Description Framework (RDF): Concepts and Abstract Syntax," W3C Recommendation, Feb. 10, 2004, Retrieved from the Internet; URL: https://www.w3.org/TR/2004/REC-rdf-concepts-20040210 [retrieved Mar. 7, 2019].
Konda et al., Magellan: Toward Building Entity Matching Management Systems over Data Science Stacks, Proceedings of the VLDB Endowment, vol. 9, No. 13, (2016), pp. 1581-1584; URL: http://cpcp.wisc.edu/images/resources/magellan-vldb16.pdf, Date retrieved: Aug. 30, 2021.
Konda, Pradap, Magellan: Toward Building Entity Matching Management Systems, Presentation dated Feb. 27, 2018.
Krishnan et al., U.S. Appl. No. 15/583,966, filed May 1, 2017 and titled "Automatic Generation of Structured Data from Semi-Structured Data."

(56) References Cited

OTHER PUBLICATIONS

Langedgger, Andreas, "XL Wrap—Spreadsheet-to-RDF Wrapper," 2009, Retrieved from the Internet URL: http://xlwrap.sourceforge.net [retrieved Mar. 7, 2019].
Lee, Mark B., Non-Final Office Action for U.S. Appl. No. 13/180,444 dated Jul. 2, 2012.
Lenz, H.J., Shoshani, A., "Summarizability in OLAP and Statistical Data Bases," Proceedings of the Ninth International Conference on Scientific and Statistical Database Management, 1997.
Manola, F., Miller, E., "RDF Primer," W3C Recommendation, Feb. 10, 2004, Retrieved from the Internet; URL: https://www.w3.org/TR/2004/REC-rdf-primer-20040210/ [retrieved Mar. 7, 2019].
Martin et al., U.S. Appl. No. 13/457,925, filed Apr. 27, 2012 and titled "Incremental Deployment of Computer Software Program Logic."
Martin et al., U.S. Appl. No. 61/479,621, filed Apr. 27, 2011 and titled "Incremental Deployment of Computer Software Program Logic."
May, P., Ehrlich, H.C., Steinke, T., "ZIB Structure Prediction Pipeline: Composing a Complex Biological Workflow through Web Services," In: Nagel, W.E., Walter, W.V., Lehner, W. (eds.) Euro-Par 2006. LNCS, vol. 4128, pp. 1148-1158. Springer, Heidelberg (2006).
McGuiness, D., Van Harmelen, F., "Owl Web Ontology Language Overview," W3C Recommendation, Feb. 10, 2004, Retrieved from the Internet; URL: https://www.w3.org/TR/2004/REC-owl-features-20040210/ [retrieved Mar. 7, 2019].
Mian, Muhammad U., Notice of Allowance and Fee(s) Due dated Jun. 6, 2022 for U.S. Appl. No. 17/246,359.
Mian, Umar, Non-Final Office Action dated Apr. 8, 2022 for U.S. Appl. No. 17/246,359.
Miranker, Daniel Paul, "Accessing Relational Databases as Resource Description Framework Databases," U.S. Appl. No. 61/406,021, filed Oct. 22, 2010.
Miranker, Daniel Paul, "Automatic Synthesis and Presentation of OLAP Cubes from Semantically Enriched Data Sources," U.S. Appl. No. 61/362,781, filed Jul. 9, 2010.
National Center for Biotechnology Information, Website, Retrieved from the Internet; URL: https://www.ncbi.nlm.nih.gov/ [retrieved Mar. 7, 2019].
Nguyen, Bao-Yen Thi, Restriction Requirement mailed Jun. 29, 2021 for Design U.S. Appl. No. 29/648,466.
Nguyen, Kim T., Non-Final Office Action dated Apr. 25, 2022 for U.S. Appl. No. 17/163,287.
Nguyen, Kim T., Non-Final Office Action dated Aug. 31, 2021 for U.S. Appl. No. 16/899,549.
Nguyen, Kim T., Non-Final Office Action dated Aug. 31, 2022 for U.S. Appl. No. 17/332,354.
Nguyen, Kim T., Non-Final Office Action dated Aug. 31, 2022 for U.S. Appl. No. 17/333,914.
Nguyen, Kim T., Non-Final Office Action dated Dec. 10, 2020 for U.S. Appl. No. 16/137,297.
Nguyen, Kim T., Non-Final Office Action dated Dec. 8, 2020 for U.S. Appl. No. 15/985,704.
Nguyen, Kim T., Non-Final Office Action dated Jun. 14, 2018 for U.S. Appl. No. 15/186,514.
Nguyen, Kim T., Non-Final Office Action dated Jun. 7, 2021 for U.S. Appl. No. 16/457,766.
Nguyen, Kim T., Non-Final Office Action dated Mar. 20, 2019 for U.S. Appl. No. 15/454,923.
Nguyen, Kim T., Non-Final Office Action dated May 11, 2021 for U.S. Appl. No. 16/395,036.
Nguyen, Kim T., Non-Final Office Action dated Nov. 24, 2020 for U.S. Appl. No. 16/036,834.
Nguyen, Kim T., Non-Final Office Action dated Nov. 24, 2020 for U.S. Appl. No. 16/036,836.
Nguyen, Kim T., Non-Final Office Action dated Nov. 27, 2020 for U.S. Appl. No. 15/985,705.
Nguyen, Kim T., Non-Final Office Action dated Oct. 14, 2020 for U.S. Appl. No. 15/943,629.
Nguyen, Kim T., Non-Final Office Action dated Oct. 14, 2020 for U.S. Appl. No. 15/943,633.
Nguyen, Kim T., Non-Final Office Action dated Oct. 27, 2020 for U.S. Appl. No. 15/985,702.
Nguyen, Kim T., Non-Final Office Action dated Oct. 5, 2020 for U.S. Appl. No. 15/927,004.
Nguyen, Kim T., Non-Final Office Action dated Oct. 5, 2020 for U.S. Appl. No. 15/927,006.
Nguyen, Kim T., Non-Final Office Action dated Sep. 21, 2020 for U.S. Appl. No. 15/926,999.
Nguyen, Kim T., Notice of Allowance and Fee(s) Due dated Nov. 21, 2022 for U.S. Appl. No. 17/332,354.
Nguyen, Kim T., Notice of Allowance and Fee(s) Due dated Apr. 14, 2022 for U.S. Appl. No. 17/037,005.
Nguyen, Kim T., Notice of Allowance and Fee(s) Due dated Aug. 17, 2021 for U.S. Appl. No. 16/428,915.
Nguyen, Kim T., Notice of Allowance and Fee(s) Due dated Sep. 28, 2022 for U.S. Appl. No. 17/163,287.
Nguyen, Kim T., Notice of Allowance and Fee(s) Due, dated May 15, 2019 for U.S. Appl. No. 15/454,923.
Niinimaki et al., "An ETL Process for OLAP Using RDF/OWL Ontologies," Journal on Data Semantics XIII, LNCS 5530, Springer, pp. 97-119, Aug. 12, 2009.
Noy et al., "Tracking Changes During Ontology Evolution." International Semantic Web Conference. Springer, Berlin, Heidelberg, 2004 (Year: 2004).
Pandit et al., "Using Ontology Design Patterns To Define SHACL Shapes," CEUR Workshop Proceedings, Proceedings of the 9th Workshop on Ontology Design and Patterns (WOP 2018), Monterey, USA, Oct. 9, 2018.
Parashar et al., U.S. Appl. No. 62/329,982, filed Apr. 29, 2016 and titled "Automatic Parsing of Semi-Structured Data and Identification of Missing Delimiters."
Patel-Schneider, P., Hayes, P., Horrocks, I., "Owl Web Ontology Language Semantics and Abstract Syntax," W3C Recommendation, Feb. 10, 2004, Retrieved from the Internet; URL: https://www.w3.org/TR/2004/REC-owl-semantics-20040210 [retrieved Mar. 7, 2019].
Perez, J., Arenas, M., Gutierrez, C., "Semantics and Complexity of SPARQL," In Proceedings of the International Semantic Web Conference (ISWC2006). 2006.
Prud'hommeaux, E., Seaborne, A., "SPARQL Query Language for RDF," W3C Recommendation, Jan. 15, 2008, Retrieved from the Internet; URL: https://www.w3.org/TR/2008/REC-rdf-sparql-query-20080115/ [retrieved Mar. 7, 2019].
Raab, Christopher J., Non-Final Office Action dated Jul. 24, 2020 for U.S. Appl. No. 16/271,687.
Raab, Christopher J., Non-Final Office Action dated Jun. 28, 2018 for U.S. Appl. No. 15/186,520.
Raab, Christopher J., Non-Final Office Action dated Oct. 16, 2020 for U.S. Appl. No. 16/287,967.
Raab, Christopher J., Notice of Allowance and Fee(s) Due and Notice of Allowability for U.S. Appl. No. 15/186,520, dated Jan. 2, 2019.
Rachapalli et al., "RETRO: A Framework for Semantics Preserving SQL-to-SPARQL Translation," The University of Texas at Dallas; Sep. 18, 2011, XP055737294, Retrieved from internet: http://iswc2011.semanticweb.org/fileadmin/iswc/Papers/Workshope/EvoDyn/evodyn_3.pdf. Retrieved on Oct. 6, 2020.
RDB2RDF Working Group Charter, Sep. 2009, Retrieved from the Internet; URL: https://www.w3.org/2009/08/rdb2rdf-charter [retrieved Mar. 7, 2019].
Reynolds et al., "Computerized Tool Implementation of Layered Data Files to Discover, Form, or Analyze Dataset Interrelations of Networked Collaborative Datasets," U.S. Appl. No. 15/454,981, filed Mar. 9, 2017.
Reynolds et al., "Computerized Tools to Discover, Form, and Analyze Dataset Interrelations Among a System of Networked Collaborative Datasets," International Patent Application No. PCT/US2018/020812 filed with the Receiving Office of the USPTO on Mar. 3, 2018.
Reynolds et al., "Interactive Interfaces to Present Data Arrangement Overviews and Summarized Dataset Attributes for Collaborative Datasets," U.S. Appl. No. 15/454,969, filed Mar. 9, 2017.

(56) References Cited

OTHER PUBLICATIONS

Sahoo, S., et al., "A Survey of Current Approaches for Mapping of Relational Databases to RDF," W3C RDB2RDF XG Report, Incubator Group, URL: http://www.w3.org/2005/Incubator/rdb2rdf/RDB2RDF_Survey_Report_01082009.pdf; Published Jan. 8, 2009.

Sequeda, J., Depena, R., Miranker. D., "Ultrawrap: Using SQL Views for RDB2RDF," Poster in the 8th International Semantic Web Conference (ISWC2009), Washington DC, US, 2009.

Sequeda, J., et al., "Direct Mapping SQL Databases to the Semantic Web," Technical Report 09-04. The University of Texas at Austin, Department of Computer Sciences. 2009.

Sequeda, J., et al., "Ultrawrap: SPARQL Execution on Relational Data," Technical Report. The University of Texas at Austin, Department of Computer Sciences. 2012.

Sequeda, J., Tirmizi, S., Miranker, D., "SQL Databases are a Moving Target," Position Paper for W3C Workshop on RDF Access to Relational Databases, Cambridge, MA, USA, 2007.

Skevakis, Giannis et al., Metadata management, interoperability and Linked Data publishing support for Natural History Museums, Int J Digit Libr (2014), published online: Apr. 11, 2014; Springer-Verlag Berlin Heidelberg.

Slawski, Bill, Google Knowledge Cards Improve Search Engine Experiences, SEO by the Sea, Published Mar. 18, 2015, URL: https://www.seobythesea.com/2015/03/googles-knowledge-cards/, Retrieved Sep. 15, 2021.

Smith, M., Welty, C., McGuiness, D., "Owl Web Ontology Language Guide," W3C Recommendation, Feb. 10, 2004, Retrieved from the Internet; URL: https://www.w3.org/TR/2004/REC-owl-guide-20040210/ [retrieved Mar. 7, 2019].

Smith, T.F., Waterman, M.S., "Identification of Common Molecular Subsequences," J. Mol. Biol. 147, 195-197 (1981).

Spieler, William, Advisory Action dated Nov. 22, 2021 for U.S. Appl. No. 16/435,196.

Spieler, William, Final Office Action dated Mar. 15, 2021 for U.S. Appl. No. 16/435,196.

Spieler, William, Non-Final Office Action dated Dec. 31, 2020 for U.S. Appl. No. 16/435,196.

Spieler, William, Non-Final Office Action dated Feb. 25, 2021 for U.S. Appl. No. 16/558,076.

Spieler, William, Non-Final Office Action dated Jul. 9, 2021 for U.S. Appl. No. 16/435,196.

Tirmizi, S., Sequeda, J., Miranker, D., "Translating SQL Applications to the Semantic Web," In Proceedings of the 19th International Databases and Expert Systems Application Conference (DEXA2008). Turin, Italy. 2008.

U.S. Appl. No. 16/251,408, filed Jan. 18, 2019.

Uddin, Md I, Non-Final Office Action dated May 13, 2021 for U.S. Appl. No. 16/404,113.

Uddin, Md I., Final Office Action dated Jan. 1, 2021 for U.S. Appl. No. 16/404,113.

Uddin, Md I., Non-Final Office Action dated Oct. 6, 2020 for U.S. Appl. No. 16/404,113.

Ultrawrap Mapper, U.S. Appl. No. 62/169,268, filed Jun. 1, 2015 (Expired).

Vu, Bai Duc, Notice of Allowance and Fee(s) Due dated Aug. 22, 2022 for U.S. Appl. No. 16/899,551.

Vy, Hung T., Final Office Action for U.S. Appl. No. 13/180,444 dated Dec. 3, 2014.

Vy, Hung T., Final Office Action for U.S. Appl. No. 13/180,444 dated Dec. 9, 2015.

Vy, Hung T., Final Office Action for U.S. Appl. No. 13/180,444 dated Feb. 22, 2013.

Vy, Hung T., Non-Final Office Action for U.S. Appl. No. 13/180,444 dated Jun. 18, 2015.

Vy, Hung T., Non-Final Office Action for U.S. Appl. No. 13/180,444 dated Mar. 26, 2014.

Yen, Syling, Final Office Action dated Apr. 10, 2019 for U.S. Appl. No. 15/186,519.

Yen, Syling, Final Office Action dated Oct. 25, 2019 for U.S. Appl. No. 15/186,519.

Yen, Syling, Non-Final Office Action dated Feb. 8, 2019 for U.S. Appl. No. 15/186,519.

Yen, Syling, Non-Final Office Action dated Sep. 12, 2019 for U.S. Appl. No. 15/186,519.

Yotova, Polina, European Patent Office Examination Report, Communication Pursuant to Article 94(3) EPC for European Patent Application No. 17815970.3 dated Oct. 5, 2021.

Yotova, Polina, Supplementary European Search Report and Examiner Search Opinion for European Patent Application No. 17815970.3, dated Feb. 21, 2020.

Young, Lee W., International Searching Authority, Notification of Transmittal of the International Search Report and the Written Opinion of the International Searching Authority, or the Declaration for International Patent Application No. PCT/US2017/037846, dated Nov. 9, 2017.

Young, Lee W., International Searching Authority, Notification of Transmittal of the International Search Report and the Written Opinion of the International Searching Authority, or the Declaration for International Patent Application No. PCT/US2018/020812, dated Aug. 8, 2018.

Young, Lee W., Invitation to Pay Additional Fees And, Where Applicable, Protest Fee, dated Jun. 14, 2018 for International Application No. PCT/US2018/020812.

Young, Lee W., Notification of Transmittal of the International Search Report and the Written Opinion of the International Searching Authority, or the Declaration dated May 29, 2018 for International Patent Application No. PCT/US2018/018906.

Young, Lee W., Notification of Transmittal of the International Search Report and the Written Opinion of the International Searching Authority, or the Declaration for International Application No. PCT/US2011/057334, dated Mar. 22, 2012.

Ganti et al., U.S. Appl. No. 14/058,184, filed Oct. 18, 2013 and entitled, "Assisted Query Formation, Validation, and Result Previewing in a Database Having a Complex Schema."

Ganti et al., U.S. Appl. No. 14/058,189, filed Oct. 18, 2013 and entitled, "Assisted Query Formation, Validation, and Result Previewing in a Database Having a Complex Schema."

Ganti et al., U.S. Appl. No. 14/058,206, filed Oct. 18, 2013 and entitled, "Curated Answers Community Automatically Populated Through User Query Monitoring."

Ganti et al., U.S. Appl. No. 14/058,208, filed Oct. 18, 2013 and entitled, "Editable and Searchable Markup Pages Automatically Populated Through User Query Monitoring."

Ganti et al., U.S. Appl. No. 61/802,716, filed Mar. 17, 2013 and entitled, "Data Profile Driven Query Builder."

Ganti et al., U.S. Appl. No. 61/802,742, filed Mar. 18, 2013 and entitled, "Developing a Social Data Catalog by Crowd-Sourcing."

Jacob et al., "Dataset Analysis and Dataset Attribute Inferencing to Form Collaborative Datasets," U.S. Appl. No. 16/292,120, filed Mar. 4, 2019.

Jacob et al., "Management of Collaborative Datasets Via Distributed Computer Networks," U.S. Appl. No. 16/271,687, filed Feb. 8, 2019.

Jacob et al., "Management of Collaborative Datasets Via Distributed Computer Networks," U.S. Appl. No. 16/292,135 filed Mar. 4, 2019.

Jacob et al., "Query Generation for Collaborative Datasets," U.S. Appl. No. 16/395,043, filed Apr. 25, 2019.

Jacob et al., "Query Generation for Collaborative Datasets," U.S. Appl. No. 16/395,049, filed Apr. 25, 2019.

Nguyen, Kim T., Notice of Allowance and Fee(s) Due dated Aug. 3, 2021 for U.S. Appl. No. 16/457,766.

Nguyen, Kim T., Notice of Allowance and Fee(s) Due dated Jul. 11, 2022 for U.S. Appl. No. 17/332,368.

Nguyen, Kim T., Notice of Allowance and Fee(s) Due dated Mar. 16, 2021 for U.S. Appl. No. 15/985,702.

Nguyen, Kim T., Notice of Allowance and Fee(s) Due dated Mar. 16, 2021 for U.S. Appl. No. 16/137,297.

Nguyen, Kim T., Notice of Allowance and Fee(s) Due dated Mar. 17, 2021 for U.S. Appl. No. 15/985,704.

Nguyen, Kim T., Notice of Allowance and Fee(s) Due dated Mar. 31, 2021 for U.S. Appl. No. 15/985,705.

(56) References Cited

OTHER PUBLICATIONS

Vy, Hung T., Non-Final Office Action for U.S. Appl. No. 15/273,930 dated Dec. 20, 2017.
Willis, Amanda Lynn, Final Office Action dated Apr. 18, 2022 for U.S. Appl. No. 16/899,547.
Willis, Amanda Lynn, Non-Final Office Action dated Feb. 8, 2022 for U.S. Appl. No. 16/899,547.
Willis, Amanda Lynn, Non-Final Office Action dated Sep. 8, 2022 for U.S. Appl. No. 16/899,547.
Woo, Isaac M., Non-Final Office Action dated Jul. 28, 2022 for U.S. Appl. No. 17/004,570.
Woo, Isaac M., Non-Final Office Action dated May 5, 2020 for U.S. Appl. No. 16/137,292.

* cited by examiner

Daily Orders

Metric in Accounting, Finance, Operations, Sales

Daily purchase transactions recognized towards revenue from a customer of one or more products, across all channels, markets, and geographies.

| Calculations | 3106 | ( Daily Shipped Orders - Daily Returned Orders ) * ( 1 - Average Loss ) |
|---|---|---|
| Critical Data | 3107 | Yes |
| PII | 3108 | No |

Related people 3120

- Sarah (steward) 3122
- Tim (top user) 3124
- Noah (top user)
- Bob (top user)

Related resources 3130

- Order 3132
- Fulfilled Order
- Order Shipping Details Dashboard 3134
- Shipped Order Dashboard

Recommended action 3140

Based on this dataset being related to this metric, approved, and used frequently in the last 90 days.

Customer Order History 3142
Dataset in DEMO Corp

Request access

FIG. 31

GENERATING AND ANALYZING A DATA MODEL TO IDENTIFY RELEVANT DATA CATALOG DATA DERIVED FROM GRAPH-BASED DATA ARRANGEMENTS TO PERFORM AN ACTION

CROSS-REFERENCE TO APPLICATIONS

This nonprovisional application is a continuation-in-part application of co-pending U.S. patent application Ser. No. 17/333,914, filed on May 22, 2018 and titled, "COMPUTERIZED TOOLS TO DEVELOP AND MANAGE DATA-DRIVEN PROJECTS COLLABORATIVELY VIA A NETWORKED COMPUTING PLATFORM AND COLLABORATIVE DATASETS," U.S. patent application Ser. No. 17/333,914 is continuation application of U.S. patent application Ser. No. 15/985,702, filed on May 22, 2018, now U.S. Pat. No. 11,068,475, and titled "COMPUTERIZED TOOLS TO DEVELOP AND MANAGE DATA-DRIVEN PROJECTS COLLABORATIVELY VIA A NETWORKED COMPUTING PLATFORM AND COLLABORATIVE DATASETS," all of which are herein incorporated by reference in their entirety for all purposes.

FIELD

Various embodiments relate generally to data science and data analysis, computer software and systems, and data-driven control systems and algorithms based on graph-based data arrangements, among other things, and, more specifically, to a computing platform configured to receive and analyze datasets to implement a data model with which to identify relevant data catalog data derived from graph-based data arrangements, whereby a processor may be configured to cause implementation of subsets of programmatic executable instructions based on relevant data catalog data to perform an action (e.g., autonomously, semi-autonomously, or manually), at least one example of which may be configured to generate a concept interface portion relevant to a concept of interest, among other things.

BACKGROUND

Advances in computing hardware and software have ignited exponential growth in the generation of vast amounts of data due to increased computations and analyses in numerous areas, such as in the various scientific and engineering disciplines. Also, advances in conventional data storage technologies provide an ability to store increasing amounts of generated data. Moreover, different computing platforms and systems, different database technologies, and different data formats give rise to "data silos" that inherently segregate and isolate datasets.

While conventional approaches are functional, various approaches are not well-suited to significantly overcome the difficulties of data silos. Organizations, including enterprises, continue strive to understand, manage, and productively use large amounts of enterprise data. For example, consumers of enterprise organizations have different levels of skill and experience in using analytic data tools. Data scientists typically create complex data models using sophisticated analysis application tools, whereas other individuals, such as executives, marketing personnel, product managers, etc., have varying levels of skill, roles, and responsibilities in an organization. The disparities in various analytic data tools, reporting tools, visualization tools, etc., continue to frustrate efforts to improve interoperability and usage of large amounts of data.

Also, various data management and analysis applications, such as query programming language applications and data analytic applications, may not be compatible for use in a distributed data architecture, such as a "cloud"-based computing platform. Hence, data practitioners generally may be required to intervene manually to apply derived formulaic data models to datasets, such as using local computing resources, which requires a burden to update and maintain data terms and definitions as well as storing relatively large amounts of data relying on a particular data format and database schema (e.g., relying on relational databases and relational table data formats).

Further, with the rise of cloud-based "data lakes," and other data sources and storage repositories with corresponding disparate data formats, conventional mechanisms to discover, as well as summarize, vast amounts of data for a specific implementation are suboptimal.

Thus, what is needed is a solution for facilitating techniques to optimize programmatic data operations applied to datasets, including, among other things, identifying relevant data in graph-based data arrangements, without the limitations of conventional techniques.

BRIEF DESCRIPTION OF THE DRAWINGS

Various embodiments or examples ("examples") of the invention are disclosed in the following detailed description and the accompanying drawings:

FIGS. 22A to 22C depict data fields with which to access and modify attributes of a resource, according to some examples;

FIG. 23 is a diagram depicting attributes relating to a dataset described in FIGS. 22A to 22C, according to some examples;

Figure 27:
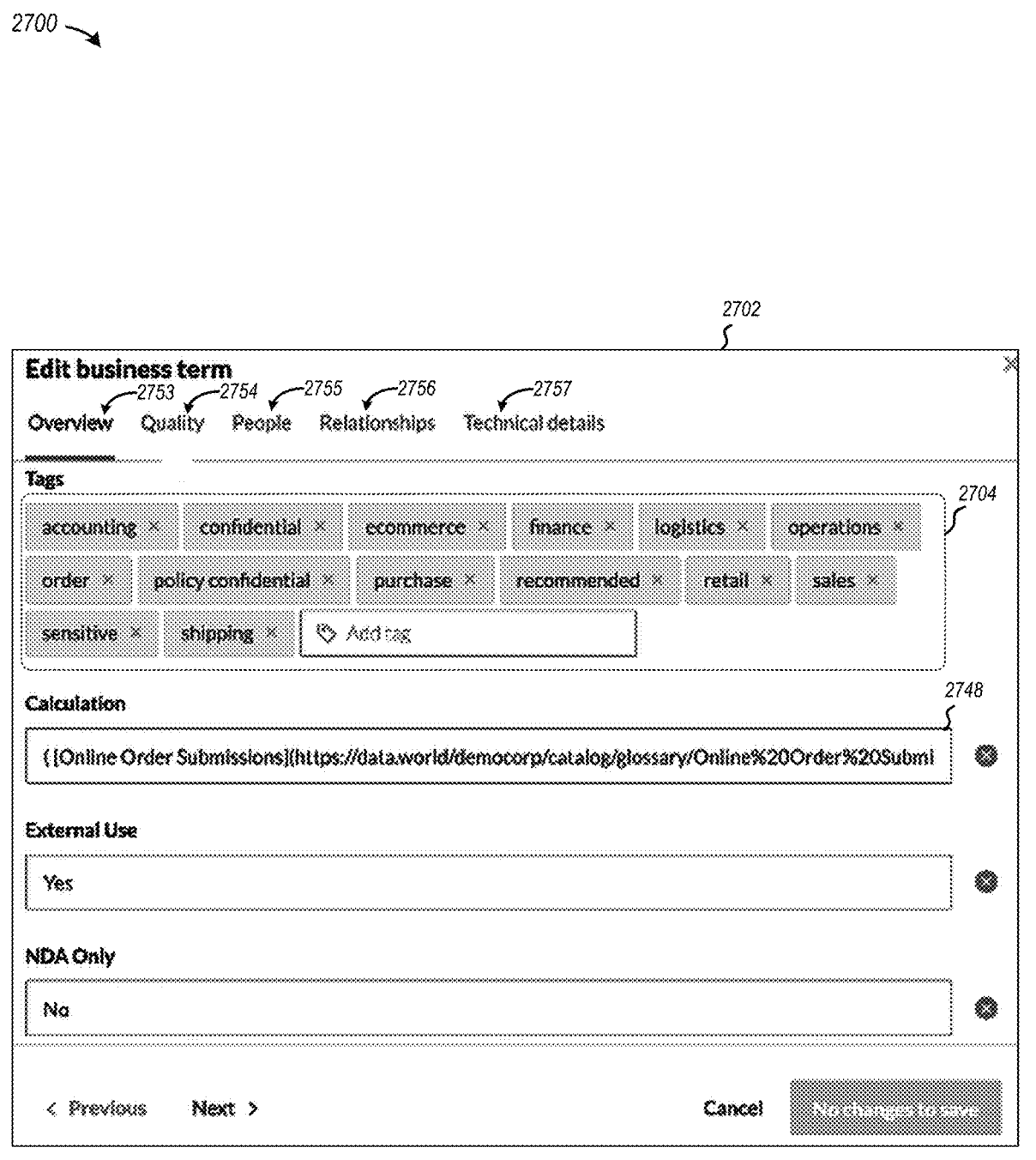

FIGS. 26A to 27 depict data fields with which to access and modify attributes of a data catalog entity, such as a glossary term, according to some examples;

FIGS. 30 to 32 are diagrams depicting functionalities of computerized tools to implement conceptual interface portions, according to various examples.

DETAILED DESCRIPTION

Figure 1:
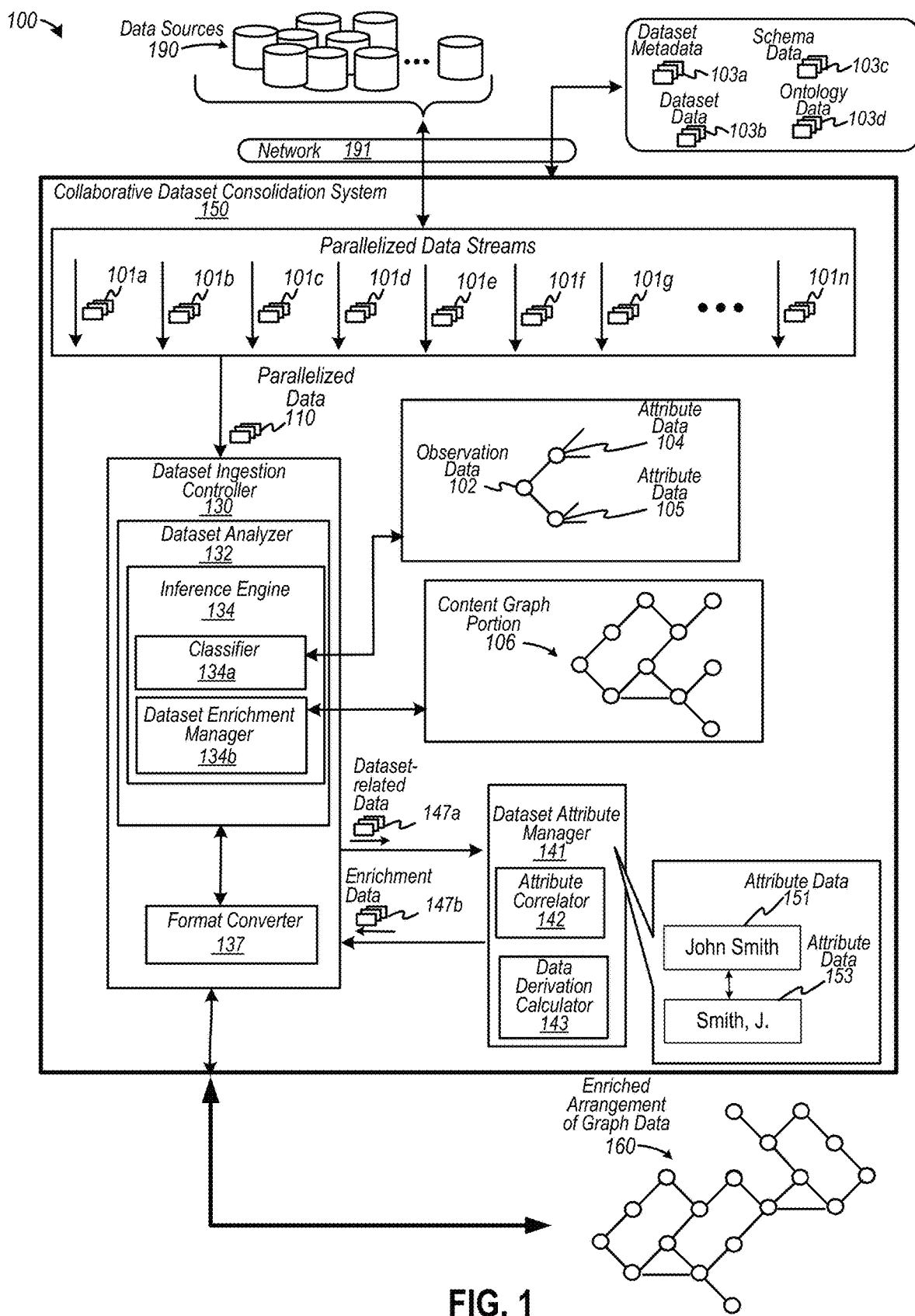
FIG. 1 is a diagram depicting a computing system configured to correlate portions of parallelized data to identify entity data predictively, according to some embodiments.

Various embodiments or examples may be implemented in numerous ways, including as a system, a process, an apparatus, a user interface, or a series of program instructions on a computer readable medium such as a computer readable storage medium or a computer network where the program instructions are sent over optical, electronic, or wireless communication links. In general, operations of disclosed processes may be performed in any arbitrary order, unless otherwise provided in the claims.

A detailed description of one or more examples is provided below along with accompanying figures. The detailed description is provided in connection with such examples, but is not limited to any particular example. The scope is limited only by the claims, and numerous alternatives, modifications, and equivalents thereof. Numerous specific details are set forth in the following description in order to provide a thorough understanding. These details are provided for the purpose of example and the described techniques may be practiced according to the claims without some or all of these specific details. For clarity, technical material that is known in the technical fields related to the examples has not been described in detail to avoid unnecessarily obscuring the description or providing unnecessary details that may be already known to those of ordinary skill in the art.

As used herein, "system" may refer to or include the description of a computer, network, or distributed computing system, topology, or architecture implementing hardware or software, or both, using various computing resources that are configured to provide computing features, functions, processes, elements, components, or parts, without any particular limitation as to the type, make, manufacturer, developer, provider, configuration, programming or formatting language, service, class, resource, specification, protocol, or other computing or network attributes. As used herein, "software" or "application" may also be used interchangeably or synonymously with, or refer to, a computer program, software, program, firmware, or any other term that may be used to describe, reference, or refer to a logical set of instructions that, when executed, performs a function or set of functions in association with a computing system or machine, regardless of whether physical, logical, or virtual and without restriction or limitation to any particular implementation, design, configuration, instance, or state. Further, "platform" may refer to any type of computer hardware (hereafter "hardware") or software, or any combination thereof, that may use one or more local, remote, distributed, networked, or computing cloud (hereafter "cloud")-based computing resources (e.g., computers, clients, servers, tablets, notebooks, smart phones, cell phones, mobile computing platforms or tablets, and the like) to provide an application, operating system, or other computing environment, such as those described herein, without restriction or limitation to any particular implementation, design, configuration, instance, or state. Distributed resources such as cloud computing networks (also referred to interchangeably as "computing clouds," "storage clouds," "cloud networks," or, simply, "clouds," without restriction or limitation to any particular implementation, design, configuration, instance, or state) may be used for processing and/or storage of varying quantities, types, structures, and formats of data, without restriction or limitation to any particular implementation, design, or configuration.

As used herein, data may be stored in various types of data structures including, but not limited to databases, data repositories, data warehouses, data stores, or other data structures or memory configured to store data in various computer programming languages and formats in accordance with various types of structured and unstructured database schemas such as SQL, MySQL, NoSQL, DynamoDB™, etc. Also applicable are computer programming languages and formats similar or equivalent to those developed by data facility and computing providers such as Amazon® Web Services, Inc. of Seattle, Washington, FMP, Oracle®, Salesforce.com, Inc., or others, without limitation or restriction to any particular instance or implementation. DynamoDB™, Amazon Elasticsearch Service, Amazon Kinesis Data Streams ("KDS")™, Amazon Kinesis Data Analytics, and the like, are examples of suitable technologies provide by Amazon Web Services ("AWS"). Another example of cloud computing services include the Google® cloud platform that may implement a publisher-subscriber messaging service (e.g., Google® pub/sub architecture). Yet in another example, cloud computing and messaging services may include Apache Kafka, Apache Spark, and any other Apache software application and platforms, which are developed and maintained by Apache Software Foundation of Wilmington, Delaware, U.S.A.

Further, references to databases, data structures, memory, or any type of data storage facility may include any embodiment as a local, remote, distributed, networked, cloud-based, or combined implementation thereof. For example, social networks and social media (e.g., "social media") using different types of devices may generate (i.e., in the form of posts (which is to be distinguished from a POST request or call over HTTP) on social networks and social media) data in different forms, formats, layouts, data transfer protocols, and data storage schema for presentation on different types of devices that use, modify, or store data for purposes such as electronic messaging, audio or video rendering (e.g., user-generated content, such as deployed on YouTube®), content sharing, or like purposes. Data may be generated in various formats such as text, audio, video (including three dimensional, augmented reality ("AR"), and virtual reality ("VR")), or others, without limitation, as electronic messages for use on social networks, social media, and social applications (e.g., "social media") such as Twitter® of San Francisco, California, Snapchat® as developed by Snap® of Venice, California, Messenger as developed by Facebook®, WhatsApp®, or Instagram® of Menlo Park, California, Pinterest® of San Francisco, California, LinkedIn® of Mountain View, California, and others, without limitation or restriction. In various embodiments, the term "content" may refer to, for example, one or more of executable instructions (e.g., of an application, a program, or any other code compatible with a programming language), textual data, image data, video data, audio data, or any other data.

In some examples, data may be formatted and transmitted via electronic messaging channels (i.e., transferred over one or more data communication protocols) between computing resources using various types of data communication and transfer protocols such as Hypertext Transfer Protocol ("HTTP"), Transmission Control Protocol ("TCP")/Internet Protocol ("IP"), Internet Relay Chat ("IRC"), SMS, text messaging, instant messaging ("IM"), File Transfer Protocol ("FTP"), or others, without limitation. As described herein, disclosed processes implemented as software may be programmed using Java®, JavaScript®, Scala, Python™, XML, HTML, and other data formats and programs, without limitation. Disclosed processes herein may also implement software such as Streaming SQL applications, browser applications (e.g., Firefox™) and/or web applications, among others. In some example, a browser application may implement a JavaScript framework, such as Ember.js, Meteor.js, ExtJS, AngularJS, and the like. References to various layers of an application architecture (e.g., application layer or data layer) may refer to a stacked layer application architecture such as the Open Systems Interconnect ("OSI") model or others. As described herein, a distributed data file may include executable instructions as described above (e.g., JavaScript® or the like) or any data constituting content (e.g., text data, video data, audio data, etc.), or both.

In some examples, systems, software, platforms, and computing clouds, or any combination thereof, may be implemented to facilitate online distribution of subsets of units of any data, content, postings, electronic messages, and the like. In some cases, units of content, electronic postings, electronic messages, and the like may originate at social networks, social media, and social applications, or any other source of content.

FIG. 1 is a diagram depicting a computing system configured to correlate portions of parallelized data to identify entity data predictively, according to some embodiments. Diagram 100 depicts an example of a networked (e.g., cloud-based) computing system, such as collaborative dataset consolidation system 150, that may be configured to access any amount of raw data via a network 191 from disparate data sources 190 to (1) analyze the data, to (2) deduplicate associated subsets of data through dataset consolidation, to (3) format data in a graph-based data format, to (4) resolve predictively identities of entities using data representations of objects and relationships among any number of entities, and to (5) provide any other number of functionalities. Further, collaborative dataset consolidation system 150 may be configured to generate and incrementally modify an arrangement of graph data using enriched data. In the example shown, an arrangement of graph data may include an enriched arrangement of graph data 160. In some examples, an arrangement of graph data, such as enriched arrangement of graph data 160, may be configured to constitute a "knowledge graph."

Data sources 190, whether stored locally or remotely, may be accessed to provide any type of data in any format, such as structured data (e.g., data stored as data tables in relational databases accessible via, for example, SQL or other structured database languages), semi-structured data (e.g., XML-formatted data, metadata, spreadsheet data, etc.), and unstructured data (e.g., PDF documents, GitHub™ Jupyter Notebook data, text document data, email document data, website data, etc.).

In the example shown, collaborative dataset consolidation system 150 may be configured to include any combination of hardware and software to analyze, deduplicate, format, and resolve data representing identities of entities, the data being received from data sources 190 as parallelized data 110. In at least one instance, collaborative dataset consolidation system 150 may be configured to process data from data resources 190 in parallel (or substantially in parallel), for example, in real-time or near real-time. Collaborative dataset consolidation system 150 may include logic as hardware (e.g., multiple processors such as more than 200 to 1,600 core processors) and software, or any combination thereof, that may be configured to "massively parallel process" parallelized data 110 to analyze, deduplicate, format, and/or resolve data representing identities of entities as each of parallelized data streams 101a to 101n. In a non-limiting example, consider that collaborative dataset consolidation system 150 may be configured to access data with more than one thousand data sources 190 to identify 50 billion or more subsets of observation data (or units of observation data) during a time interval (e.g., 24 hours or less). Parallelized processing of data (e.g., raw data) from data sources 190 facilitates rapid and expeditious deduplication and consolidation of data to form units of observation data with which to resolve to identify unique entities, according to some examples. In one example, logic configured to implement dataset ingestion controller 130 and dataset attribute manager 141 may be replicated (not shown) to process each of parallelized data streams 101a to 101n in parallel, or substantially in parallel.

In the example shown, collaborative dataset consolidation system 150 may include a dataset ingestion controller 130 configured to remediate (e.g., "clean" and "prepare") parallelized data 110 prior to conversion into another data format (e.g., a graph data structure) that may be stored locally or remotely such as a graph data node referring to an external data source, such as one of data sources 190. As shown, dataset ingestion controller 130 may also include a dataset analyzer 132 and a format converter 137. Also shown, dataset analyzer 130 may include an inference engine 134, which may include a data classifier 134a and a data enhancement manager 134b. Further to diagram 100, collaborative dataset consolidation system 150 is shown also to include a dataset attribute manager 141, which includes an attribute correlator 142 and a data derivation calculator 143. Dataset ingestion controller 130 and dataset attribute manager 141 may be communicatively coupled to exchange dataset-related data 147a and enrichment data 147b, whereby any of dataset ingestion controller 130 and dataset attribute manager 141 may exchange data from a number of sources (e.g., external data sources) that may include dataset metadata 103a (e.g., descriptor data or information specifying dataset attributes), dataset data 103b (e.g., reference data stored locally or remotely to access data in any local or remote data storage, such as data in data sources 190), schema data 103c (e.g., sources, such as schema.org, that may provide various types and vocabularies, glossaries, data dictionaries, and the like), and ontology data 103d from any suitable ontology and any other suitable types of data sources.

Diagram 100 depicts an example of a classifier 124a configured to classify any portion of parallelized data stream 101a to 101n as including a unit of observation data 102 associated with one or more attributes and data values, such as attribute data 104 and attribute 105. Observation data, or a unit thereof, can be data that may be classified as being associated with an entity, a concept, a topic, or a classification of data (e.g., a "class" of data), such as a "person" associated with attributes including a name, an address, etc., or a "product" associated with attributes including a product name, a manufacturer, a stock-keeping unit ("SKU"), etc., or a "service" associated with attributes including a name of purveyor of such services, etc., or any other entity. As an example, an "observation" or a unit of observation data may refer to a data record that may include data representing attributes identifying a name, an address, a phone number, an email address, a customer number, a familial relationship, a gender, or any other attribute or characteristic of an object or individual entity. A unit of observation data 102 may be correlatable to (or matched to) any number of attributes, such as attributes 104 and 105 as well as other attributes and/or data values.

According to some examples, data representing a unit of observation data 102 may be computed to be associated with a hash value referring to a content-addressed node of a graph data arrangement, whereby similar or equivalent hash values may be implemented via a hash function to consolidate (e.g., collapse, integrate, or deduplicate) multiple data representations of entities into graph data representing an entity. In some cases, observation data 102 may be referred to as an "observation fingerprint" (e.g., an electronically digital fingerprint, or a portion thereof) associated with an entity, whereby each grouping of observation data 102 and attributes 104 and 105 may be considered as a subset of data representing an entity—that when aggregated or clustered with other equivalent observation fingerprints—provides enriched graph data that may be used to describe or identify a particular entity (e.g., uniquely identifying a specific person). Note that the term "attribute" may refer to, or may interchangeable with, the term "property."

Dataset ingestion controller 130 or dataset enrichment manager 134b may be configured to generate a content graph 106 (or a portion thereof) based on one or more subsets of observation data 102 and attribute data 104 and 105. In one example, content graph 106 may include at least one node representing observation data 102 and one or more other nodes each representing a data value (e.g., as attributes 104 and 105, or any other attribute or data value). In some examples, dataset enrichment manager 134b may be configured to correlate or predictively match groupings of content graph portions 106 to deduplicate redundant data and to consolidate attribute data to comprehensively generate enriched graph data that represents an entity. Hence, dataset enrichment manager 134b may be configured to consolidate datasets and portions thereof.

Further, any of dataset attribute manager 141 and attribute correlator 142 may be configured to correlate attribute data 104 and 105 of observation data 102 to correlate or match with other subsets of attribute data to form correlated subsets of parallelized data 110, each of which may be used to aggregate or cluster groups of observation data 102 to generate content graph 106 to characterize and identify an entity. Parallelized data 110 or observation data 102 with attribute data 104 and 105 may be transmitted to dataset attribute manager 141. As shown, dataset attribute manager 141 and attribute correlator 142 may be configured to correlate a first data value as attribute data 151 ("John Smith") to a second data value as attribute data 153 ("Smith, J."). Correlated attribute data 151 and 153 may be transmitted as enrichment data 147b to facilitate aggregating or clustering of content graph portions 106 at dataset enrichment manager 134b to form or modify at least a portion of enriched arrangement of graph data 160. Dataset attribute manager 141 and attribute correlator 142 may be configured to electronically interact to aggregate or cluster content graph portions 106 to identify an individual entity (e.g., a person or a product), and may be further configured to aggregate or cluster aggregated content graph portions 106 to identify a hierarchical entity to which individual entities may be associated (e.g., a household or a manufacturer). In some examples, dataset attribute manager 141 and attribute correlator 142 may be configured to electronically interact to correlate or match data representing observation fingerprints to derive a calculated identify of an entity from relatively large amounts (e.g., 50 Billion or more) of units of observation data 102.

According to some examples, dataset analyzer 132 and any of its components, including inference engine 134, may be configured to analyze datasets of parallelized data 110 to detect or determine whether ingested data has an anomaly relating to data (e.g., improper or unexpected data formats, types or values) or to a structure of a data arrangement in which the data is disposed. For example, inference engine 134 may be configured to analyze parallelized data 110 to identify tentative anomalies and to determine (e.g., infer or predict) one or more corrective actions. In some cases, inference engine 134 may predict a most-likely solution relative to other solutions for automatic resolution to clean and prepare data. In some examples, dataset analyzer 132 may be configured to correct an anomaly (e.g., to correct or confirm data, such as data that might refer to a U.S. state name, such as "Texas," rather than "TX"). Dataset analyzer 132 and any of its components may be configured to perform an action based on any of a number of statistical computations, including Bayesian techniques, linear regression, natural language processing ("NLP") techniques, machine-learning techniques, deep-learning techniques, etc. In some other examples, dataset analyzer 132 may be configured to identify and correct or quarantine invalid data values or outlier data values (e.g., out-of-range data values). Therefore, dataset analyzer 132 may facilitate corrections to observation data 102 or content graph data 106 "in-situ" or "in-line" (e.g., in real time or near real time) to enhance accuracy of atomized dataset generation (e.g., including triples) during the dataset ingestion and/or graph formation processes to form graph arrangement 160. In some cases, collaborative dataset consolidation system 150 may be configured to construct a repair graph including invalid or quarantined data to remediate the anomalous data for use in graph arrangement 160.

Subsequent or in parallel to performing corrective actions to remediate automatically issues related to datasets and data embodied in parallelized data 100, classifier 134a may be configured to identify and classify data as observation data 102, which may be linked to attribute data 104 and 105. Data enrichment manager 134b may be configured to generate and aggregate content graph portions 106 to identify an entity. Format converter 137 may be configured to convert any portion of parallelized data from data source 190 to graph-based data as observation data 102 and content graph data 106 at any time during ingestion, analyzation, identification, and deduplication of data. Format converter 137 may be configured to generate other graph-based data, such as ancillary data or descriptor data (e.g., metadata) that may describe other attributes associated with each unit of observation data 102. Ancillary or descriptor data can include data elements describing attributes of a unit of data, such as, for example, a label or annotation (e.g., header name) for a column, an index or column number, a data type associated with the data in a column, etc. In some examples, a unit of data may refer to data disposed at a particular row and column of a tabular arrangement.

In various examples, attribute correlator 142 may be configured to correlate inferred or implicit (as well as explicit) attributes with a dataset having attributes 151 and 153 to other attributes of other observation data 102, which may be implemented to join, aggregate, or cluster data to enrich an ingested dataset to form graph data 160. For example, attribute correlator 1763 can detect patterns in datasets in parallelized data streams 101a to 101n to correlate or match attributes to identify subsets of observation data 102 that may be correlatable to an identity of an entity. Attribute correlator 142 may be configured to analyze the data to detect patterns or data classifications that may resolve an issue, by "learning" or probabilistically predicting a dataset attribute through the use of Bayesian networks, clustering analysis, as well as other known machine learning techniques, deep-learning techniques, and the like. In some cases, data derivation calculator 143 may be configured to derive data computationally and/or predictively to add links among graph-based data nodes to enhance graph arrangement 160. In some examples, data derivation calculator 143 may be configured to enrich individual entity data by linking attributes imported from external feeds and calculating derived attributes algorithmically.

In one or more examples, one or more structural and/or functional elements described in FIG. 1, as well as below, may be implemented in hardware or software, or both, and optionally may implement any structure or functionality described in U.S. patent application Ser. No. 15/186,514, filed on Jun. 19, 2016, issued as U.S. Pat. No. 10,102,258 and titled "COLLABORATIVE DATASET CONSOLIDATION VIA DISTRIBUTED COMPUTER NETWORKS;" U.S. patent application Ser. No. 15/454,923, filed on Mar. 6, 2017, issued as U.S. Pat. No. 10,353,911 and titled "COMPUTERIZED TOOLS TO DISCOVER, FORM, AND ANALYZE DATASET INTERRELATIONS AMONG A SYSTEM OF NETWORKED COLLABORATIVE DATASETS;" U.S. patent application Ser. No. 16/036,834, filed on Jul. 16, 2018, issued as U.S. Pat. No. 11,042,560 and titled "EXTENDED COMPUTERIZED QUERY LANGUAGE SYNTAX FOR ANALYZING MULTIPLE TABULAR DATA ARRANGEMENTS IN DATA-DRIVEN COLLABORATIVE PROJECTS;" U.S. patent application Ser. No. 15/926,999, filed on Mar. 20, 2018, issued as U.S. Pat. No. 11,016,931 and titled "DATA INGESTION TO GENERATE LAYERED DATASET INTERRELATIONS TO FORM A SYSTEM OF NETWORKED COLLABORATIVE DATASETS;" U.S. patent application Ser. No. 15/927,004, filed on Mar. 20, 2018, issued as U.S. Pat. No. 11,036,716 and titled "LAYERED DATA GENERATION AND DATA REMEDIATION TO FACILITATE FORMATION OF INTERRELATED DATA IN A SYSTEM OF NETWORKED COLLABORATIVE DATASETS;" U.S. patent application Ser. No. 15/985,702, filed on May 22, 2018, issued as U.S. Pat. No. 11,068,475 and titled "COMPUTERIZED TOOLS TO DEVELOP AND MANAGE DATA-DRIVEN PROJECTS COLLABORATIVELY VIA A NETWORKED COMPUTING PLATFORM AND COLLABORATIVE DATASETS;" U.S. patent application Ser. No. 15/985,705, filed on May 22, 2018, issued as U.S. Pat. No. 11,086,896 and titled "DYNAMIC COMPOSITE DATA DICTIONARY TO FACILITATE DATA OPERATIONS VIA COMPUTERIZED TOOLS CONFIGURED TO ACCESS COLLABORATIVE DATASETS IN A NETWORKED COMPUTING PLATFORM;" U.S. patent application Ser. No. 16/137,292, filed on Sep. 20, 2018, issued as U.S. Pat. No. 10,824,637 and titled "MATCHING SUBSETS OF TABULAR DATA ARRANGEMENTS TO SUBSETS OF GRAPHICAL DATA ARRANGEMENTS AT INGESTION INTO DATA DRIVEN COLLABORATIVE DATASETS;" U.S. patent application Ser. No. 16/137,297, filed on Sep. 20, 2018, issued as U.S. Pat. No. 11,068,453 and titled "DETERMINING A DEGREE OF SIMILARITY OF A SUBSET OF TABULAR DATA ARRANGEMENTS TO SUBSETS OF GRAPH DATA ARRANGEMENTS AT INGESTION INTO A DATA-DRIVEN COLLABORATIVE DATASET PLATFORM;" and U.S. patent application Ser. No. 16/899,551, filed on Jun. 11, 2020 and titled "COMPUTERIZED TOOLS TO COLLABORATIVELY GENERATE QUERIES TO ACCESS IN-SITU PREDICTIVE DATA MODELS IN A NETWORKED COMPUTING PLATFORM," all of which are incorporated by reference.

In view of the foregoing, structures and/or functionalities depicted in FIG. 1 as well as other figures herein, may be implemented as software, applications, executable code, application programming interfaces ("APIs"), processors, hardware, firmware, circuitry, or any combination thereof. In at least one example, enriched arrangement of graph data 160 may be implemented as a knowledge graph data arrangement (e.g., an enterprise knowledge graph).

Figure 2:
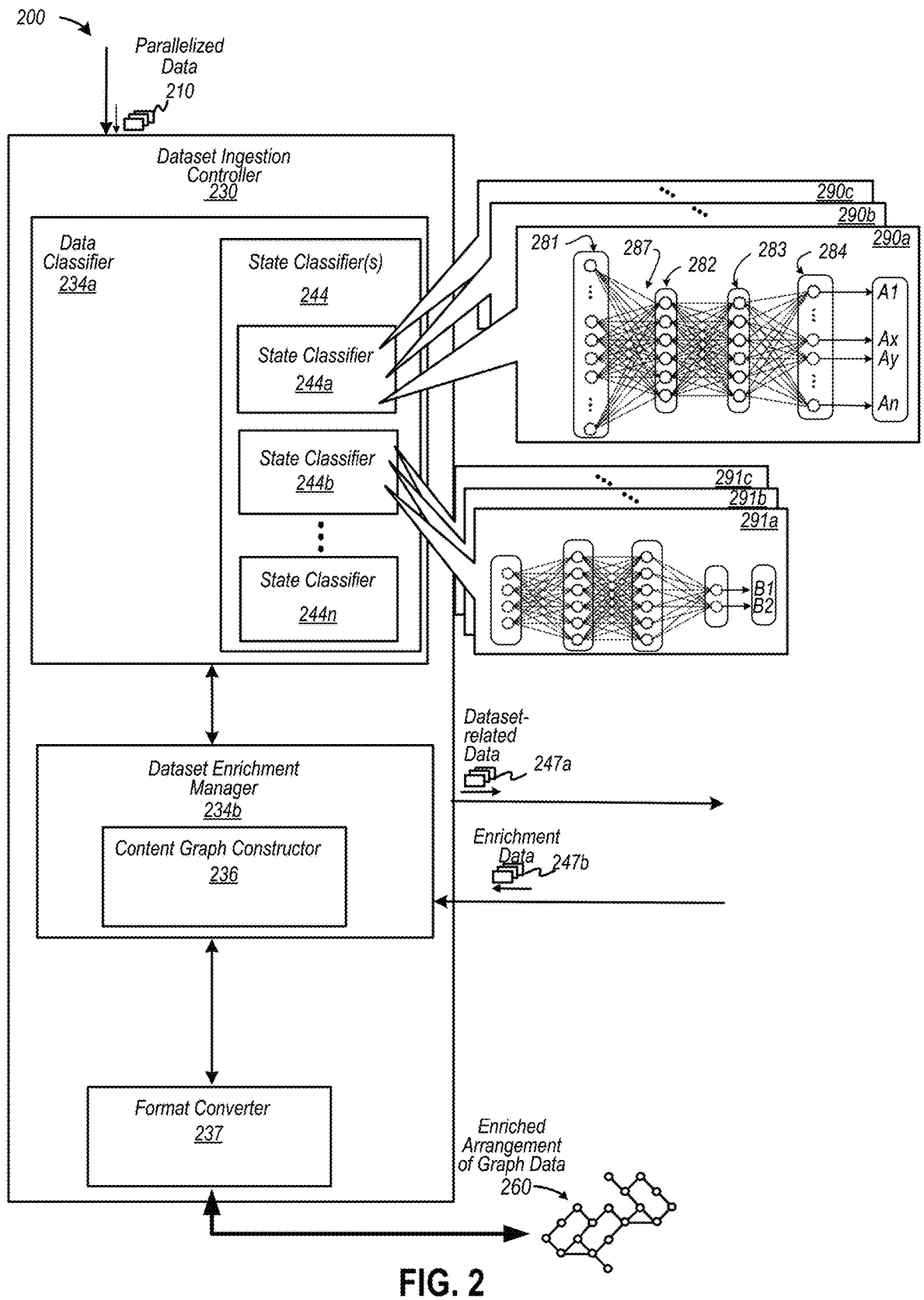
FIG. 2 depicts an example of a dataset ingestion controller, according to some examples.

FIG. 2 depicts an example of a dataset ingestion controller, according to some examples. Diagram 200 depicts a dataset ingestion controller 230 including a data classifier 234a, which is shown to include a one or more state classifiers 244, a dataset enrichment manager 234b, and a format converter 237. Dataset ingestion controller 230 may be configured to receive parallelized data 210 as well as enrichment data 247b from attribute correlator 342 of FIG. 3. Referring back to FIG. 2, elements depicted in diagram 200 may include structures and/or functions as similarly-named or similarly-numbered elements depicted in other drawings.

One or more state classifiers 244a to 244n may be configured to determine a "state" or "class" associated with portions of data received as parallelized data 210 to determine a state, type, or class of observation data. One or more state classifiers 244a to 244n may be configured to implement any number of statistical analytic programs, machine-learning applications, deep-learning applications, and the like. For example, state classifier 244a may include any number of predictive data modeling algorithms 290a to 290c that may be configured to perform pattern recognition and probabilistic data computations. For example, predictive data modeling algorithms 290a to 290c may apply "k-means clustering," or any other clustering data identification techniques to form clustered sets of data that may be analyzed to determine or learn optimal classifications of observation data and associated attributes and supplemental data (e.g., metadata) related thereto. In some examples, data classifier 234a and its components may be configured to detect patterns or classifications among datasets through the use of Bayesian networks, clustering analysis, as well as other known machine learning techniques or deep-learning techniques (e.g., including any known artificial intelligence techniques, or any of k-NN algorithms, linear support vector machine ("SVM") algorithm, regression and variants thereof (e.g., linear regression, non-linear regression, etc.), Bayesian inferences and the like, including classification algorithms, such as Naïve Bayes classifiers, or any other statistical, empirical, or heuristic technique). In other examples, predictive data modeling algorithms 290a to 290c may include any algorithm configured to extract features and/or attributes based on classifying data or identifying patterns of data, as well as any other process to characterize subsets of data As shown, predictive data model 290a may be configured to implement one of any type of neural networks (or any other predictive algorithm) as neural network model 290a, which may include a set of inputs 281 and any number of "hidden" or intermediate computational nodes 282 and 283, whereby one or more weights 287 may be implemented and adjusted (e.g., in response to training). Also shown, is a set of predicted outputs 284, such as terms defining a type of observation data. Predictive data model 290a may be configured to predict a class of "observation data," whereby one or more of any output A1, . . . , Ax, Ay, . . . An may represent a class of observation data, such as a "name" (e.g., a person's name), an "address," a "customer number," a "date of birth," an "email address," a "telephone number," or any other class of observation data that may be associated with attributes. In some examples, attributes may be input into inputs 281 to derive a class or type of observation data. As an example, data representing an address and a name may be applied to inputs 281 to identify an identity of an entity, such as a unique identity of a person.

As another example, inputs into state classifier 244b may determine affinity data that may indicate a degree of affiliation with another entity. For example, predictive data modeling algorithms 291a to 291c may be configured to predict whether an individual entity (e.g., a unique person, a unique product, etc.) is associated or affiliated with another entity. As such, inputs into predictive data modeling algorithms 291a to 291c may be configured to predict whether multiple entities, such as multiple people belong to the same household (or as a living unit) or multiple products originate from a common retailer or manufacturer. Output B1 may indicate a relatively high probability of association (e.g., a familial relationship exists) and output B2 may indicate a relatively low probability of association (e.g., a familial relationship does not exist). Other state classifiers, such as state classifier 244n, may generate data representing characterizations of parallelized data 210, including metadata, to determine a "context" in which observation data and associated attributes are modeled. A predicted context may facilitate enhanced accuracy in determining and resolving identities of entities.

Data outputs from state classifiers 244 and parallelized data 210 may be transmitted to dataset enrichment manager 234b, which may be configured to analyze ingested data relative to dataset-related data to determine correlations among dataset attributes of ingested data and other datasets 103b of FIG. 1 (and attributes, such as dataset metadata 103a), as well as schema data 103c, ontology data 103d, and other sources of data.

Referring back to FIG. 2, data enrichment manager 234b may be configured to identify correlated datasets based on correlated attributes as determined, for example, by an attribute correlator and received as enrichment data 247b, which, in at least some cases, may include probabilistic or predictive data specifying, for example, classification of a data attribute or a link to other datasets to enrich a dataset. The correlated attributes, as generated by an attribute correlator, may facilitate the use of derived data or link-related data, as attributes, to associate, combine, join, or merge datasets to form collaborative datasets, such as enriched arrangement of graph data 260. Enriched arrangement of graph data 260 may be implemented as a knowledge graph, at least in some examples.

Further to diagram 200, dataset enrichment manager 234b is shown to include a content graph constructor 236 that is configured to form a content graph (or a portion thereof) that builds upon similar or equivalent units of observation data and subsets of attributes that may be correlatable (e.g., correlatable or matched to a threshold degree). In some examples, content graph constructor 236 may be configured to form a portion of graph data 260 (e.g., a sub-graph) based on correlated and deduplicated subsets of observation fingerprint data. As an example, observation fingerprint data may include data representing one or more attributes such as a first name, a first initial, a last name, a residential address, an email address, a customer number, etc. Enrichment data 247b may include data specifying matched or correlated attribute data with which to merge or cluster content graphs to form a comprehensive graph that includes data regarding an entity (e.g., a person, a product, a service, etc.). According to some implementations, content graph constructor 236 may be configured to cluster various units of observation data to form a cluster of data representing an identifiable entity.

Format converter 237 may be configured to convert data generated by data classifier 234a and dataset enrichment manager 236b into a graph-based data format. Also, format converter 237 may be configured to convert one or more of parallelized data 210, dataset-related data 247a, and enrichment data 247b into a graph-based data format compatible with enriched arrangement of graph data 260. In view of the foregoing, structures and/or functionalities depicted in FIG. 2 as well as other figures herein, may be implemented as software, applications, executable code, application programming interfaces ("APIs"), processors, hardware, firmware, circuitry, or any combination thereof.

Figure 3:
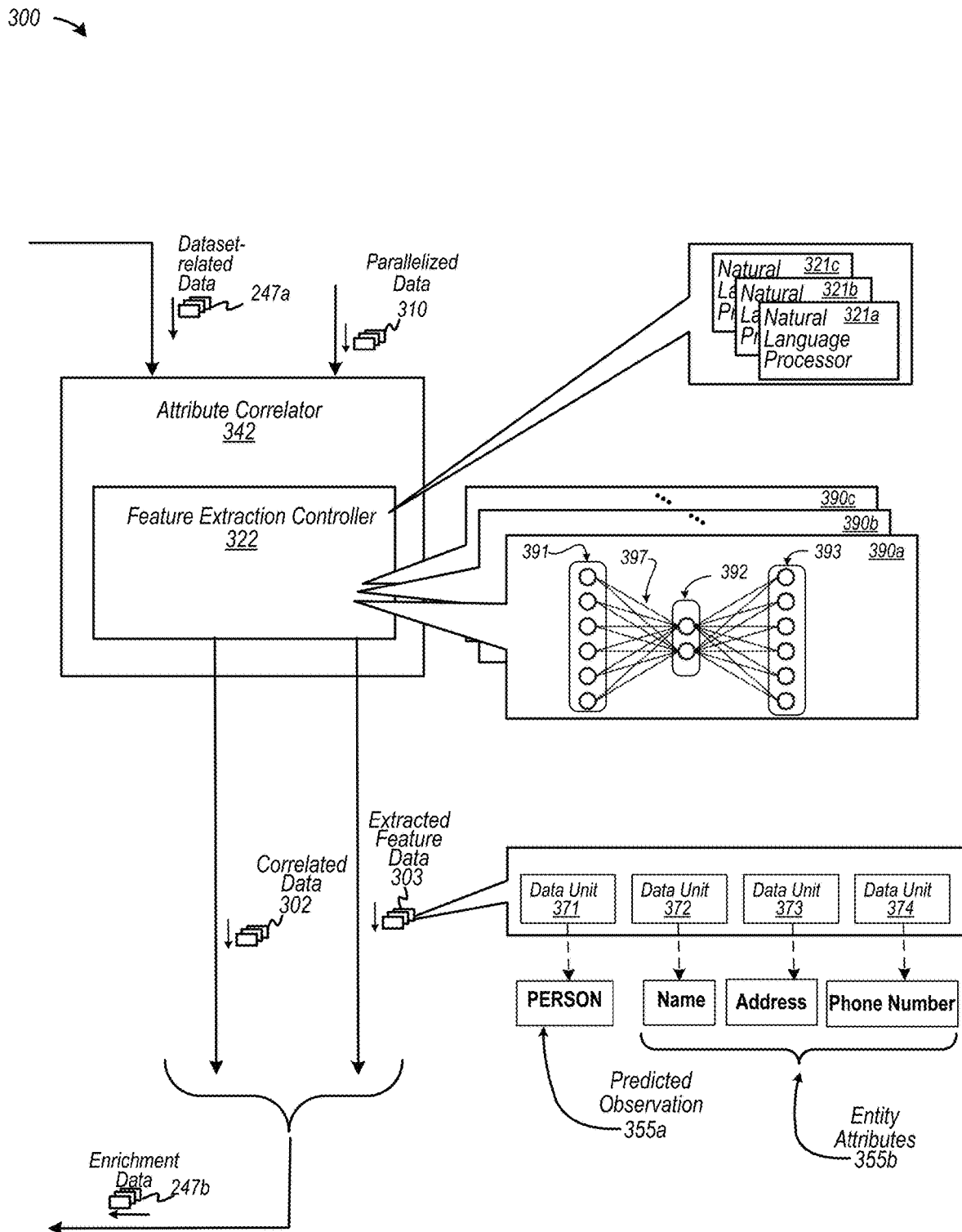
FIG. 3 depicts an example of an attribute correlator, according to some examples.

FIG. 3 depicts an example of an attribute correlator, according to some examples. Diagram 300 depicts an example of an attribute correlator 342 that may include a feature extraction controller 322, which may be configured to extract feature data to identify attributes. Attribute correlator 342 further may be configured to correlate attributes among any number of datasets, including attribute data associated with any number of units of observation data. As shown, attribute correlator 342 may receive dataset-related data 247a and parallelized data 310 to identify and correlate attributes, which, in turn, may be transmitted as enrichment data 247b to dataset enrichment manager 234b of FIG. 2 to construct one or more content graphs. Referring back to FIG. 3, elements depicted in diagram 300 may include structures and/or functions as similarly-named or similarly-numbered elements depicted in other drawings. Attribute correlator 342 may be configured to analyze data to detect patterns or data classifications that may resolve an issue, by "learning" or probabilistically predicting a dataset attribute through the use of Bayesian networks, clustering analysis, as well as other known machine learning techniques or deep-learning techniques, such as those described herein.

Feature extraction controller 322 may be configured to extract features as data representing correlated data 302 (e.g., as matched attribute data values). In at least one example, feature extraction controller 322 may include any number of natural language processing ("NLP") algorithms configured to correlate attribute data, such as matching or correlating names of entities (e.g., names of persons, products, services, etc.) to determine an identity of an entity. Natural language processor algorithms 321a to 321c may be configured, for example, to tokenize sentences and words, perform word stemming, filter out stop or irrelevant words, or implement any other natural language processing operation to determine text-related features to correlate attribute data, such as text data.

In some examples, feature extraction controller 322 may include any number of predictive data modeling algorithms 390a to 390c that may be configured to perform pattern recognition and probabilistic data computations. For example, predictive data modeling algorithms 390a to 390c may apply "k-means clustering," or any other clustering data identification techniques to form clustered sets of data that may be analyzed to determine or learn optimal correlation or matching of attribute data. In some examples, feature extraction controller 322 may be configured to detect patterns or classifications among datasets through the use of Bayesian networks, clustering analysis, as well as other known machine learning techniques or deep-learning techniques (e.g., including any known artificial intelligence techniques, or any of k-NN algorithms, linear support vector machine ("SVM") algorithm, regression and variants thereof (e.g., linear regression, non-linear regression, etc.), Bayesian inferences and the like, including classification algorithms, such as Naïve Bayes classifiers, or any other statistical, empirical, or heuristic technique). In other examples, predictive data modeling algorithms 390a to 390c may include any algorithm configured to extract features and/or attributes based on identifying patterns of attribute data, as well as any other process to characterize subsets of data.

In the example shown, feature extraction controller 322 may be configured to implement any number of statistical analytic programs, machine-learning applications, deep-learning applications, and the like. Feature extraction controller 322 is shown to have access to any number of predictive models, such as predictive models 390a, 390b, and 390c, among others. As shown, predictive data model 390a may be configured to implement one of any type of neural networks to similar or equivalent data representations of attributes. For example, as predictive models 390a, 390b, and 390c may be configured to identity or match names associated with observation data, as well as matching addresses (or any other attribute) associated with a name to identify an individual entity. A neural network model 390a may include a set of inputs 391 and any number of "hidden" or intermediate computational nodes 392, whereby one or more weights 397 may be implemented and adjusted (e.g., in response to training). Also shown is a set of predicted outputs 393, such as text terms defining a match among attribute values (e.g., matched names, matched addressed, matched SKUs, etc.), among any other types of outputs.

Feature extraction controller 322 may include a neural network data model configured to predict (e.g., extract) contextual or related text terms based on generation of vectors (e.g., word vectors) with which to determine degrees of similarity (e.g., magnitudes of cosine similarity) to, for example, establish compatibility between attribute data (to indicate a degree of equivalency), at least in some examples. In at least one example, feature extraction controller 322 may be configured to implement a "word2vec" natural language processing algorithm or any other natural language process that may or may not transform, for example, text data into numerical data (e.g., data representing a vector space).

According to some examples, feature extraction controller 322 may include algorithms configured to detect a degree of similarity between, for example, strings of texts to match names, addresses, etc. In some implementations, feature extraction controller 322 may be configured to implement edit distance algorithms and/or phonetic encoding algorithms, among others, to identify matched attribute values. For example, feature extraction controller 322 may implement an algorithm configured to determine the Levenshtein Distance to calculate a difference between data representing strings of alphanumeric text (e.g., to determine similarity or equivalency). In another example, a phonetic algorithm, such as a Soundex algorithm, may be implemented to detect a degree to which text strings or alphanumeric text strings may be similar or equivalent. In yet other examples, a Jaro-Winkler distance algorithm may be implemented to detect a degree of equivalency between or among text strings. In some other examples, feature extraction controller 322 may be configured to implement softmax activation algorithms, sigmoid activation algorithms, or any other equivalent algorithm configured to implement machine learning and deep learning techniques.

Thus, feature extraction controller 322 may be configured to identify correlated data 302 and generate extracted feature data 303, which may include one or more groups of data units 371 to 374, whereby each group of data units 371 to 374 may be associated with a unit of observations data or a unit of attribute data, or both. As example, consider that feature extraction controller 322 may be configured to identity correlatable data units 371 to 374 as attribute data that may match with other attribute data values. Here, data unit 371 may specify a "person" as a class of data indicative of a unit of predicted observation data 355a. In accordance with some examples, data unit 371 may include data that represents a concept, an entity, a topic, a data resource (e.g., a dataset), a user (e.g., a user account, a role in an enterprise, etc.), and the like. Also, data units 372 to 374 may describe attribute values "name," "address," and "phone number" as entity attributes 355b that may be associated with (e.g., linked to) predicted observation data 355a (e.g., a predicted concept).

In view of the foregoing, attribute correlator 342 may be configured to generate electronic messages including correlated data 302 and extracted feature data 303 that may be transmitted as enrichment data 247b to a content graph constructor, such as depicted in FIG. 2. A content graph constructor may be configured to aggregate or cluster observation data 355a with other instances of matched or correlatable units of observation data. Further, structures and/or functionalities depicted in FIG. 3 as well as other figures herein, may be implemented as software, applications, executable code, application programming interfaces ("APIs"), processors, hardware, firmware, circuitry, or any combination thereof.

Figure 4:
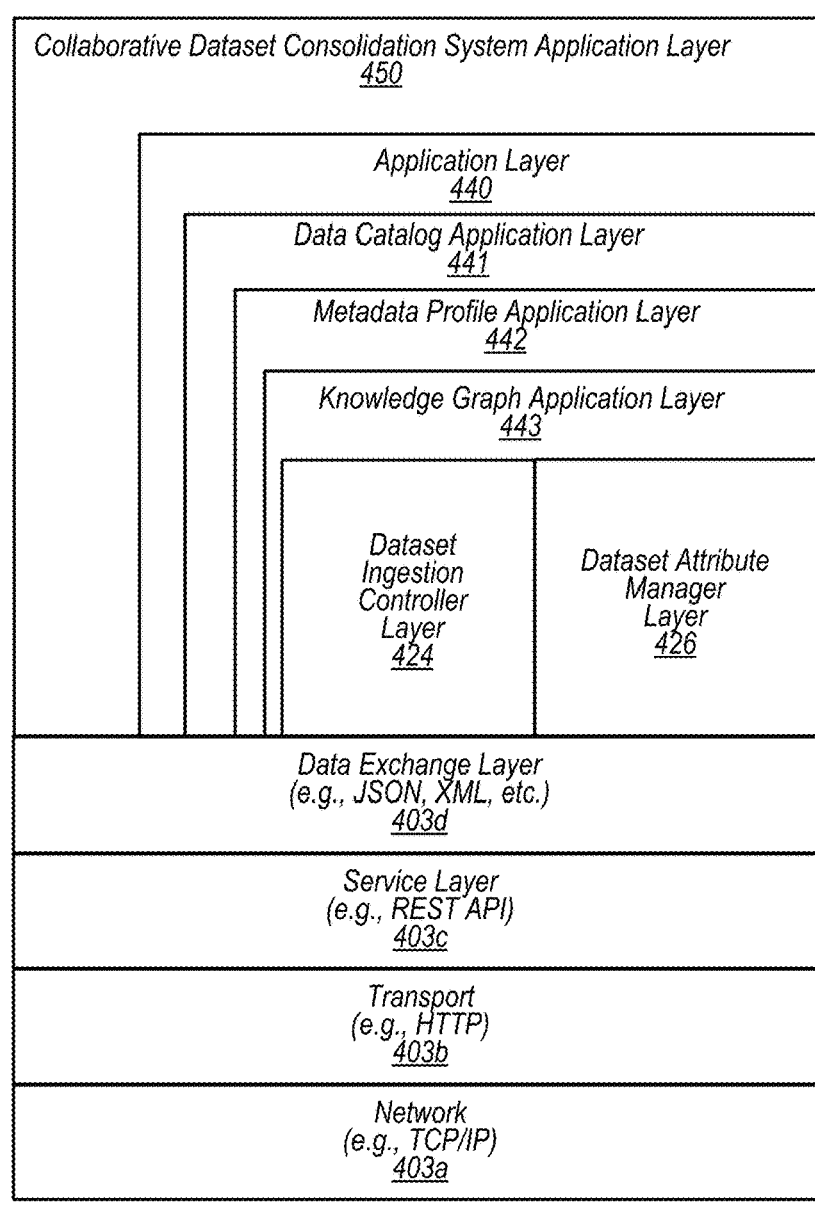
FIG. 4 illustrates an exemplary layered architecture for implementing an collaborative dataset consolidation system application, according to some examples.

FIG. 4 illustrates an exemplary layered architecture for implementing a collaborative dataset consolidation system application, according to some examples. Diagram 400 depicts application stack ("stack") 401, which is neither a comprehensive nor a fully inclusive layered architecture to correlate subsets of parallelized data from disparately-formatted data sources to identify entity data and to aggregate graph data portions, among other things. One or more elements depicted in diagram 400 of FIG. 4 may include structures and/or functions as similarly-named or similarly-numbered elements depicted in other drawings, or as otherwise described herein, in accordance with one or more examples, such as described relative to any figure or description herein.

Application stack 401 may include a collaborative dataset consolidation system application layer 450 upon application layer 440, which, in turn, may be disposed upon any number of lower layers (e.g., layers 403a to 403d). Collaborative dataset consolidation system application layer 450 may be configured to correlate subsets of parallelized data from disparately-formatted data sources to identify entity data and to aggregate graph data portions, as described herein. Further, collaborative dataset consolidation system application layer 450 and application layer 440 may be disposed on data exchange layer 403d, which may implemented using any programming language, such as HTML, JSON, XML, etc., or any other format to effect generation and communication of requests and responses among computing devices and computational resources constituting an enterprise, an entity, and/or a platform configured to correlate data and information expeditiously, such as information regarding products or services aligned with data in targeted data sources compatible with data integration. Data exchange layer 403d may be disposed on a service layer 403c, which may provide a transfer protocol or architecture for exchanging data among networked applications. For example, service layer 403c may provide for a RESTful-compliant architecture and attendant web services to facilitate GET, PUT, POST, DELETE, and other methods or operations. In other examples, service layer 403c may provide, as an example, SOAP web services based on remote procedure calls ("RPCs"), or any other like services or protocols (e.g., APIs, such as REST APIs, etc.). In some cases, APIs may be implemented with Fetch API programmatic code, XHR ("XML HttpRequest") API programmatic code, and equivalents thereof. Service layer 403c may be disposed on a transport layer 403b, which may include protocols to provide host-to-host communications for applications via an HTTP or HTTPS protocol, in at least this example. Transport layer 403b may be disposed on a network layer 403a, which, in at least this example, may include TCP/IP protocols and the like.

Figure 13:
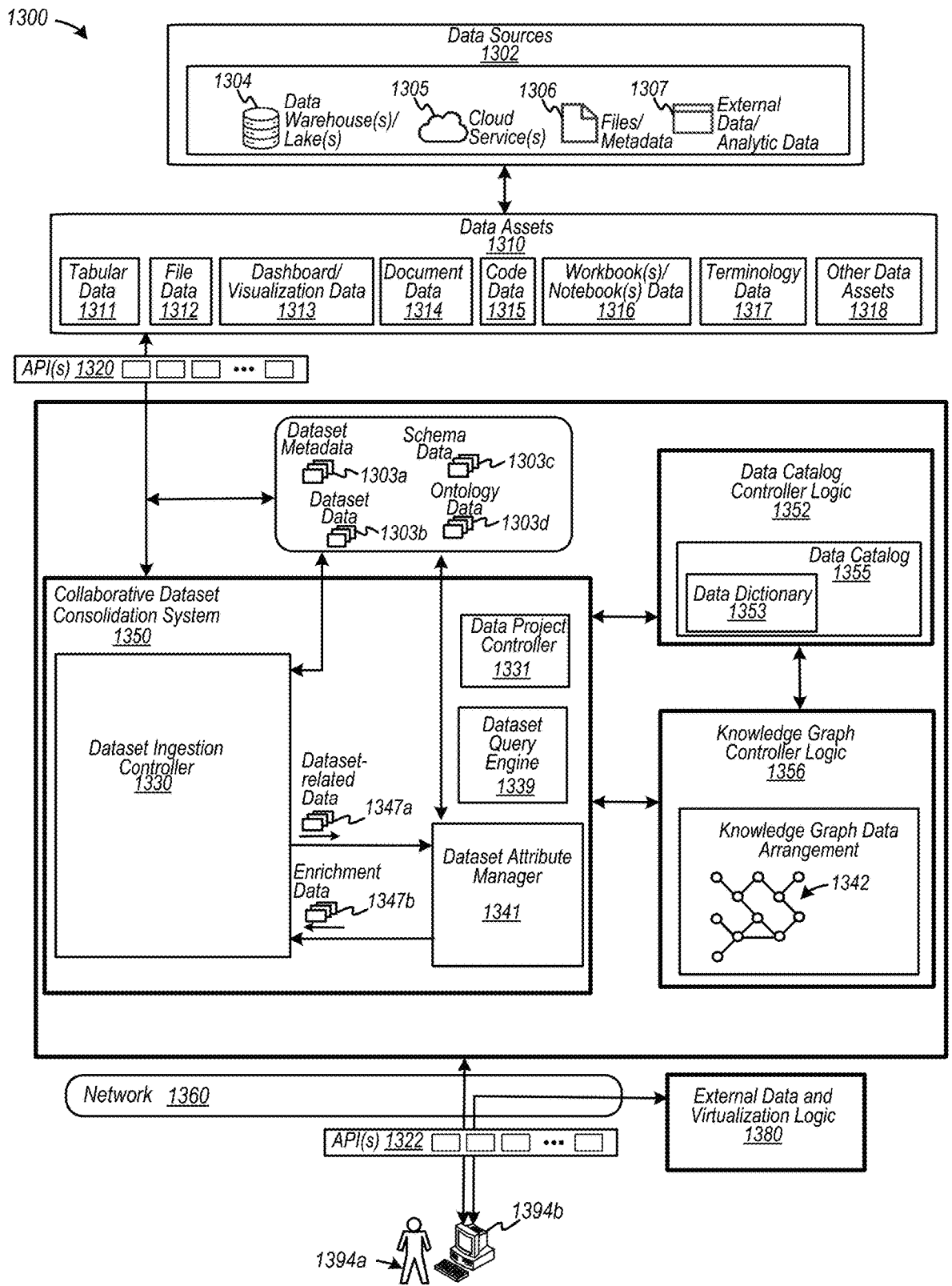
FIG. 13 depicts an example of a data catalog and a knowledge graph implement as a cloud-based service, according to some examples.

As shown, collaborative dataset consolidation system application layer 450 may include (or may be layered upon) an application layer 440 that includes logic constituting a data catalog application layer 441, which is optional and referenced in FIG. 13, a metadata profile layer 442, a knowledge graph application layer 443, a dataset ingestion controller layer 424, and a dataset attribute manager layer 426. In various examples, layers 424, 426, 441, 442, 443, and 450 may include logic to implement the various functionalities described herein. In some examples, metadata profile layer 442 may be configured to provide metadata management logic to extract, identify, derive, and/or implement technical, business, and other portions of data as layered data. In at least one example, metadata profile layer 442 may be configured to identify, classify and generate metadata (e.g., as layered data or otherwise) as set forth in U.S. patent application Ser. No. 15/454,969 (DAT-012) filed on Mar. 9, 2017 and titled "INTERACTIVE INTERFACES TO PRESENT DATA ARRANGEMENT OVERVIEWS AND SUMMARIZED DATASET ATTRIBUTES FOR COLLABORATIVE DATASETS," which is incorporated by reference.

Any of the described layers of FIG. 4 or any other processes described herein in relation to other figures may be implemented as software, hardware, firmware, circuitry, or a combination thereof. If implemented as software, the described techniques may be implemented using various types of programming, development, scripting, or formatting languages, frameworks, syntax, applications, protocols, objects, or techniques, including, but not limited to, Python™, ASP, ASP.net, .Net framework, Ruby, Ruby on Rails, C, Objective C, C++, C#, Adobe® Integrated Runtime™ (Adobe® AIR™) ActionScript™, Flex™, Lingo™, Java™, JSON, Javascript™, Ajax, Perl, COBOL, Fortran, ADA, XML, MXML, HTML, DHTML, XHTML, HTTP, XMPP, PHP, and others, including SQL™, SPARQL™, Turtle™, etc., as well as any proprietary application and software provided or developed by data.world, Inc., of Austin Texas, U.S.A., or the like. The above-described techniques may be varied and are not limited to the embodiments, examples or descriptions provided.

Figure 5:
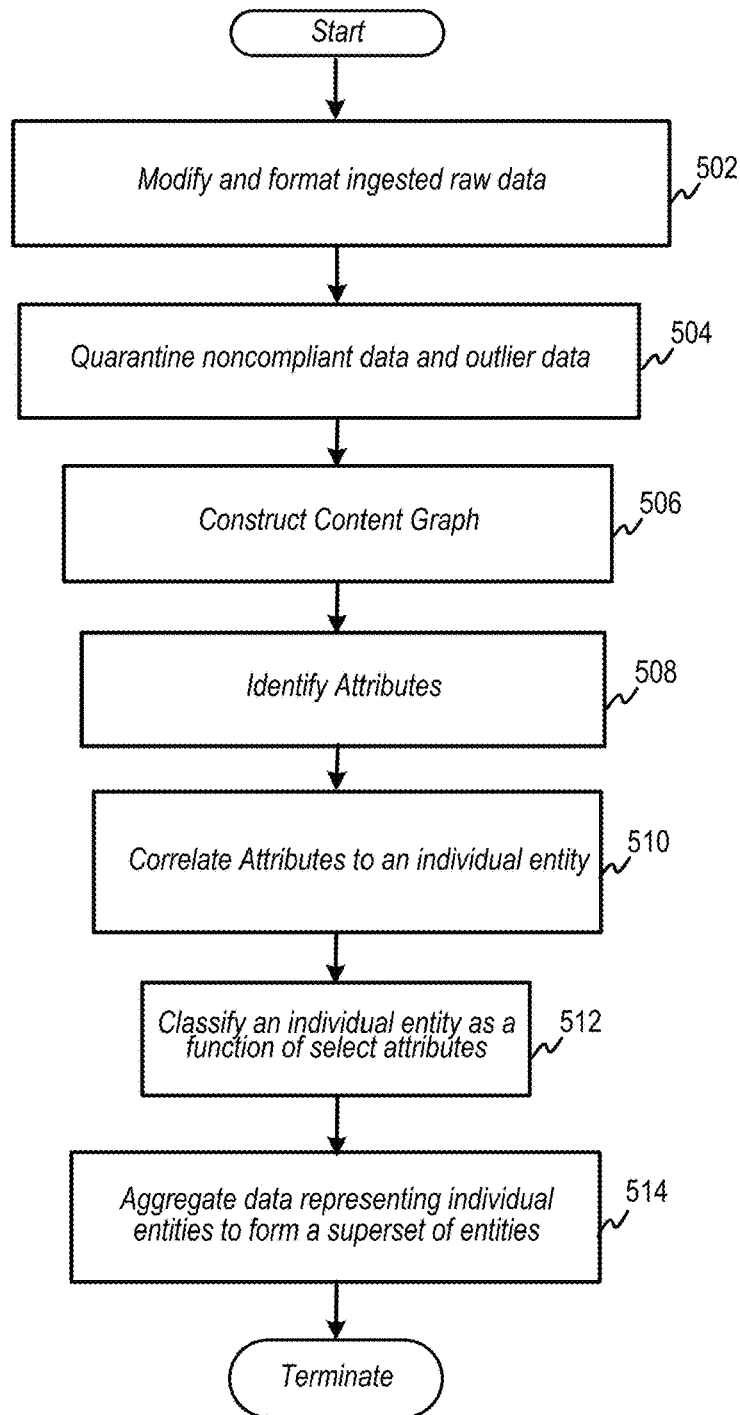
FIG. 5 is a flow diagram as an example of analyzing parallelized data formatted as graph-based data with correlated data attributes to consolidate observation data to form content graph portions, according to some embodiments.

FIG. 5 is a flow diagram as an example of analyzing parallelized data formatted as graph-based data with correlated data attributes to consolidate observation data to form content graph portions, according to some embodiments. Flow 500 is an example of aggregating or consolidating observation data to identify individual entities and supersets of individual entities in accordance with various examples described herein.

At 502, parallelized data may be received from multiple disparate data sources in a computing system that includes multiple processors configured to facilitate massively parallel processing to extract attribute data to analyze and correlate data values associated with various units of attribute data in parallel. Further, raw data that may be ingested as parallelized data may be modified to remediate (e.g., "clean" and "prepare") ingested data to be formatted or referenced as graph-based data in an arrangement of graph data, such as a knowledge graph. Remediation of data may be performed in accordance with rules or a set of predictively compliant data thresholds to identify valid data. As an example, data representing a state of Texas may be modified or normalized to reflect an alternative representation of TX. Further, data issues can be detected and corrected based on a lexical structure. Examples may include trimming quotes and leading/trailing whitespace(s), and correcting field misuse errors, such as modifying data fields first name and last name to correct for an invalid last name. For example, data fields {firstName: "John Smith" and lastName: "OCCUPANT"} may be modified to reflect data fields {firstName: "John" and lastName: "Smith"}, thereby removing "occupant" as an erroneous last name of an entity.

At 504, data representing a subset of parallelized data may be classified to identify observation data, such as a class or type of observation data. In some examples, data that may not comply with rules (e.g., based on conformance to an ontology, semantic-defined data, a data dictionary, a glossary, etc.) to determine noncompliant data or outlier data, which may be quarantined for further processing to, for example, generate a repair graph with which to integrate subsequently with a data arrangement on an enriched graph. In some examples, data records of individual entities may be quarantined if data includes (1) an absence of a first name and a last name, (2) addresses that do not conform postal standards (e.g., invalid zip codes and state identifiers), (3) email addresses that do not conform to an "id@domain.tld" format, (4) telephone numbers that do not conform with a country's standards (e.g., a U.S. phone number that does not include 10 digits), (5) blacklisted data references, and (6) other non-compliant data. Further at 504, overly-matched or overly-correlated data may be deemed as outliers that may complicate resolution of an identity of an entity, and thus may be quarantined or discarded. For example, residential addresses, email addresses, phone number and customer numbers that are linked to a large number of observation fingerprints, such as 1,000 instances, may be refer to an organization or a group of individual entities. Hence, such data may be of little or negligible value to determine an identity of a specific entity, such as an individual person, and may be quarantined or discarded (e.g., into a repair graph to receive subsequent processing to determine whether the associated data may be included to enrich an arrangement of graph data).

At 506, one or more content graphs in a graph data format may be constructed based on, for example, a class of observation data and one or more entity attributes, such as a name, an address, and other attribute data. A unit of observation data may be referred to as "observation fingerprint," which may be an electronically digital fingerprint, or a portion thereof, associated with an entity.

At 508, data representing one or more entity attributes associated with observation data may be identified based on any number of sources. For example, a predictive data classifier or an attribute correlator may be configured to identify a set of terms (e.g., in a data dictionary) with which to search parallelized data or converted graph-based data. Identified attribute data may be linked or otherwise associated with a unit of observation data.

At 510, a subset of parallelized data may be correlated to other subsets of the parallelized data associated with a class or unit of observation data to form correlated subsets of parallelized data. For example, each data value associated with a corresponding attribute may be used to correlate, match, or otherwise detect equivalent units of attribute data associated with other units of observation data (e.g., other digital observation fingerprints). Data values of attribute data may be matched against other data values of other attribute data by an attribute correlator configured to identify and correlate patterns of data. According to some examples, correlation of subsets of parallelized data or associated attribute data values may include forming adjacency nodes linked to units of attributes in a content graph (e.g., a sub-graph). Multiple adjacency nodes may be linked together to cluster or aggregate similar or equivalent attribute data values that may constitute or relate to an individual entity. An adjacency node may be a portion of constructed content graph that connects or links an attribute (e.g., a name) and other indicator values (e.g., other attribute values) to capture data relationships comprehensively.

At 512, one or more units of observation data (and correlated attribute data) may be classified as an individual entity. For example, multiple units of observation data may be clustered together to form an enriched content graph that describes an individual entity, such as a person, a product, a service, or any other entity. In some implementations, correlated subsets of parallelized data may be clustered to identify an individual entity using data representing multiple adjacency node data linked together.

At 514, data representing multiple individual entities may be aggregated or clustered to form a set of entities based on correlated subsets of parallelized data. An individual entity may be aggregated or clustered with data representing other individual entities to form a group of clustered individual entities. For example, multiple individual entities may represent multiple persons having a familial relationship or a common geographic location (e.g., a household, a living unit, or a common residential address at which the entities reside).

In view of the foregoing, flow 500 may be configured to modify a graph data arrangement to enrich data stored in association with, for example, a knowledge graph.

Figure 6:
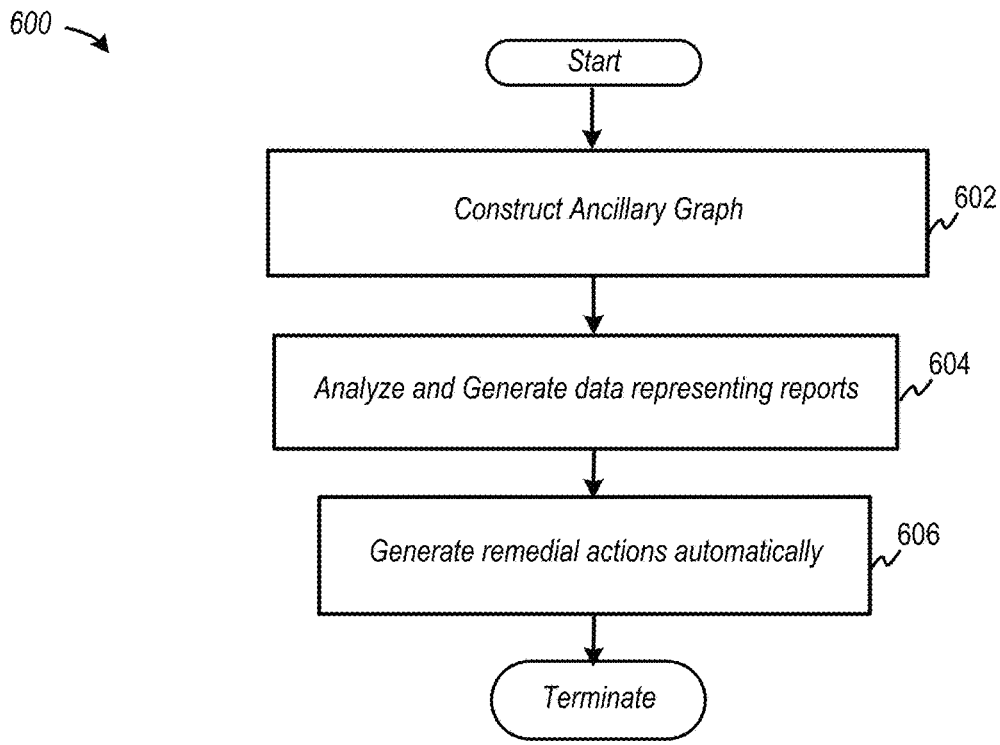
FIG. 6 is a flow diagram as an example of forming an ancillary graph to remediate data for integration into an enriched arrangement of graph data, according to some embodiments.

FIG. 6 is a flow diagram as an example of forming an ancillary graph to remediate data for integration into an enriched arrangement of graph data, according to some embodiments. Flow 600 may be initiated at 602, at which an ancillary graph may be constructed, whereby the ancillary graph may be referred to as a repair graph. In some examples, noncompliant data or outlier data, as described herein, may be quarantined in a repair graph for subsequent analysis to determine whether such data may be validated for inclusion into an enriched arrangement of graph data (e.g., a knowledge graph). At 604, data representing an ancillary graph or repair graph may be analyzed automatically to generate data representing an electronic report describing and characterizing noncompliant and outlier data with suggestions to resolve and validate such data. At 606, remedial actions may be generated automatically (e.g., at a collaborative dataset consolidation system) to transmute noncompliant and outlier data into valid data, which may be included in a knowledge graph.

Figure 7:
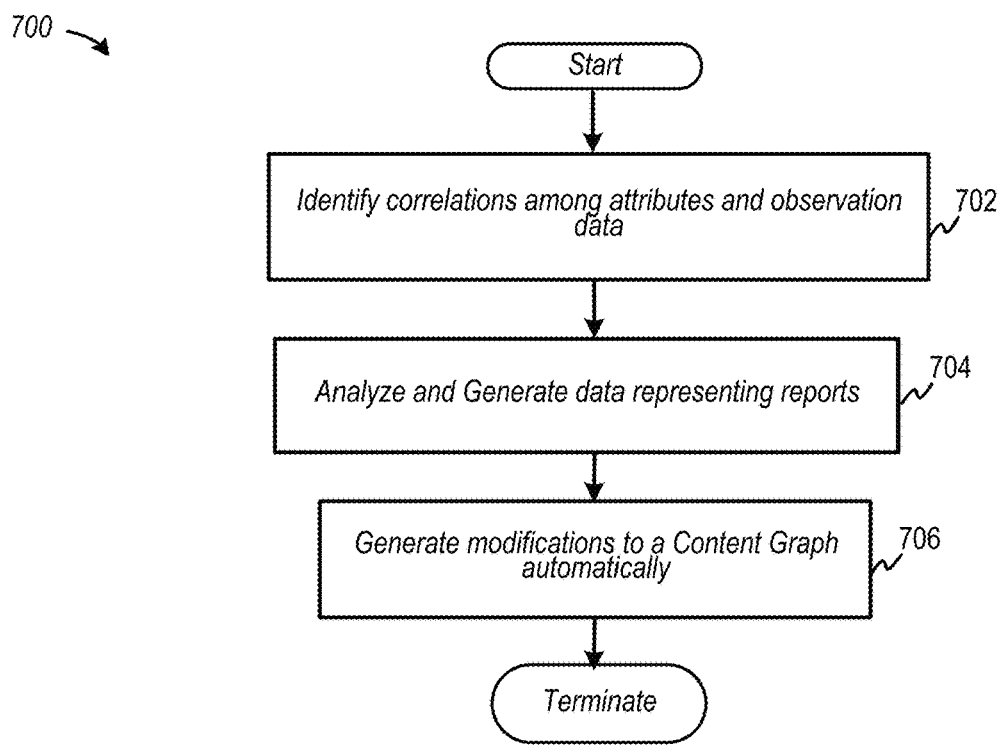
FIG. 7 is a flow diagram as an example of modifying the content graph for integration into an enriched arrangement of graph data, according to some embodiments.

FIG. 7 is a flow diagram as an example of modifying the content graph for integration into an enriched arrangement of graph data, according to some embodiments. Flow 700 may be initiated at 702, at which correlation among attribute data and observation data may be identified, as well as adjacency node data. At 704, data representing a content graph may be analyzed automatically to generate data representing an electronic report describing and characterizing data constituting a content graph. At 706, remedial actions may be generated automatically (e.g., at a collaborative dataset consolidation system) to modify a content graph, which may be integrated into a knowledge graph.

Figure 8:
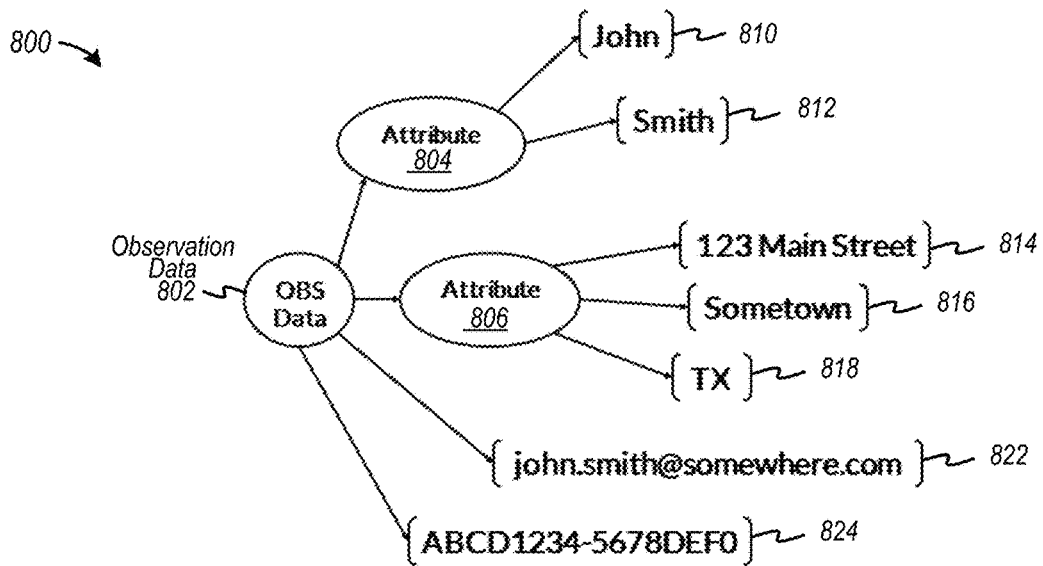
FIG. 8 depicts an example of a portion of a content graph, according to some examples.

FIG. 8 depicts an example of a portion of a content graph, according to some examples. Diagram 800 depicts attribute data 804 and 806 being associated with a unit of observation data 802. Attribute data 804 may represent name data, and may have attribute data values of 810 ("John") and 812 ("Smith"). Attribute data 806 may represent address data, and may include attribute values of 814 ("123 Main Street"), 816 (city of "Sometown"), and 818 (state of Texas, or "TX"). A unit of observation data 802 may also be linked to other attribute data, such as attribute data value 822 (e.g., an email address of "john.smith@somewhere.com") and attribute data value 824 (e.g., a customer number or identifier "ABCD1234-5678DEF0"). A dataset analyzer and/or an attribute correlator may be configured to correlate or match address nodes that may be used to resolve an identity of an entity, whereby some node data may be used to infer whether a subset of addresses may be semantically equivalent or similar. Further, attribute data values 804, 806, 822, and 824 may be used to match or correlate with other equivalent attribute data values to determine whether unit of observation data 802 may represent an identity of an entity as does other units of observation data. Such units of observation data may be aggregated to form a content graph.

Figure 9A:
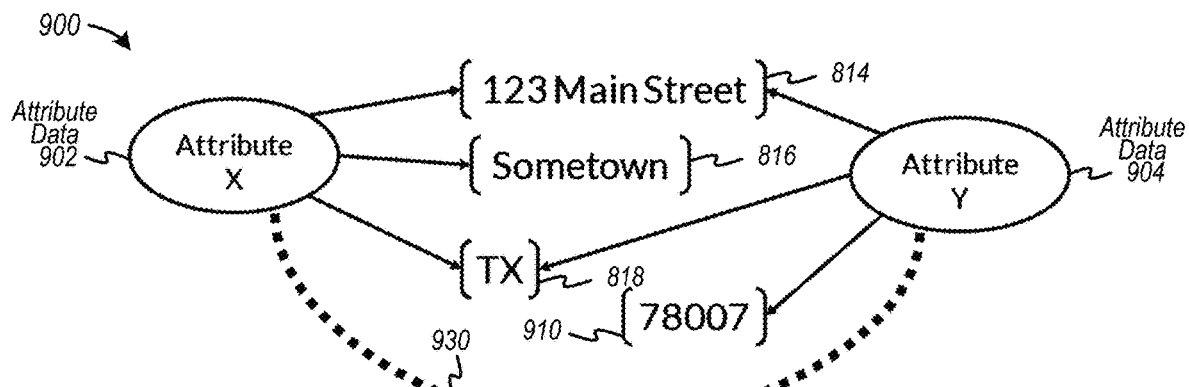
FIGS. 9A and 9B depict examples of correlating attribute data values to construct a content graph portion, at least in some examples.
Figure 9B:
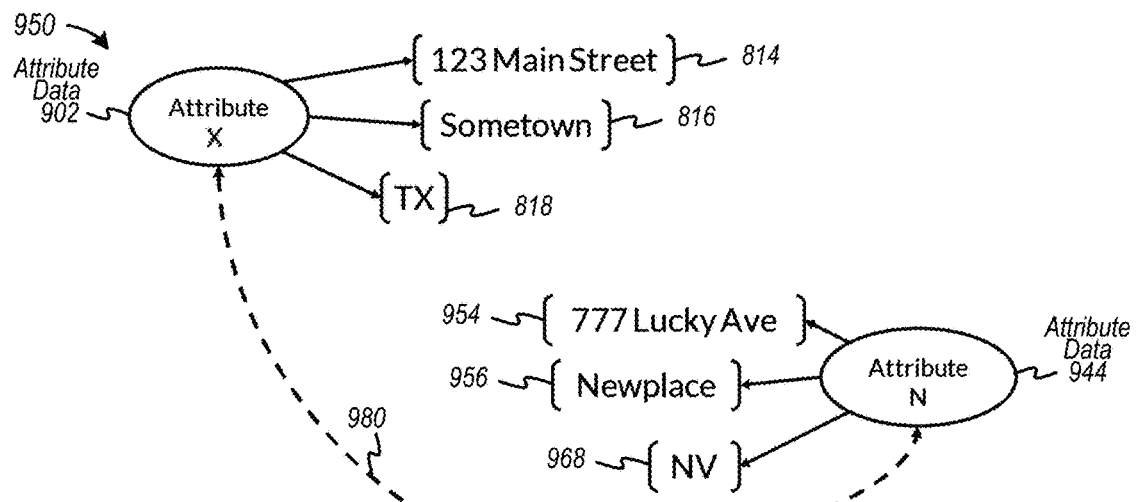

FIGS. 9A and 9B depict examples of correlating attribute data values to construct a content graph portion, at least in some examples. Diagram 900 of FIG. 9A depicts a first unit of attribute data 902 ("attribute X") as being linked to attribute data values 814, 816, and 818, whereas a second unit of attribute data 904 ("attribute Y") may include attribute data values 814, 818, and 910 (zip code of "78007"). A dataset analyzer and/or an attribute correlator (or any other component of a collaborative dataset consolidation system) may be configured to correlate attribute data 902 and 904 to form a data relationship or link 930 indicating attribute data 902 and 904 refer to an equivalent geographic location. Diagram 950 of FIG. 9B depicts a first unit of attribute data 902 associated with attribute data values 814, 816, and 818. Also, diagram 950 depicts a second unit of attribute data 944 ("attribute N") that may include attribute data values 954, 956, and 968. In some examples, a dataset analyzer and/or an attribute correlator (or any other component of a collaborative dataset consolidation system) may be configured to determine that an individual entity (e.g., a person) or a group of individual entities (e.g., a family) have been associated with attribute data 902 during a first period of time, but may be associated with attribute data 944 during a second period of time after moving from one geographic location to another geographic location.

Figure 10A:
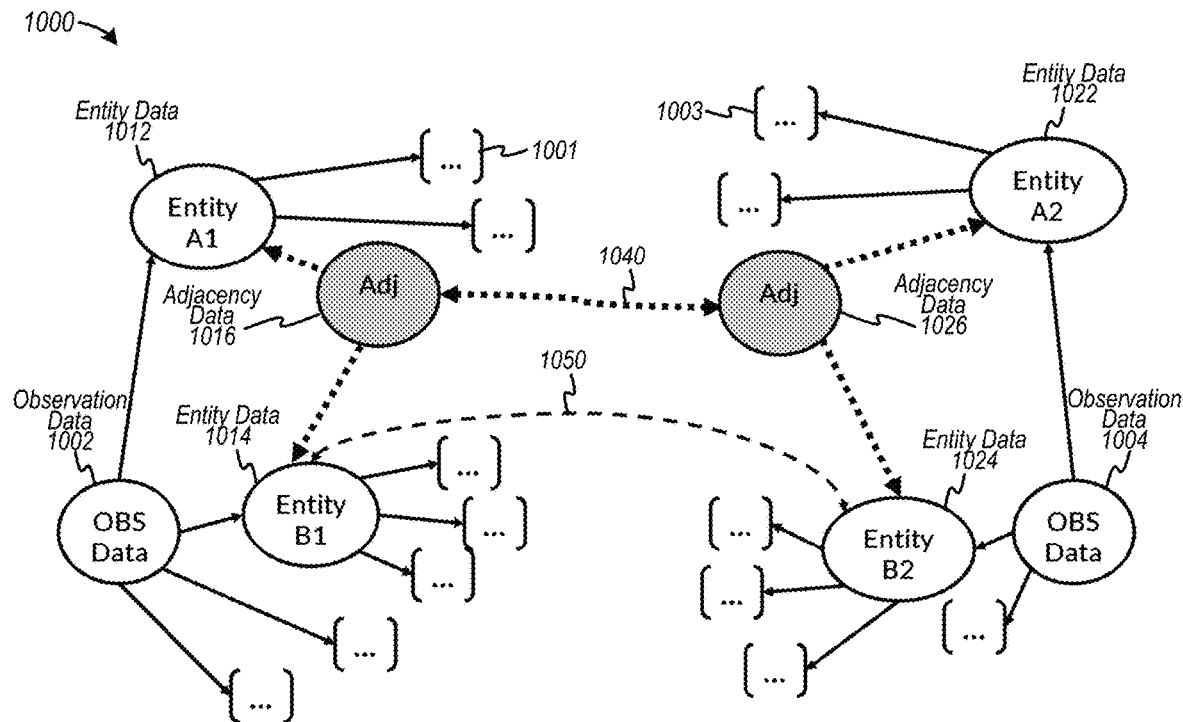
FIGS. 10A and 10B depict other examples of correlating attribute data values to construct a content graph portion, at least in some examples.
Figure 10B:
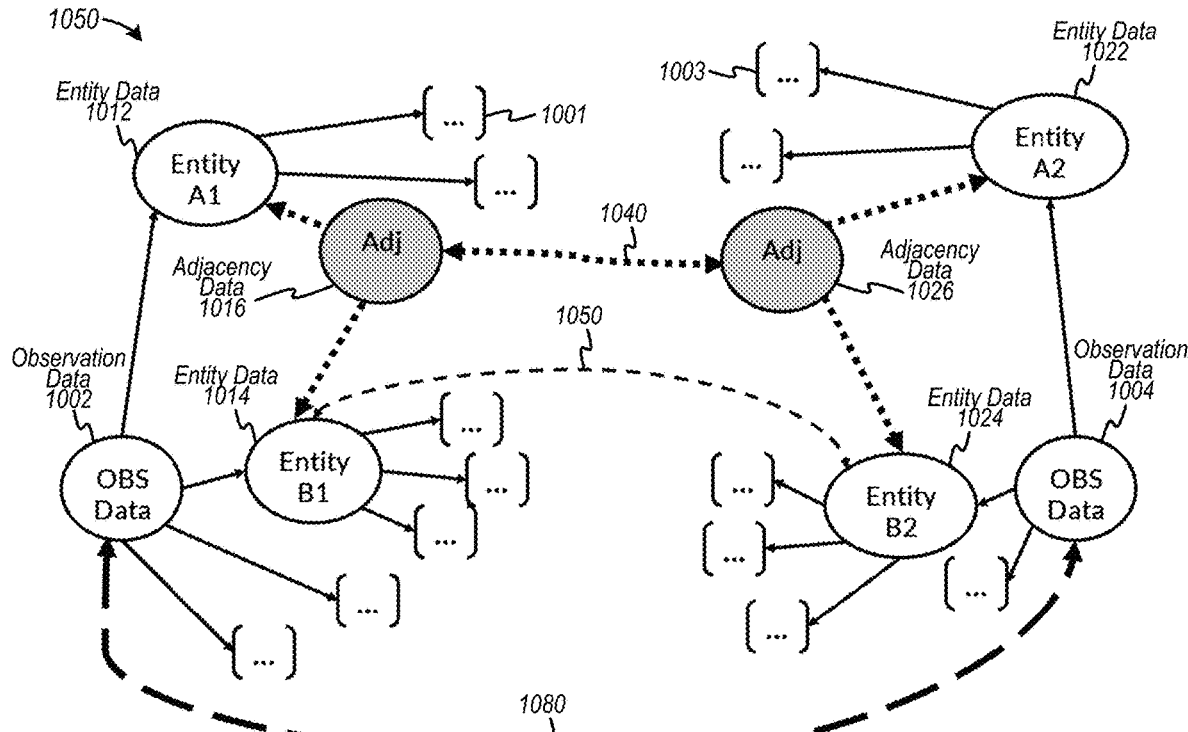

FIGS. 10A and 10B depict other examples of correlating attribute data values to construct a content graph portion, at least in some examples. Diagram 1000 depicts a first unit of observation data 1002, as an observation digital fingerprint, that may include entity attribute data 1012 (e.g., entity A1 may be data representing a name) having attribute data values 1001. The first unit of observation data 1002 may also include entity attribute data 1014 (e.g., entity B1 may be data representing an address), which associated attribute data values (shown as bracketed ellipses). Diagram 1000 also depicts a second unit of observation data 1004, as another observation digital fingerprint, that may include entity attribute data 1022 (e.g., entity A2 may be data representing a name) having attribute data values 1003. The second unit of observation data 1022 may also include entity attribute data 1024 (e.g., entity B2 may be data representing an address), which associated attribute data values (shown as bracketed ellipses). A dataset analyzer and/or an attribute correlator (or any other component of a collaborative dataset consolidation system) may be configured to correlate or match entity attribute data 1014 and 1024 via link 1050, and may be further configured to establish data representing adjacency nodes 1016 and 1026 that may be associated together via link 1040. As shown, adjacency node 1016 may be linked to entity data 1012 and 1014, and adjacency node 1026 may be linked to entity data 1022 and 1024.

Diagram 1050 depicts aggregation or clustering of observation data 1002 and 1004. For example, a dataset analyzer and/or an attribute correlator (or any other component of a collaborative dataset consolidation system) may be configured to form an association 1080 to specify that digital fingerprints of units of observation data 1002 and 1004 may resolve to represent an individual entity, such as a uniquely-identifiable person.

Figure 11A:
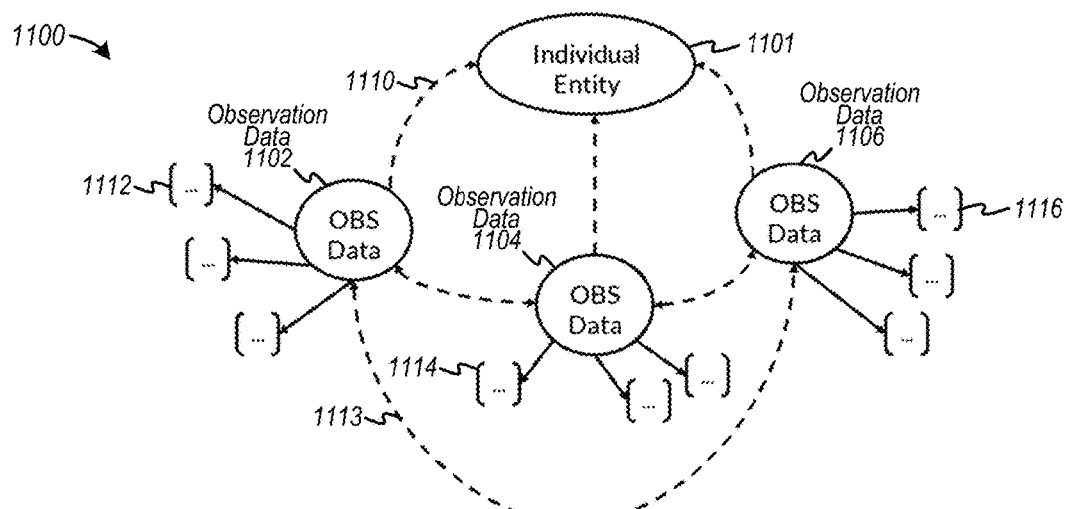
FIGS. 11A and 11B depict examples of clustering units of observation data of content graph portions to identify an individual entity, at least in some examples.
Figure 11B:
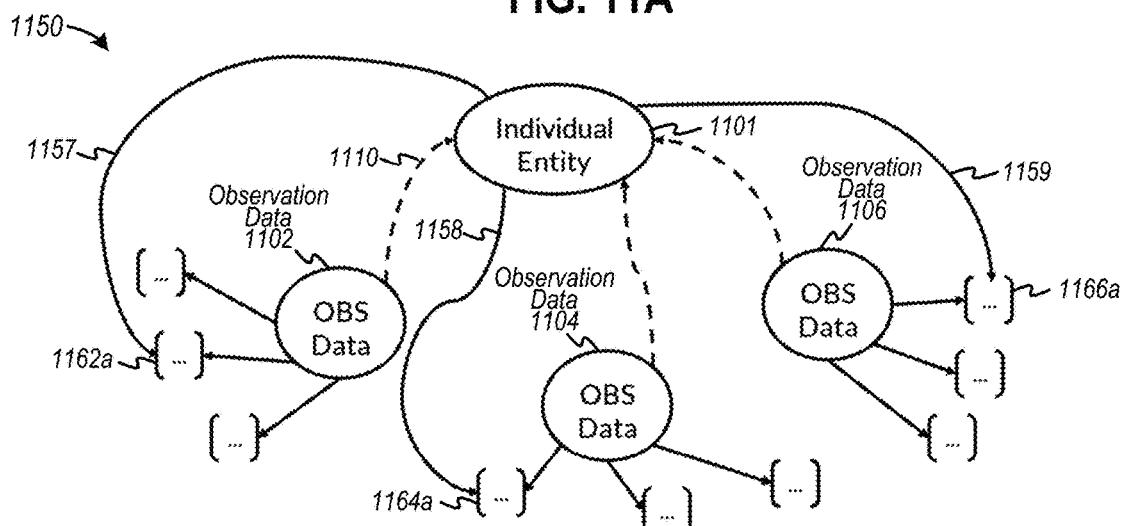

FIGS. 11A and 11B depict examples of clustering units of observation data of content graph portions to identify an individual entity, at least in some examples. Diagram 1100 of FIG. 11A depicts several units of observation data 1102, 1104, and 1106 associated with entity attribute data values 1112, 1114, and 1116, respectively. As shown in this example, a dataset analyzer and/or an attribute correlator (or any other component of a collaborative dataset consolidation system) may be configured to form associations among digital fingerprints representing observation data 1102, 1104, and 1106 to aggregate or clustering the associated data together to form links 1110 to establish data representing an individual entity 1101. As such, observation data 1102, 1104, and 1106 may be clustered to resolve an identity of an individual, such as a specific person, specific product, specific service, and the like. Diagram 1150 of FIG. 11B depicts identification of attribute data values via links 1157, 1158, and 1159 associated with individual entity 1101 that may more comprehensively describe individual entity 1101 than a single unit of observation data. As shown, individual entity 1101 may include attribute data values 1162, 1164*a*, and 1166*a* based on aggregation or clustering of units of observation data 1102, 1104, and 1106.

Figure 12:
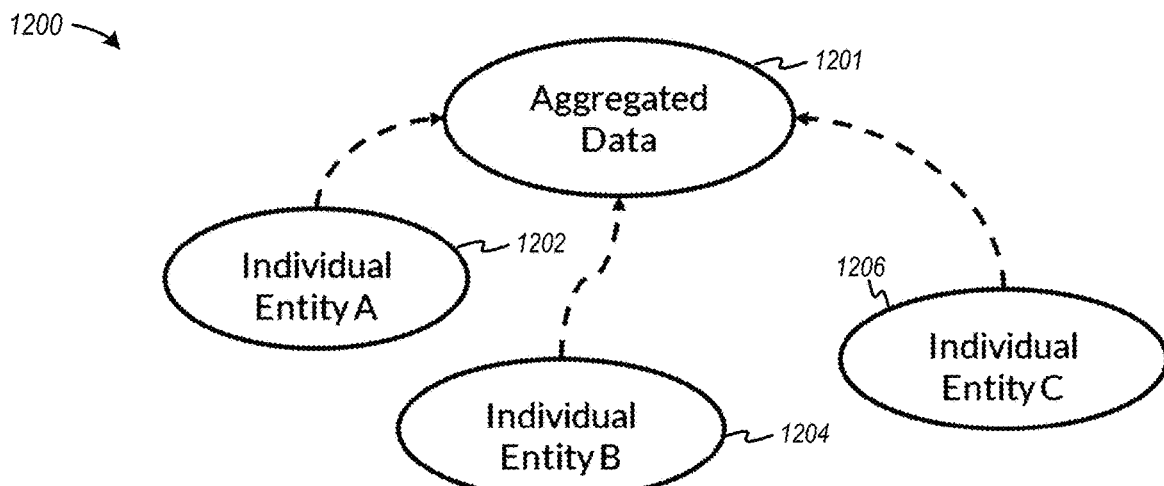
FIG. 12 depicts an example of data representing aggregating individual entities to form aggregated data, according to some examples.

FIG. 12 depicts an example of data representing aggregating individual entities to form aggregated data, according to some examples. Diagram 1200 illustrates clustering or aggregation of individual entities 1202, 1204, and 1206 to represent a hierarchical data relationship as aggregated data 1201. For example, individual entities 1202, 1204, and 1206 may represent three unique individuals who live together (e.g., as a family). Thus, aggregated data 1201 may represent the group of individual entities as, for example, a family.

FIG. 13 depicts an example of a data catalog and a knowledge graph implemented as a cloud-based service, according to some examples. Diagram 1300 depicts a computing system accessible via a network 1360 (e.g., the Internet) and application programming interfaces ("APIs") 1322 (or other data connectors). In this example, a computing system may include hardware (e.g., processors) and software to implement a collaborative dataset consolidation system 1350. In some cases, a user 1394*a* at a remote computing device 1394*b* may access a collaborative dataset consolidation system 1350 as a cloud-based service. Collaborative dataset consolidation system 1350 of FIG. 13 may include a dataset ingestion controller 1330 and a dataset attribute manager 1341 to exchange dataset-related data 1347*a* and enrichment data 1347*b*.

Diagram 1300 also depicts collaborative dataset consolidation system 1350 including or being configured to access data associated with data catalog controller logic 1352 to access, manage, and use a data catalog (e.g., an enterprise data catalog). Collaborative dataset consolation system 1350 may include or may be configured to access data associated with knowledge graph controller logic 1356 to access, manage, and use a knowledge graph data arrangement 1342.

Thus, knowledge graph data arrangement 1342 may be implemented as a knowledge graph-as-a-service (e.g., "KGaaS"). In some non-limiting examples, knowledge graph data arrangement 1342 may interact electronically with data catalog controller logic 1352 to form a network of concepts and semantic relationships describing data and metadata associated with the knowledge graph. Further, knowledge graph data arrangement 1342 may be configured to integrate knowledge, information, and data at a relatively large scale as a graph data model, whereby knowledge graph data arrangement 1342 may include nodes representing tables, columns, dashboards, reports, business terms, users, etc.

Collaborative dataset consolation system 1350 may access data locally or remotely at any data source, such as data sources 1302 that may be accessible via APIs 1320. Examples of such data may include dataset metadata 1303*a* (e.g., descriptor data or information specifying dataset attributes), dataset data 1303*b* (e.g., reference data stored locally or remotely to access data in any local or remote data storage, such as data in data sources 1302), schema data 1303*c* (e.g., sources, such as schema.org, that may provide various types and vocabularies, glossaries, data dictionaries, and the like), and ontology data 1303*d* from any suitable ontology and any other suitable types of data source. Elements depicted in diagram 1300 may include structures and/or functions as similarly-named or similarly-numbered elements depicted in other drawings.

Data sources 1302 may be configured to provide (e.g., external data) as data assets 1310. Data sources 1302 may include any data storage or data arrangement, such as a data warehouse or a data lake 1304, one or more cloud services 1305, one or more data files and metadata files 1306, and any other external data or analytic data 1307. Data assets 1310 may include tabular data 1311, any type of file data 1312, dashboard and/or visualization data 1313, document data 1314 (e.g., a PDF document), code data 1315 (e.g., a portion of Python code or code-generated data, or JSON code), workbooks and/or notebook data 1316 (e.g., a Jupyter notebook, etc.), terminology data 1317, and any other data assets 1318.

Collaborative dataset consolation system 1350 may include a data project controller 1331 that may be configured to provision and control a data project interface (not shown) as a computerized tools, or as controls for implementing computerized tools to procure, generate, manipulate, and share datasets, as well as to share query results and insights (e.g., conclusions or subsidiary conclusions) among any number of collaborative computing systems (and collaborative users of system 1350). In some examples, data project controller 1331 may be configured to provide computerized tools (or access thereto) to establish a data project, as well as invite collaboration and provide real-time (or near real-time) information as to insights to data analysis (e.g., conclusions) relating to a dataset or data project, as well as a data dictionary or glossary that may constitute at least a portion of data catalog 1355. Data project controller 1331 may be configured to identify a potential resolution, aim, goal, or hypothesis through, for example, application one or more queries against a dataset (e.g., canonical dataset). Data project controller 1331 may be configured to provide computerized tools (or access thereto) to provide an electronic "workspace" in which multiple datasets may be aggregated, analyzed (e.g., queried), and summarized through generation and publication of insights that may be integrated into knowledge graph data arrangement 1342. In view of the above, data project controller 1331 may be configured to control components of collaborative dataset consolidation system 1350 to provision computerized tools to facilitate interoperability of datasets (e.g., canonical datasets) with other datasets in different formats or with various external computerized analysis tools (e.g., via APIs 1322 and 1320), whereby external computerized analysis tools may be disposed external to collaborative dataset consolidation system 1350.

Examples of external computerized analysis tools include external statistical and visualization applications, such as Tableau®, that may be accessible as external data and visualization logic 1380. Further, data project controller 1331 may be configured to access, manage, build, and use data representing a data dictionary 1353 (e.g., a composite data dictionary), which may be managed electronically by data catalog controller logic 1352. In some examples, data representing data dictionary 1353 may be a subset of data representing a data catalog 1355. As data catalog 1355 may be disposed in a cloud-based computing system, data catalog 1355 may be referred to as a "data catalog-as-a-service," at least in some examples. In some non-limiting examples, a data catalog 1355 and/or a data dictionary 1353 may include data or code, or both, that may be configured to create (e.g., automatically), manage, modify, use descriptor data that may identify metadata associated with datasets that can be implemented to enrich a graph-based data arrangement (e.g., knowledge graph data arrangement 1342). An example of a data dictionary may be implemented as described in U.S. patent application Ser. No. 15/985,702, filed on May 22, 2018, now U.S. Pat. No. 11,068,475 and titled "COMPUTERIZED TOOLS TO DEVELOP AND MANAGE DATA-DRIVEN PROJECTS COLLABORATIVELY VIA A NETWORKED COMPUTING PLATFORM AND COLLABORATIVE DATASETS," which is hereby incorporated by reference.

Dataset query engine 1339 may be configured to receive a query (e.g., from computing device 1394*b*) to apply against a combined dataset, which may include at least a portion of knowledge graph data arrangement 1342. In some examples, a query may be implemented as either a relational-based query (e.g., in an SQL-equivalent query language) or a graph-based query (e.g., in a SPARQL-equivalent query language). Further, a query may be implemented as either an implicit federated query or an explicit federated query.

According to some examples, dataset query engine 1339 may be configured to access data associated with knowledge graph data arrangement 1342 as atomized datasets that may be formed as triples compliant with an RDF specification. Further, knowledge graph data arrangement 1342 may be stored in one or more repositories, at least one of which may be a database storage device formed as a "triplestore." Note that in some cases, data referenced to knowledge graph data arrangement 1342 may also be of any data format, such as CSV, JSON, XML, XLS, MySQL, binary, RDF, or other similar or suitable data formats. Other formats may include N-Triples, JSON-LD, RDF/XML, and the like.

Figure 14:
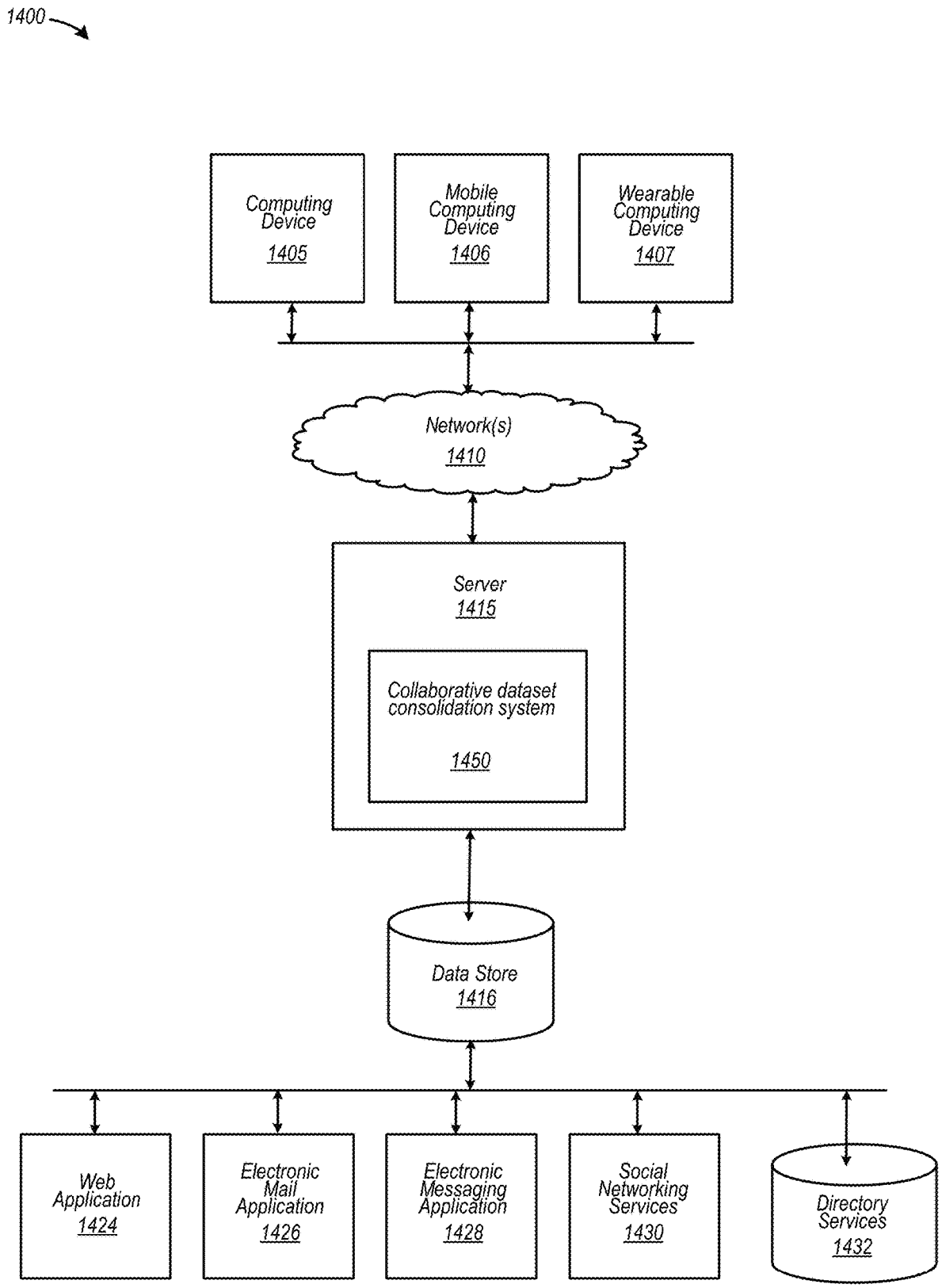
FIG. 14 depicts an example of a system architecture configured to correlate subsets of parallelized data from disparately-formatted data sources to identify entity data based on aggregated or clustered content graph data portions, according to an example.

FIG. 14 depicts an example of a system architecture configured to correlate subsets of parallelized data from disparately-formatted data sources to identify entity data based on aggregated or clustered content graph data portions, according to an example. Data constituting executable instructions (e.g., remote applications) and other content, such as text, video, audio, etc. may be stored in (or exchanged with) various communication channels or storage devices. For example, various units of message data or content may be stored using one or more of a web application 1424 (e.g., a public data source, such as a news aggregation web site), an email application service 1426, an electronic messaging application 1428 (e.g., a texting or messenger application), social networking services 1430 and a services platform and repository 1432 (e.g., cloud computing services provided by Google® cloud platform, an AWS® directory service provided by Amazon Web Services, Inc., or any other platform service). A server 1415 may implement a collaborative dataset consolidation system application 1450 to perform various functionalities as described herein. As an example, server 1415 may be a web server providing the applications 1450 via networks 1410. As an example, a client computing device may be implemented and/or embodied in a computer device 1405, a mobile computing device 1406 (e.g., a smart phone), a wearable computing device 1407, or other computing device. Any of these client computing devices 1405 to 1407 may be configured to transmit electronic messages and content (e.g., as electronic text or documents, video content, audio content, or the like) from data store 1416, and may be configured to receive content (e.g., other electronic content), whereby collaborative dataset consolidation system application 1450 may be configured to correlate subsets of parallelized data from disparately-formatted data sources to identify entity data based on aggregated or clustered content graph data portions.

Figure 15:
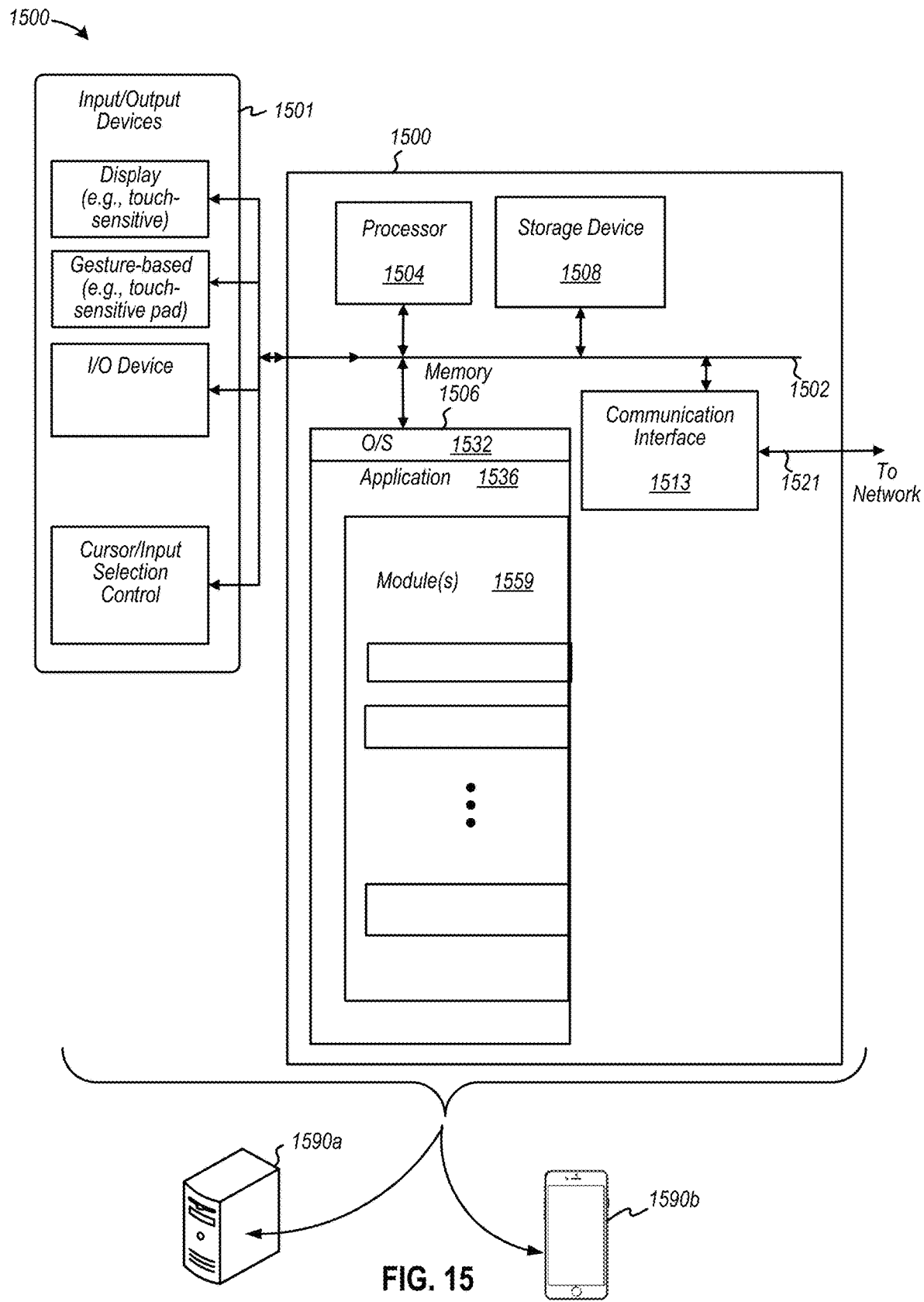
FIG. 15 illustrates examples of various computing platforms configured to provide various functionalities to components of a computing platform configured to provide functionalities described herein.

FIG. 15 illustrates examples of various computing platforms configured to provide various functionalities to components of a computing platform 1500 configured to provide functionalities described herein. Computing platform 1500 may be used to implement computer programs, applications, methods, processes, algorithms, or other software, as well as any hardware implementation thereof, to perform the above-described techniques.

In some cases, computing platform 1500 or any portion (e.g., any structural or functional portion) can be disposed in any device, such as a computing device 1590*a*, mobile computing device 1590*b*, and/or a processing circuit in association with initiating any of the functionalities described herein, via user interfaces and user interface elements, according to various examples.

Computing platform 1500 includes a bus 1502 or other communication mechanism for communicating information, which interconnects subsystems and devices, such as processor 1504, system memory 1506 (e.g., RAM, etc.), storage device 1508 (e.g., ROM, etc.), an in-memory cache (which may be implemented in RAM 1506 or other portions of computing platform 1500), a communication interface 1513 (e.g., an Ethernet or wireless controller, a Bluetooth controller, NFC logic, etc.) to facilitate communications via a port on communication link 1521 to communicate, for example, with a computing device, including mobile computing and/or communication devices with processors, including database devices (e.g., storage devices configured to store atomized datasets, including, but not limited to triplestores, etc.). Processor 1504 can be implemented as one or more graphics processing units ("GPUs"), as one or more central processing units ("CPUs"), such as those manufactured by Intel® Corporation, or as one or more virtual processors, as well as any combination of CPUs and virtual processors. Or, a processor may include a Tensor Processing Unit ("TPU"), or equivalent. Computing platform 1500 exchanges data representing inputs and outputs via input-and-output devices 1501, including, but not limited to, keyboards, mice, audio inputs (e.g., speech-to-text driven devices), user interfaces, displays, monitors, cursors, touch-sensitive displays, touch-sensitive input and outputs (e.g., touch pads), LCD or LED displays, and other I/O-related devices.

Note that in some examples, input-and-output devices 1501 may be implemented as, or otherwise substituted with, a user interface in a computing device associated with, for example, a user account identifier in accordance with the various examples described herein.

According to some examples, computing platform 1500 performs specific operations by processor 1504 executing one or more sequences of one or more instructions stored in system memory 1506, and computing platform 1500 can be implemented in a client-server arrangement, peer-to-peer arrangement, or as any mobile computing device, including smart phones and the like. Such instructions or data may be read into system memory 1506 from another computer readable medium, such as storage device 1508. In some examples, hard-wired circuitry may be used in place of or in combination with software instructions for implementation. Instructions may be embedded in software or firmware. The term "computer readable medium" refers to any tangible medium that participates in providing instructions to processor 1504 for execution. Such a medium may take many forms, including but not limited to, non-volatile media and volatile media. Non-volatile media includes, for example, optical or magnetic disks and the like. Volatile media includes dynamic memory, such as system memory 1506.

Known forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can access data. Instructions may further be transmitted or received using a transmission medium. The term "transmission medium" may include any tangible or intangible medium that is capable of storing, encoding or carrying instructions for execution by the machine, and includes digital or analog communications signals or other intangible medium to facilitate communication of such instructions. Transmission media includes coaxial cables, copper wire, and fiber optics, including wires that comprise bus 1502 for transmitting a computer data signal.

In some examples, execution of the sequences of instructions may be performed by computing platform 1500. According to some examples, computing platform 1500 can be coupled by communication link 1521 (e.g., a wired network, such as LAN, PSTN, or any wireless network, including WiFi of various standards and protocols, Bluetooth®, NFC, Zig-Bee, etc.) to any other processor to perform the sequence of instructions in coordination with (or asynchronous to) one another. Computing platform 1500 may transmit and receive messages, data, and instructions, including program code (e.g., application code) through communication link 1521 and communication interface 1513. Received program code may be executed by processor 1504 as it is received, and/or stored in memory 1506 or other non-volatile storage for later execution.

In the example shown, system memory 1506 can include various modules that include executable instructions to implement functionalities described herein. System memory 1506 may include an operating system ("O/S") 1532, as well as an application 1536 and/or logic module(s) 1559. In the example shown in FIG. 15, system memory 1506 may include any number of modules 1559, any of which, or one or more portions of which, can be configured to facilitate any one or more components of a computing system (e.g., a client computing system, a server computing system, etc.) by implementing one or more functions described herein.

The structures and/or functions of any of the above-described features can be implemented in software, hardware, firmware, circuitry, or a combination thereof Note that the structures and constituent elements above, as well as their functionality, may be aggregated with one or more other structures or elements. Alternatively, the elements and their functionality may be subdivided into constituent sub-elements, if any. As software, the above-described techniques may be implemented using various types of programming or formatting languages, frameworks, syntax, applications, protocols, objects, or techniques. These can be varied and are not limited to the examples or descriptions provided.

In some embodiments, modules 1559 of FIG. 15, or one or more of their components, or any process or device described herein, can be in communication (e.g., wired or wirelessly) with a mobile device, such as a mobile phone or computing device, or can be disposed therein.

In some cases, a mobile device, or any networked computing device (not shown) in communication with one or more modules 1559 or one or more of its/their components (or any process or device described herein), can provide at least some of the structures and/or functions of any of the features described herein. As depicted in the above-described figures, the structures and/or functions of any of the above-described features can be implemented in software, hardware, firmware, circuitry, or any combination thereof. Note that the structures and constituent elements above, as well as their functionality, may be aggregated or combined with one or more other structures or elements. Alternatively, the elements and their functionality may be subdivided into constituent sub-elements, if any. As software, at least some of the above-described techniques may be implemented using various types of programming or formatting languages, frameworks, syntax, applications, protocols, objects, or techniques. For example, at least one of the elements depicted in any of the figures can represent one or more algorithms. Or, at least one of the elements can represent a portion of logic including a portion of hardware configured to provide constituent structures and/or functionalities.

For example, modules 1559 or one or more of its/their components, or any process or device described herein, can be implemented in one or more computing devices (i.e., any mobile computing device, such as a wearable device, such as a hat or headband, or mobile phone, whether worn or carried) that include one or more processors configured to execute one or more algorithms in memory. Thus, at least some of the elements in the above-described figures can represent one or more algorithms. Or, at least one of the elements can represent a portion of logic including a portion of hardware configured to provide constituent structures and/or functionalities. These can be varied and are not limited to the examples or descriptions provided.

As hardware and/or firmware, the above-described structures and techniques can be implemented using various types of programming or integrated circuit design languages, including hardware description languages, such as any register transfer language ("RTL") configured to design field-programmable gate arrays ("FPGAs"), application-specific integrated circuits ("ASICs"), multi-chip modules, or any other type of integrated circuit. For example, modules 1559 or one or more of its/their components, or any process or device described herein, can be implemented in one or more computing devices that include one or more circuits. Thus, at least one of the elements in the above-described figures can represent one or more components of hardware. Or, at least one of the elements can represent a portion of logic including a portion of a circuit configured to provide constituent structures and/or functionalities.

According to some embodiments, the term "circuit" can refer, for example, to any system including a number of components through which current flows to perform one or more functions, the components including discrete and complex components. Examples of discrete components include transistors, resistors, capacitors, inductors, diodes, and the like, and examples of complex components include memory, processors, analog circuits, digital circuits, and the like, including field-programmable gate arrays ("FPGAs"), application-specific integrated circuits ("ASICs"). Therefore, a circuit can include a system of electronic components and logic components (e.g., logic configured to execute instructions, such that a group of executable instructions of an algorithm, for example, and, thus, is a component of a circuit). According to some embodiments, the term "module" can refer, for example, to an algorithm or a portion thereof, and/or logic implemented in either hardware circuitry or software, or a combination thereof (i.e., a module can be implemented as a circuit). In some embodiments, algorithms and/or the memory in which the algorithms are stored are "components" of a circuit. Thus, the term "circuit" can also refer, for example, to a system of components, including algorithms. These can be varied and are not limited to the examples or descriptions provided.

Figure 16:
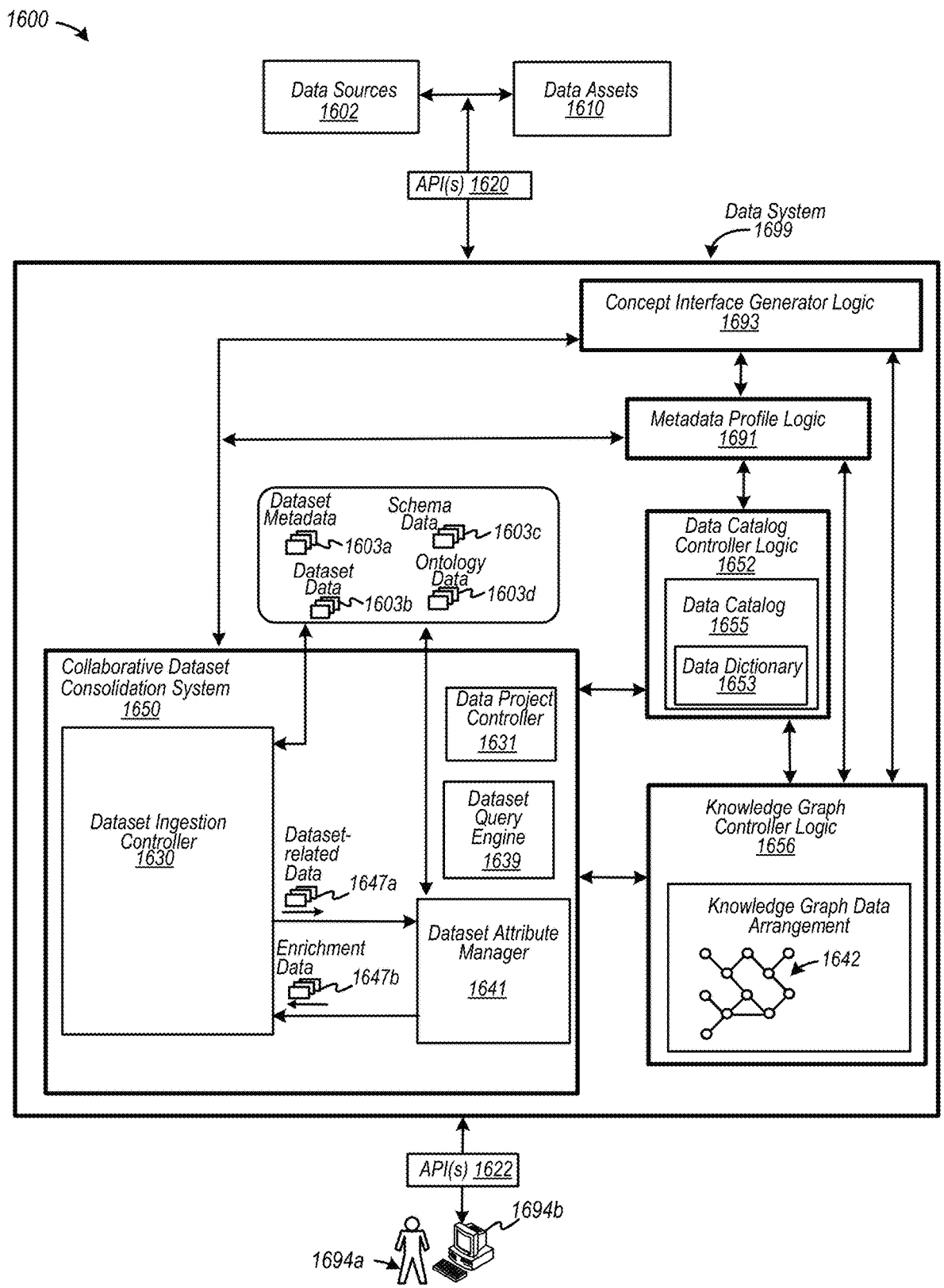
FIG. 16 depicts another example of a data catalog and a knowledge graph implemented as a cloud-based service, according to some examples.

FIG. 16 depicts another example of a data catalog and a knowledge graph implemented as a cloud-based service, according to some examples. Diagram 1600 depicts a computing data system 1699 accessible via application programming interfaces ("APIs") 1620 and 1622 (or other data connectors). A data connector may include code to implement an interface to create connections (e.g., virtual connections) that can be used to access catalog metadata and remote data from any data resource or data source. In the example shown, a computing data system 1699 may include hardware (e.g., processors, such as CPUs, GPUs, TPUs, and the like) and software (e.g., computer-implemented methods), or any combination thereof, to implement a collaborative dataset consolidation system 1650. Collaborative dataset consolidation system 1650 may access data locally or remotely at any data source, such as data sources 1602 that may be accessible via APIs 1620. Examples of such data may include dataset metadata 1603$a$ (e.g., descriptor data or information specifying dataset attributes), dataset data 1603$b$ (e.g., reference data stored locally or remotely to access data (e.g., raw data) in any local or remote data storage, such as data in data sources 1602), schema data 1603$c$ (e.g., sources, such as schema.org, that may provide various types and vocabularies, glossaries, data dictionaries, and the like), ontology data 1603$d$ from any suitable ontology and any other suitable types of data sources, or any other type of data from any data source 1602.

Data sources 1602 may include any data storage or data arrangement, such as a data warehouse, a data lake, one or more cloud services, one or more data files, one or more metadata files, and any other data or analytic data. Data assets 1610 may include tabular data (e.g. relational data, tabular formatted data, etc., any of which may linked to a graph data arrangement), as well as any type of file data in any data format, any type of dashboard and/or visualization data, any type of document data (e.g., a PDF document), any type of code data (e.g., a portion of Python code or code-generated data, JSON code, etc.), any type of workbook and/or notebook data (e.g., a Jupyter notebook, etc.), any type of terminology data, and any other type of data asset. Examples of data sources 1602 and data 1610 are described in FIG. 13. In some examples, data need not be received as parallelized data. Data described in FIG. 16 in association with collaborative dataset consolidation system 1650 can be received or transmitted in accordance with any electronic data communication protocol.

Referring to FIG. 16, a user 1694a at a remote computing device 1694b may access a collaborative dataset consolidation system 1650 as a cloud-based service via APIs 1622, whereby one or more of its components may be distributed physically anywhere and communicatively coupled to form, among other things, a data system 1699. One or more elements depicted in diagram 1600 of FIG. 16 may include structures and/or functions as similarly-named or similarly-numbered elements depicted in other drawings, or as otherwise described herein, in accordance with one or more examples, such as described relative to any figure or description herein including FIG. 13.

Collaborative dataset consolidation system 1650 of FIG. 16 may include a dataset ingestion controller 1630 and a dataset attribute manager 1641 to exchange dataset-related data 1647a and enrichment data 1647b, each of which may be configured to include structures and methods to perform functionalities as described herein, or otherwise incorporated by reference. Diagram 1600 also depicts collaborative dataset consolidation system 1650 including, or being configured to access, data associated with data catalog controller logic 1652 to access, manage, and use a data catalog (e.g., an enterprise data catalog). In some examples, a data catalog may be configured to implement a data arrangement (e.g., a graph-based data arrangement) based on a metadata profile data file, which may include various types of data attributes, data properties, and any other type of data that may be similar or equivalent to metadata). Collaborative dataset consolation system 1650 may include or may be configured to access data associated with knowledge graph controller logic 1656 to access, manage, and use a knowledge graph data arrangement 1642. As such, knowledge graph data arrangement 1642 may be implemented as a knowledge graph-as-a-service (e.g., "KGaaS"), such as a cloud-based KGaaS. In some non-limiting examples, knowledge graph data arrangement 1642 may interact electronically with data catalog controller logic 1652 to identify, manage, derive, and form linked concepts, entities, and semantic relationships that may describe data and metadata (e.g., layered data) associated with a knowledge graph. Further, knowledge graph data arrangement 1642 may be configured to integrate knowledge, information, and data at a relatively large scale as a graph data model, whereby knowledge graph data arrangement 1642 may include nodes representing tables, columns, dashboards, reports, business terms, users, etc., or any other layered data, such as metadata, that describes underlying graph-based data that may, for example, be mapped to tabular data formats (e.g., rows and columns), among other things.

Collaborative dataset consolation system 1650 may include a data project controller 1631 that may be configured to provision and control a data project interface (not shown) as a computerized tools, or as controls for implementing computerized tools to procure, generate, manipulate, and share datasets, as well as to share query results and insights (e.g., conclusions or subsidiary conclusions) among any number of collaborative computing systems (and collaborative users of system 1650). In some examples, data project controller 1631 may be configured to provide computerized tools (or access thereto) to establish a data project, as well as invite collaboration and provide real-time (or near real-time) information as to insights to data analysis (e.g., conclusions) relating to a dataset or data project, as well as a data dictionary or glossary that may constitute at least a portion of data catalog 1655, any of which may be transmitted or shared electronically via, for example, an activity feed portion of a user interface. Data project controller 1631 may be configured to identify a potential resolution, aim, goal, or hypothesis through, for example, application one or more queries against a dataset (e.g., a canonical dataset). Data project controller 1631 may be configured to provide computerized tools (or access thereto) to provide an electronic "workspace" in which multiple datasets may be aggregated, analyzed (e.g., queried manually or automatically), and summarized through generation and publication of insights that may be integrated into knowledge graph data arrangement 1642.

Dataset query engine 1639 may be configured to receive a query to apply against a combined dataset, which may include at least a portion of knowledge graph data arrangement 1642. A query may be generated in association with computing device 1694b or as data generated from data catalog controller logic 1652 based on predictive logic, such as machine learning, deep learning, or any other predictive algorithmic computer-implemented process. In some examples, a query may be implemented as either a relational-based query (e.g., in an SQL-equivalent query language) or a graph-based query (e.g., in a SPARQL-equivalent query language). In some cases, a relational-based query may be converted interchangeably into a graph-based query. Further, a query may be implemented as either an implicit federated query or an explicit federated query.

Data project controller 1631 may be configured to control components of collaborative dataset consolidation system 1650 to provision computerized tools to facilitate interoperability of datasets with other datasets in different formats or with various external computerized analysis tools (e.g., via APIs 1622 and 1620), whereby any computerized analysis tool may be disposed either internal or external to collaborative dataset consolidation system 1650. In some cases, computerized analysis tools may be configured to generate analytic data (e.g., dashboard data) that may be presented as insights in graphical or visual form, such as those implementing, for example, statistical and visualization applications, such as Tableau® or the like.

Data project controller 1631 may be configured to access, manage, build, and use data representing a data dictionary 1653 (e.g., a composite data dictionary), which may be managed electronically by data catalog controller logic 1652. In some examples, data representing data dictionary 1653 may be a subset of data representing a data catalog 1655. As data catalog 1655 may be disposed in a cloud-based computing system, data catalog 1655 and its data and logic may be referred to as a "data catalog-as-a-service," at least in some examples. In some non-limiting examples, a data catalog 1655 and/or a data dictionary 1653 may include data or code, or both, that may be configured to create, manage, modify, and use descriptor data that may identify metadata (e.g., automatically) associated with datasets to enrich a graph-based data arrangement (e.g., to form knowledge graph data arrangement 1642). One example of a data dictionary may be implemented as described in U.S. patent application Ser. No. 15/985,702, filed on May 22, 2018, now U.S. Pat. No. 11,068,475 and titled "COMPUTERIZED TOOLS TO DEVELOP AND MANAGE DATA-DRIVEN PROJECTS COLLABORATIVELY VIA A NETWORKED COMPUTING PLATFORM AND COLLABORATIVE DATASETS," which is hereby incorporated by reference.

Further to diagram 1600, data project controller 1631 (or any other component of data system 1699) may be configured to implement metadata profile logic 1691 and concept interface generator logic 1693, both of which may be implemented using hardware or software, or a combination thereof. Metadata profile logic 1691 may be configured to analyze, identify, classify, and implement attribute data, property data, and any other associated data (e.g., as metadata) that may be relevant or linked to any unit of data in a graph-based data arrangement. In some examples, metadata profile logic 1691 may be configured to function as metadata profile logic layer 442 of FIG. 4, which may be configured to provide metadata management logic to extract, identify, derive, and/or implement technical, business, and other portions of data as layered data. In at least one example, metadata profile logic 1691 of FIG. 16 may be configured to identify, classify and generate metadata (e.g., as layered data or otherwise), as set forth in U.S. patent application Ser. No. 15/454,969 (e.g., DAT-012) filed on Mar. 9, 2017 and titled "INTERACTIVE INTERFACES TO PRESENT DATA ARRANGEMENT OVERVIEWS AND SUMMARIZED DATASET ATTRIBUTES FOR COLLABORATIVE DATASETS," which is incorporated by reference.

In some implementations, metadata profile logic 1691 may be configured to create a metadata profile data file that may include data or executable instructions, or both. In some cases, a metadata profile data file may be configured to be an editable data arrangement and a resource with which to generate classifications and visual depictions (e.g., via user interface) of graph-based data arrangements in context of an enterprise and its various users regardless of the skill levels of its users. In some examples, metadata profile logic 1691 may be configured to generate via a user interface to accept user inputs to generate or modify a metadata profile data file. Grafo™ may be used to build or access graph data visually via a user interface, whereby Grafo can be accessed at www(dot)gra(dot)fo, which is maintained by data.world™ of Austin, TX In other examples, metadata profile logic 1691 may be configured to automatically identify linked graph data to form data representing a metadata profile data file. For example, metadata profile logic 1691 may be configured to implement, for example, data classifier logic that may include executable instructions to implement machine learning, deep learning, or any other type of predictive algorithm.

Figure 26A:
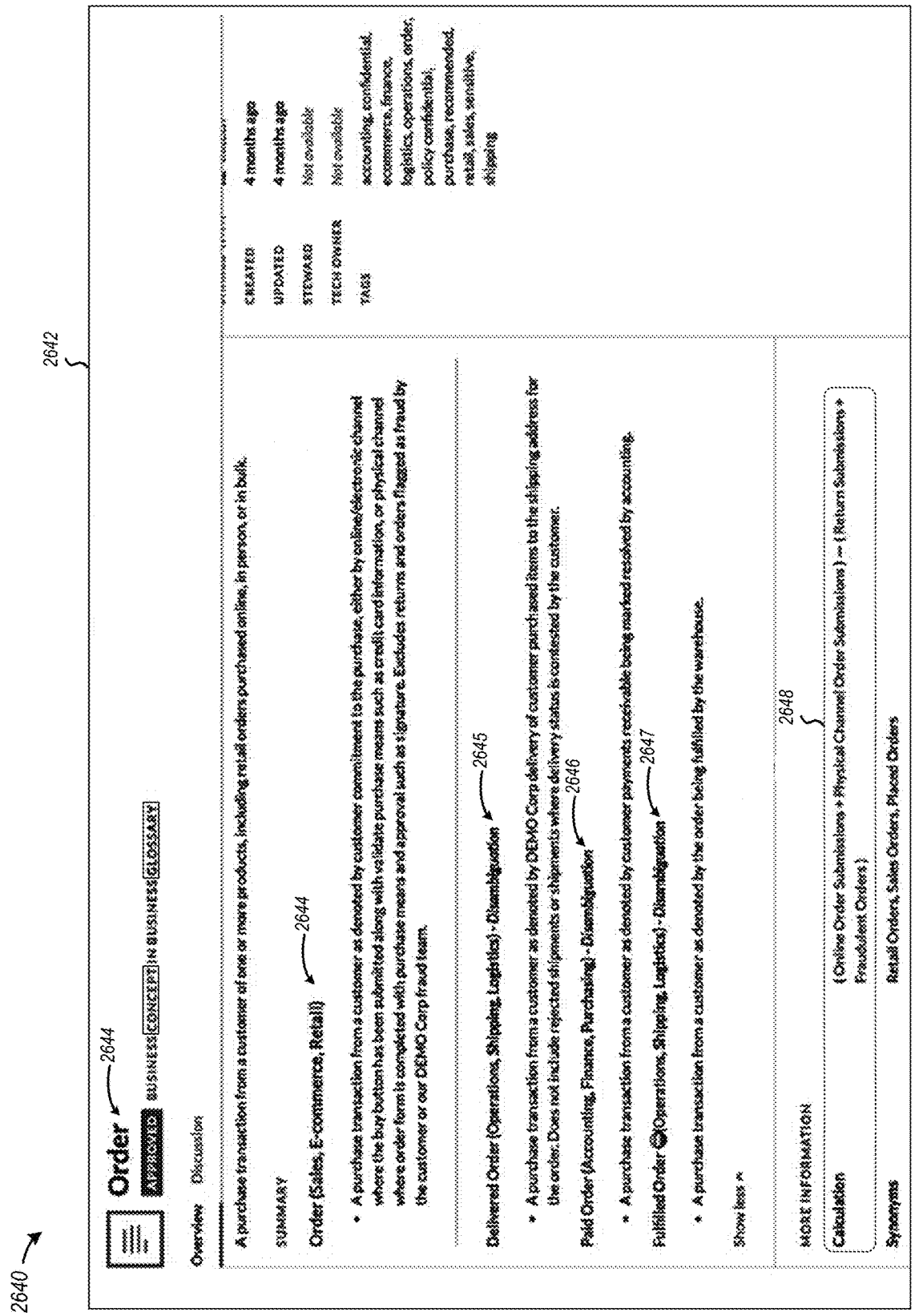

Metadata profile logic 1691 and/or data catalog controller logic 1652 may be configured to generate (or cause to be generated) user interface portions to generate, build, or modify (e.g., to assist predictively-generated metadata) a data arrangement that may include layered data that can reference data in a graph-based data arrangement. An example of a user interface portion is a conceptual interface portion, which may be referred to as an electronic "concept card." Also, metadata profile logic 1691 may be configured to implement, modify, or contribute to generation of knowledge graph data arrangement 1642. In some examples, programmatic executable instructions or user interfaces, or both, may be generated to generate, build, or modify metadata representing, for instance, a data resource (e.g., a subset of graph data representing tabular data referenced as a "Retail_Order" table) as a concept, such as depicted in FIGS. 22A to 25. In another example, programmatic executable instructions or user interfaces, or both, may be generated to generate, build, or modify metadata representing a "term" (e.g., as a concept, a topic, subject matter, etc.) in a data dictionary or business glossary associated with a subset of graph data, such as depicted in FIGS. 26A to 27 (e.g., data representing associated or layered data, or "metadata" regarding a term "Order").

Figure 28:
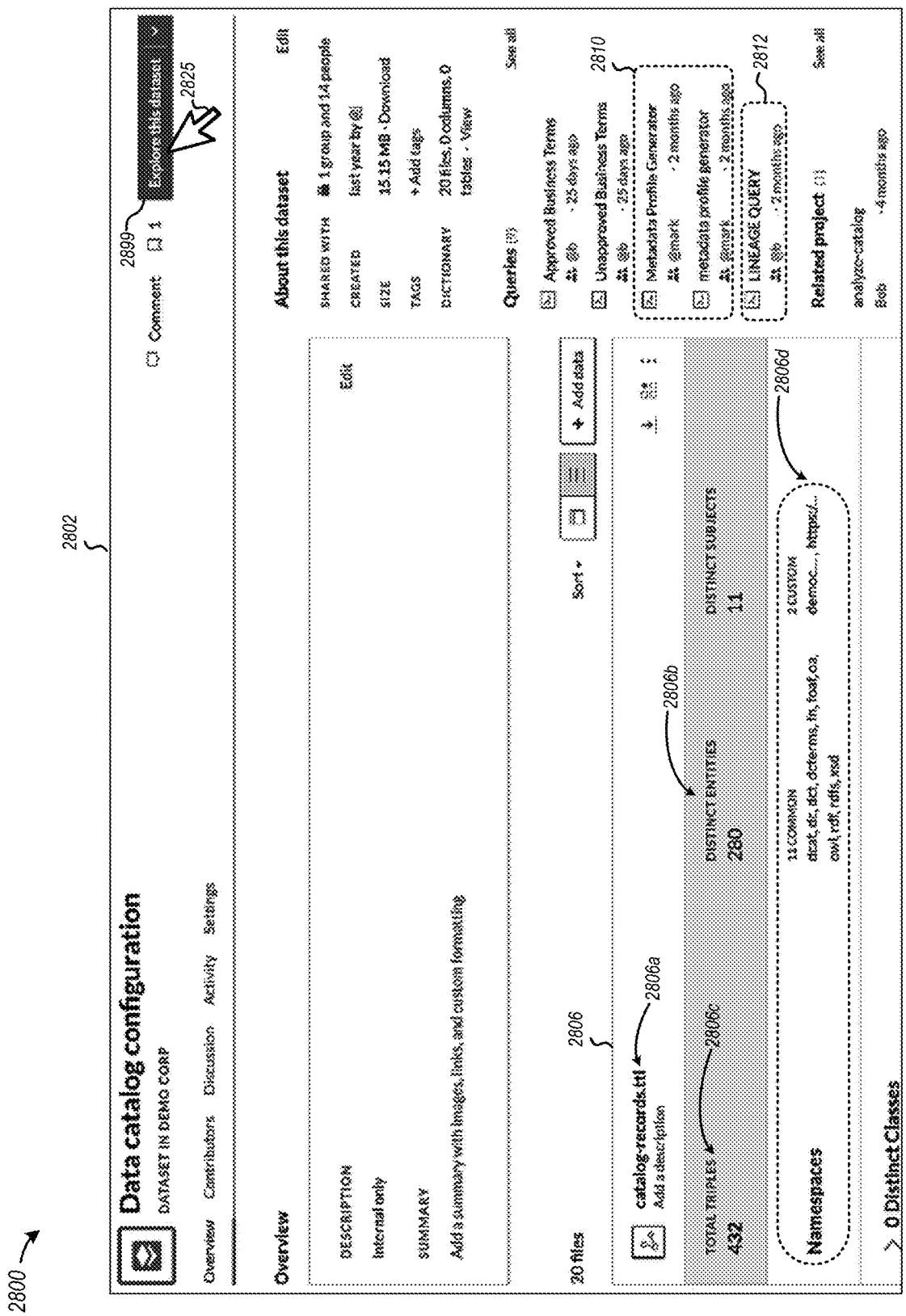
FIG. 28 is a diagram depicting an example of a user interface with which to access, modify, and implement a data catalog configuration file as data catalog data, according to some examples.
Figure 29A:
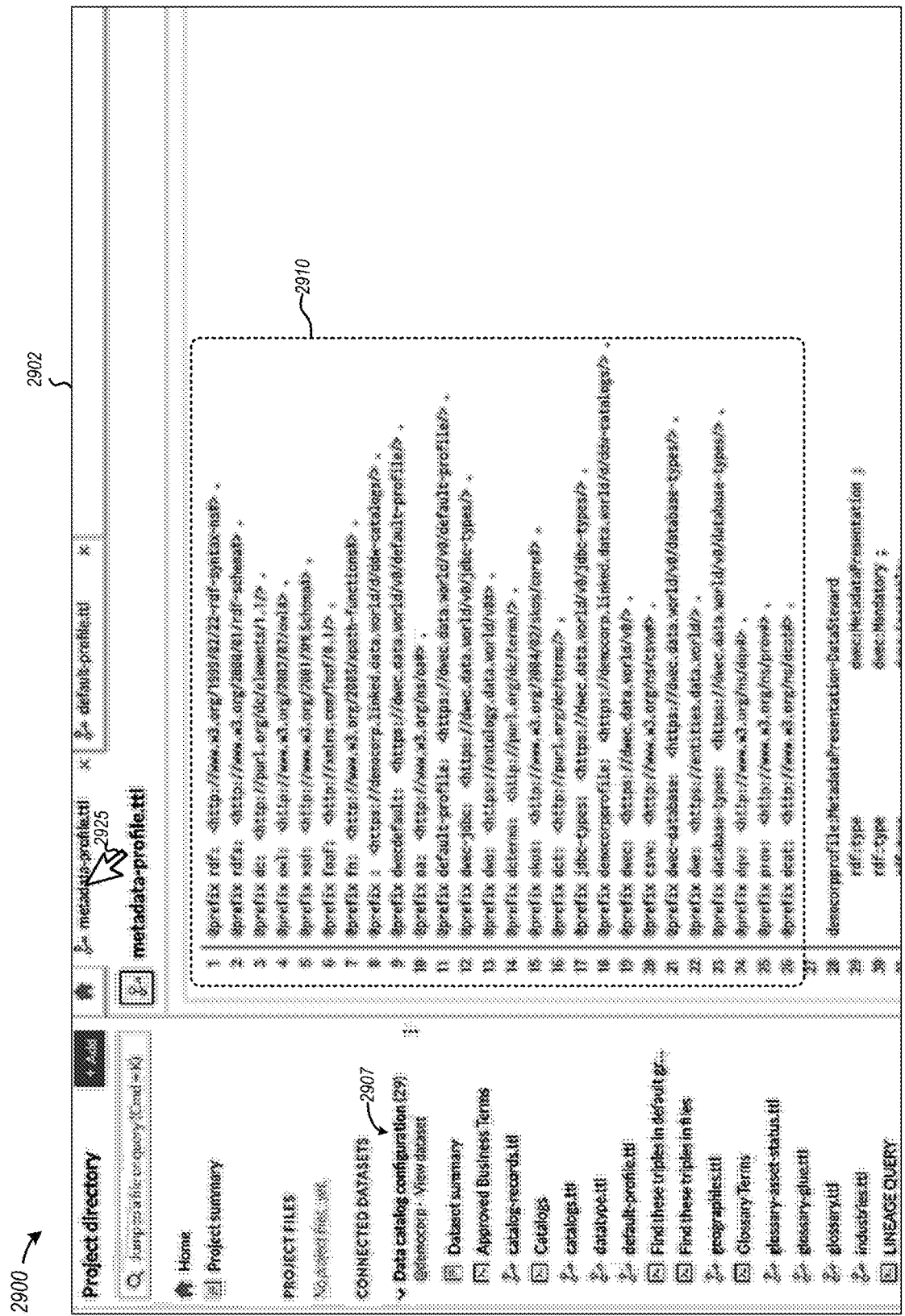
FIG. 29A is a diagram depicting an example of a user interface with which to access, modify, and implement a data file to facilitate metadata in a data catalog data, according to some examples.
Figure 29B:
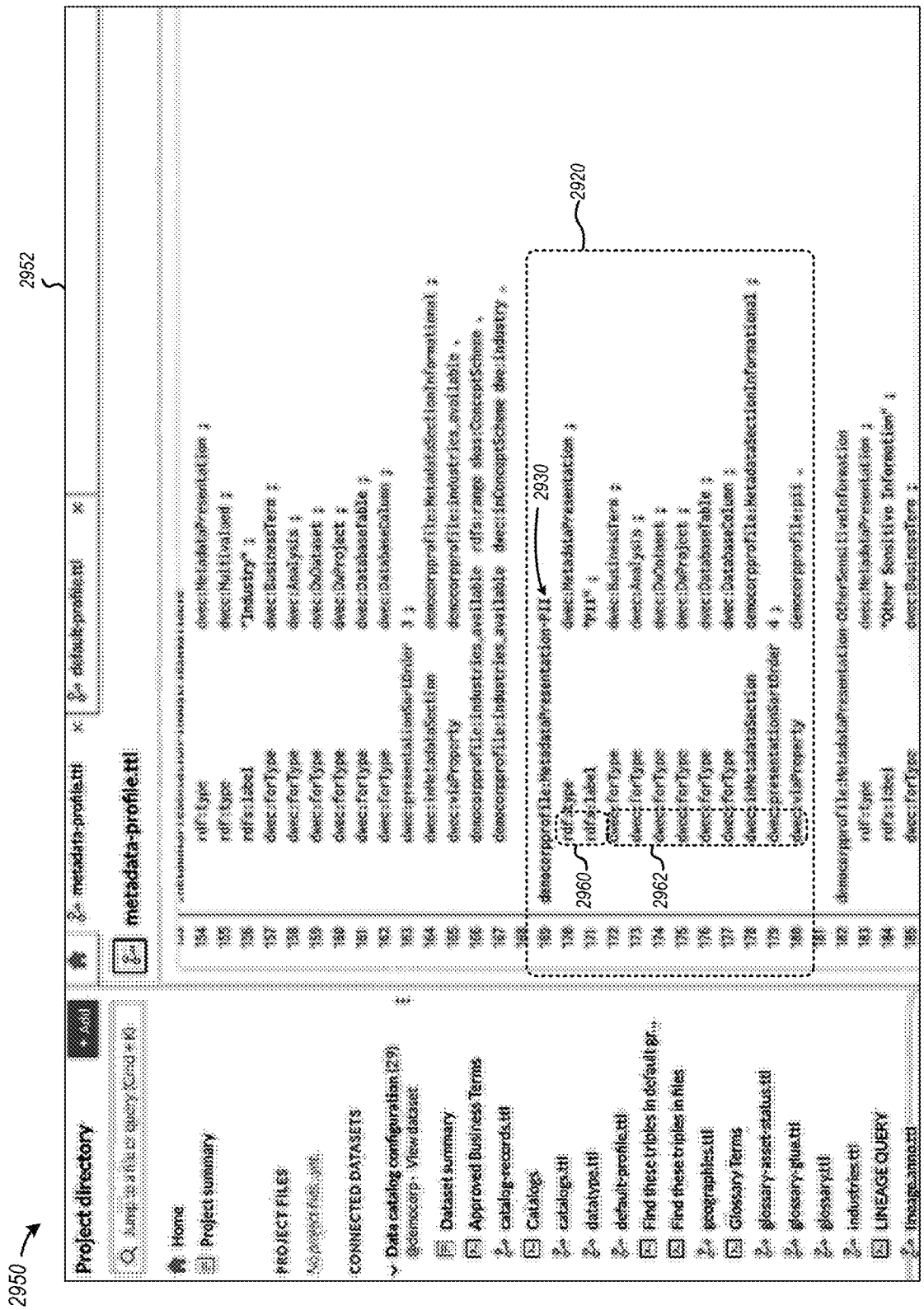
FIG. 29B is a diagram depicting another example of a user interface with which to access, modify, and implement a data file to facilitate metadata in a data catalog data, according to some examples.

In other examples, programmatic executable instructions or user interfaces, or both, may be generated to generate, build, or modify metadata to form a "data catalog," which may be configured to implement a data dictionary, business glossary data, and the like via an optional metadata profile data file, such as depicted in reference to any of FIGS. 28 to 29B. In various examples, data representing a metadata profile data file may include data and/or executable instructions configured to configure or customize data fields associated with (and to be presented within) a data catalog. Also, a metadata profile data file may be configured to implement lists and data types, as well as to provide graphical user interface layouts, etc.

Concept interface generator logic 1693 may be configured to generate (or cause to be generated) concept user interface portions or programmatic executable instructions that may be configured to convey information (e.g., in a summarized format). Concept interface generator logic 1693 may be configured to automatically implement, derive, or predict actions activated by identifying relevant subsets of executable instructions. In some examples, concept interface generator logic 1693 may be configured to identify predictively relevant data regarding a portion of a graph-based data arrangement representing a data catalog, whereby data representing a data catalog or a knowledge graph portion may include data representing one or more concept user interface portions or programmatic executable instructions to facilitate discovery of relevant people and users (e.g., via user accounts), relevant resources (e.g., portions of graph-based data arrangement that may be surfaced as tabular data, dashboard-based analytic and graphical data, etc.), predicted recommended actions or applications that a user may implement regarding a concept, and any other supporting information associated with a knowledge graph in view of, for example, a search term or topic.

According to some examples, data system 1699 may include hardware, software, and any other computer-implemented processes and structures that may be distributed locally or remotely regardless of function. In one example, data system 1699 may be implemented as a "data fabric," whereby a computing platform architecture may be configured to connect data and knowledge at any scale in a distributed and decentralized manner. In some cases, a data fabric architecture may be configured to provide semantically organized and standardized processes to implement data and metadata universally via various types of endpoints and APIs, whether locally and externally. As such, data system 1699 as a data fabric may be configured to implement a unified aggregation of data assets, databases, and storage architectures in relation to, for example, an enterprise. In another example, data system 1699 may be implemented as a "data mesh," which may be configured to harmonize data implementation over various data repositories (e.g., various "data lake" architectures, various "data warehouse" architectures, etc.) and various data operation processes. In some cases, a data mesh-based architecture may implement specialized endpoints and APIs through which data may be integrated. Regardless, the various structures or functionalities described herein may be configured for implementation in any computer processing architecture and platform, such as data system 1699.

Figure 17:
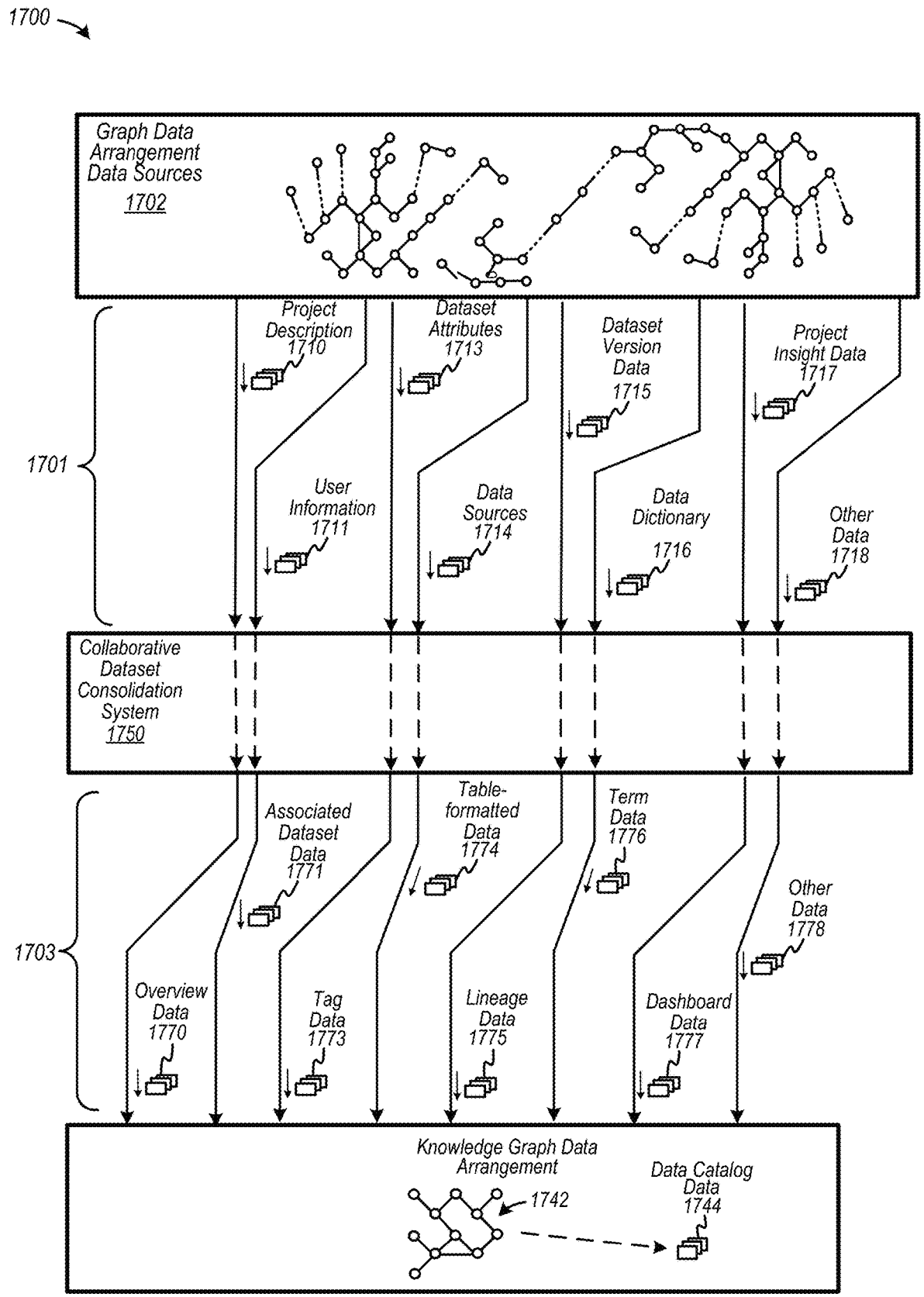
FIG. 17 is a diagram depicting various equivalent types of data associated with a graph data arrangement and implemented as a knowledge graph data arrangement, according to some examples.

FIG. 17 is a diagram depicting various equivalent types of data associated with a graph data arrangement that may be implemented as a knowledge graph data arrangement, according to some examples. Diagram 1700 depicts a graph data arrangement 1702 based on a various data sources (e.g., regardless of format, datatypes, databases, protocols, etc.) that may be configured to exchange or implement data 1701 as data 1703 in association with a collaborative data consolidation system 1750 and a knowledge graph arrangement 1742, which may be configured to provide data representing data catalog data 1744.

Figures 22A, 22B:
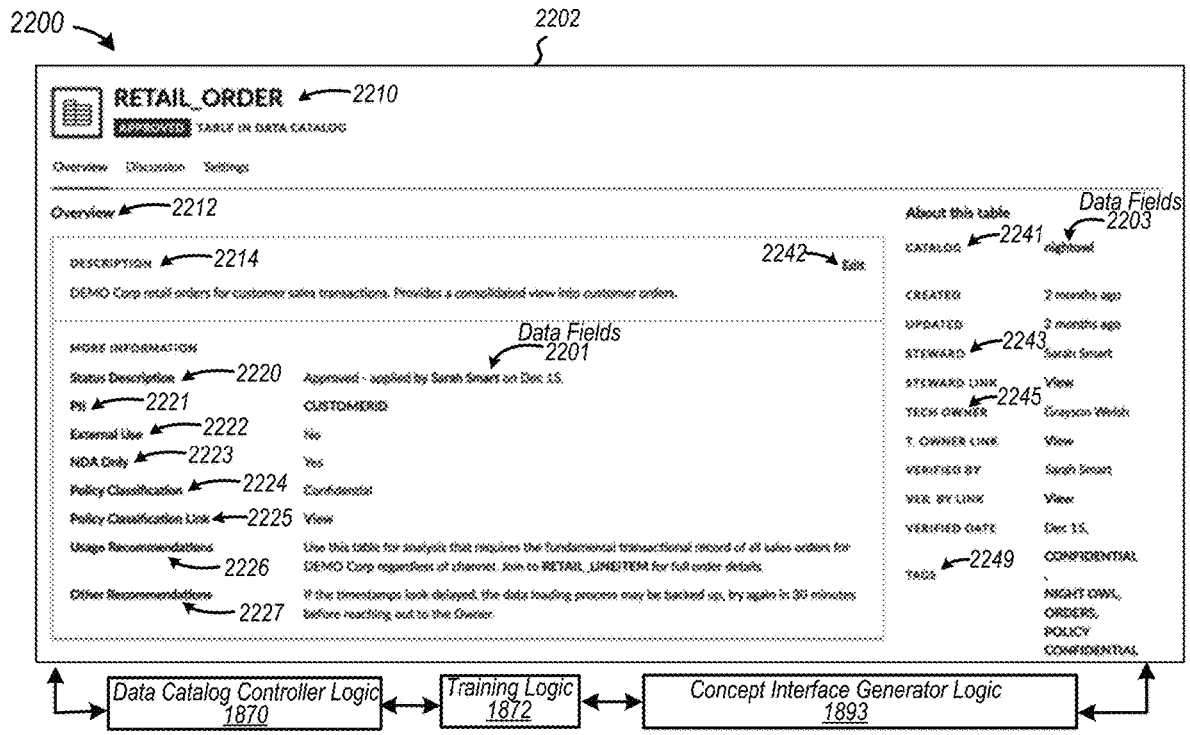

As shown, project data 1710 may be formatted to provide overview data 1770. In a non-limiting example, project data 1710 may be implemented as overview data 2212 of FIG. 22A. Referring back to FIG. 17, user information data 1711 may be configured as associated dataset data 1771, which may include data representing user data, user account data, user-associated datasets, user-related contacts (e.g., including links to other user accounts and datasets), and any other user-related data described herein or incorporated herein by reference. Dataset attributes data 1713 may be implemented as, or equivalent to, tag data 1773, which may be manually or automatically associated with data to form links among data (e.g., as metadata) to describe or link any unit of data to a particular unit of data. In some examples, tag data 1773 may be linked to units of data responsive to user inputs, such as depicted in FIGS. 22B, 27, and other figures. In other examples, tag data 1773 may be associated with one or more units of data in a graph-based data arrangement predictively (e.g., automatically) based on computations performed by one or more predictive or probabilistic algorithms, according to some embodiments.

Figure 18:
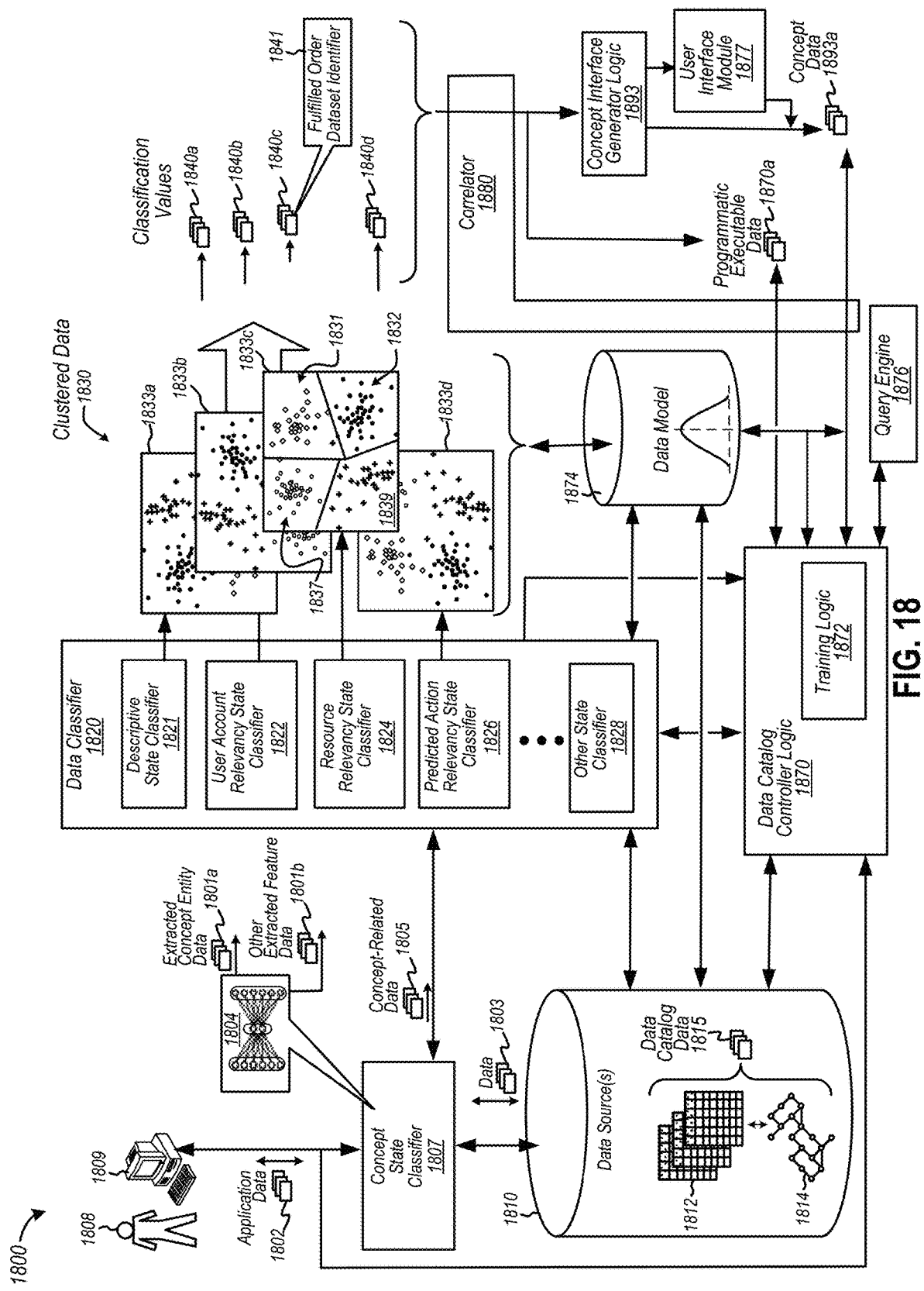
FIG. 18 is a diagram depicting a computing system configured to predict a subset of programmatic executable instructions, according to some embodiments.
Figures 24, 25:
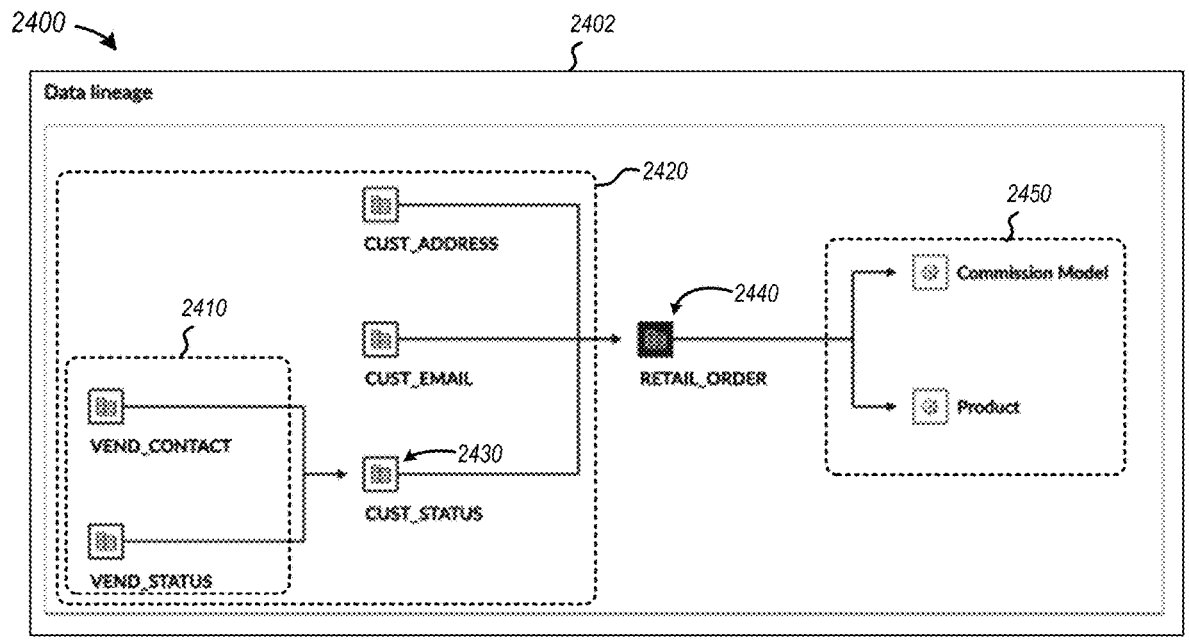
FIG. 24 is a diagram depicting attributes relating to an example of data lineage of a dataset described in FIGS. 22A to 22C, according to some examples.
FIG. 25 is a diagram depicting attributes relating to a dataset of terms referenced in resource tabular data of FIGS. 22A to 22C, according to some examples.

As shown, data source(s) data 1714 may be configured to provide table formatted data 1774, which may include data linking a subset of graph data to data that represents the data in a tabular format (e.g., rows and columns), such as data representing tabular data 1812 linked to graph data 1814 of FIG. 18, as an example. Referring back to FIG. 17, dataset version data 1715 may include data equivalent to lineage data 1775 (e.g., data provenance data), such as depicted in FIG. 24. Referring back to FIG. 17, data dictionary data 1716 may include data including or associated with term data 1776 that may include data representing concepts, entities, etc., such as depicted in FIG. 22A (e.g., a concept relating to a resource, such as tabular data 2219) and as depicted in FIG. 26A (e.g., a concept relating to a term, such as a business or enterprise glossary term "Order"). Referring back to FIG. 17, project insight data 1717 may include data equivalent to dashboard data 1777 (or any other analytically-generated data). And "other" data 1718 may be configured as any "other" data 1778, interchangeably regardless of implementation, according to various embodiments. Again, data 1701 and data 1703 may be implemented as any type of data and metadata described herein or incorporated herein by reference.

FIG. 18 is a diagram depicting a computing system configured to predict a subset of programmatic executable instructions, according to some embodiments. Diagram 1800 depicts hardware or computer-implemented methods, or any combination thereof, that may be configured to a function to predict and select a subset of programmatic executable instructions to perform a data operation in association with a graph data arrangement, such as a data catalog, a knowledge graph, or any other graph-based data. In some examples, elements and computational components of diagram 1800, such as concept state classifier 1807, may be configured to predict and implement a concept as a conceptual entity (e.g., as a classified concept), which, in turn, may be used to implement a data classifier 1820 to predict and classify one or more attributes or properties (e.g., any metadata of any hierarchical level) that may be correlatable to a concept entity. Classification data values 1840a, 1840b, 1840c, and 1840d may be derived based on classifying attributes to, for example, determine relevant subsets of attributes with which to access and implement relevant data stored in a graph data arrangement, an example of which is depicted as graph data arrangement 1814. Data relevant to a concept entity may include relevant descriptive data (e.g., "overview" data), relevant user account data, relevant resource data, and predicted action data (e.g., recommended executable instructions to perform one or more actions).

In some examples, elements and computational components of diagram 1800 may be configured to extract relevant data from data catalog data to identity portions of relevant data for presentation or display in a user interface as a concept interface portion (e.g., an electronic "concept card"). In various examples, a conceptual entity may refer to data representing a concept, a term (e.g., a technical term, a business glossary term, etc.), a topic, as well as an ontological class, object, type, relationship, or event, and the like. Also, a conceptual entity may refer to data as any other classification or type of data (e.g., a "class" of data), or any unit of data stored in association with a graph-based data arrangement (e.g., a unit of data categorically linked within a portion of a graph constituting a data catalog). Any concept, term, topic, etc. stored in a data structure including a data catalog may be referred to as a "data catalog entity," according to examples. Elements depicted in diagram 1800 may include structures and/or functions as similarly-named or similarly-numbered elements depicted in other drawings.

Concept state classifier 1807 of diagram 1800 may be configured to exchange application data 1802 via a computing device 1809, which may include a processor, a memory including executable instructions, a user interface, and other hardware and/or software components. Computing device 1809 may be implemented in association with a user 1808, with whom data representing an electronic user account and associated data may be associated or otherwise linked (e.g., relative to graph data). Data representing a user account can be included in application data 1802, including data representing a user identifier ("ID"), data regarding a user computer device system 1809 (e.g., type of device, processor, operating system, user interface, etc.), and other user-related characteristics. Further, application data 1802 may include one or more alpha-numeric strings as, for example, search terms to match against any portion of a graph data arrangement, such as a data catalog, a knowledge graph, or the like. For example, user computing device 1809 may communicate a data signal to concept state classifier 1807 that may include a search term "Order." A search term may reference a subset of linked data in a graph data arrangement constituting a portion of a data catalog. A data catalog may provide relevant data regarding an "order" in context of, for example, an enterprise, whereby user 1808 may anticipate receiving data describing various aspects a conceptual entity "Order." User 1808 may desire to receive data representing at least a subset of related attributes, such as descriptive data (e.g., "overview" information), data representing related people and associated user accounts data, data representing related resources and data sources, data representing one or more optimal actions associated with a conceptual entity, as well as any other data.

Concept state classifier 1807 also may be configured to exchange data 1803 with any number of data sources represented as data source 1810 via, for example, any number or type of various APIs. As shown, one or more data sources 1810 may include one or more links to data that may constitute a graph data arrangement 1814, whereby data associated with graph data arrangement 1814 may be linked to data that may represent underlying data in tabular format 1812 (e.g., row and columnar data). In accordance with some examples, graph data arrangement 1814 or tabular format 1812, or both, may be configured to provide data constituting data catalog data 1815. In some examples, data catalog controller logic 1870 may be configured to generate data catalog data 1815, whereby data catalog data 1815, at least in one embodiment, may include metadata linking graph data arrangement data 1814 to data regarding information about a dataset, a table, column data, and the like, of tabular format data 1812. In some examples, data catalog controller logic 1870 may be configured to integrate user account data and user-related characteristic data with, or into, data catalog data 1815. User account data and user-related characteristic data may include data representing any information describing a user and its electronic interactions with any dataset over any amount of time, as well as aggregated user account data and user-related characteristic data over any number of user accounts.

For example, data catalog data 1815 may include or link to any user-related characteristic data describing a user 1808, a user account, a user computer device system 1809, and other user-related characteristics, such as specifying user interactions with any aspect of a graph data arrangement 1814, including a data catalog 1815, in association with data sources 1810 disposed, for example, at a collaborative dataset consolidation system or external thereto. Any of data representing a user account may be stored as metadata in association with at least one or more portions of a graph data arrangement. User account data may include, but are not limited to, a geographic location (e.g., of a user, a user computing device, etc.); a user identifier (e.g., a user name, a user account number identifier, etc.); demographic information; a role or function in an enterprise (e.g., a data steward, a data scientist, an engineer, a CEO, a CIO, a CFO, a CDO (e.g., a chief data officer), a dataset specialist, a programmer, etc.); relationships to colleagues and other user accounts associated with an enterprise; a field of interest and/or scientific discipline (e.g., applied mathematics or engineering, chemistry, physics, earth sciences, astronomy, biology, social science, etc.); a profession and/or title; and a ranking of user by others (e.g., others in a subset of users may rank a user as a "top" user in an organization, a scientific discipline, a country, etc.), or any other user account data. Further, other user attribute data may include, but are not limited to, data in datasets; dataset-related data (e.g., metadata), such as data representing tags or any other metadata; data representing titles and/or descriptions (e.g., "overviews") of datasets and/or metadata associated with a concept or conceptual entity, such as a definition or term associated with a data catalog; data indicating whether the dataset is open, private, or restricted; types and amounts of queries against datasets owned by user 1808; types and amounts of queries by user 1808 against other datasets; types and amounts of accesses of datasets owned by user 1808; types and amounts of accesses by user 1808 against other datasets (e.g., associated with other users); types of users owning other datasets with whom user 1808 collaborates; a number or type of users monitoring (e.g., "following") datasets interactions by user 1808; a number or type of user or dataset interactions that user 1808 follows or monitors; a number or type of comments associated with datasets owned by user 1808; a number or type of comments applied to datasets owned or managed by user 1808; a number of citations of one or more datasets owned or managed by user 1808; a number of citations to one or more other datasets by user 1808; and user account data of other users with which user 1808 interacts electronically, as well as other user-related data.

Further examples of data representing a user account may include, or link to, data (e.g., metadata) associated with datasets, such as data representing quantities or types of links from datasets to a dataset of user 1808; data representing quantities or types of links from a dataset of user 1808 to multiple datasets associated with user 1808 or any other user (a link may be identified with a link ID, such as a URI); data representing context and/or usage of a dataset (e.g., categorical and numeric descriptions thereof); data representing a number of accesses in association with a dataset (including views or any data interaction with a dataset); data representing a quantity of copies, downloads, modifications, or versions of a dataset (e.g., data lineage links or data provenance information); data representing types and quantities of comments associated with the dataset; data representing quantity of votes or a ranking for one or more datasets; and other user-related data.

In view of the foregoing, any data representing a dataset may include one or more datasets of metadata that may constitute a concept or a conceptual entity, any of which may refer to any other entity, such as a definition or glossary term associated with a data catalog. According to some examples, the foregoing described data or metadata, or both, may constitute a portion of "ancillary data" (e.g., a portion of data 1803) that may be transmitted, with conceptual entity data 1801$a$, as a portion of concept-related data 1805, which may be consumed by data classifier 1820 to determine a degree of relevancy of a conceptual entity as a function of its classification and context (e.g., relevant ancillary data).

In at least one example, concept state classifier 1807 may be configured to receive application data 1802 from which data of interest (e.g., search terms) may be extracted to identify a conceptual entity. In some examples, concept state classifier 1807 may be configured to implement a feature extraction controller 1804, which may be similar or equivalent to that described as feature extraction controller 322 in FIG. 3. Concept state classifier 1807 of FIG. 18 may be configured to perform any predictive algorithm, such as any number of natural language processing ("NLP") algorithms configured to identify a concept (e.g., as a topic) as extracted concept entity data 1801$a$, as well as associated attributes, such as other extracted feature data 1801$b$. Extracted concept entity data 1801$a$ may be equivalent to a predicted observation 355$a$ or topic of FIG. 3. Application data 1802 of FIG. 18 may include, as an example, a user input representing "delayed orders" and concept state classifier 1807 may be configured to extract "order" as feature data 1801$a$. Therefore, concept state classifier 1807 may be configured to classify a user input relating to a concept, for example, as data representing a conceptual entity "order."

Concept state classifier 1807 may be further configured to predict attribute values (e.g., correlatable to metadata) as other extracted feature data 1801$b$, which may be associated with (e.g., linked to) predicted feature data 1801$a$. In at least one example, concept state classifier 1807 may be configured to access data sources 1810 to retrieve data from, for example, graph data arrangement 1814, data catalog data 1815, or any other data structure to compute or identify data ancillary to extract the concept entity data 1801$a$. Other extracted feature data 1801$b$ may be equivalent to observation data 355$b$ of FIG. 3. In some examples, other extracted feature data 1801b of FIG. 18 may include, or may be derived from, ancillary data associated with a conceptual entity predicted at concept state classifier 1807.

At least a portion of ancillary data may originate as a portion of data 1803 from data sources 1810. According to some examples, data 1803 may include ancillary data, such as data catalog data 1815, or any other data including user-related characteristic data describing a user 1808, user account data, user computer device system data, and other user-related characteristics (including user interactions with any aspect of a graph data arrangement 1814, such as a data catalog 1815 or any other data source). Ancillary data may include one or more attributes (e.g., one or more subsets of metadata) that may be associated with a conceptual entity predicted or extracted as extracted concept entity data 1801a.

Data classifier 1820 may be configured to receive concept-related data 1805, which may include data representing a conceptual entity predicted at concept state classifier 1807 (e.g., data representing a concept) and data representing other extracted feature data 1801b and/or ancillary data (e.g., as a portion of data 1803). Data classifier 1820 may be further configured to implement concept-related data 1805 to classify various subsets of attributes associated with a conceptual entity in accordance with various metrics. In at least one example, data classifier 1820 may be configured to classify each subset of attributes as having a degree of relevancy to a conceptual entity and a context associated with the conceptual entity. Examples of a context associated with a conceptual entity may include identify of user 1808 and associated user-characteristics as well as electronic interactions and operations with other user accounts, datasets, and the like. Other examples of context are incorporated by reference as set forth herein.

In a specific example, data classifier 1820 may be configured further to determine a degree of relevancy of each subset of attributes based on clustered data 1830 to predict classification values 1840a, 1840b, 1840c, and 1840d that, among other things, may convey a degree of relevancy for each subset of attributes to a conceptual entity. For example, classification values 1840a, 1840b, 1840c, and 1840d may convey a degree of relevancy of descriptive data (e.g., "overview" data), relevant user account data (e.g., relate people or roles), relevant resource data, and predicted action data (e.g., recommended executable instructions to perform one or more actions), respectively. In other embodiments, data classifier 1820 may be configured further to determine associations of each subset of attributes regardless of relevancy.

Data classifier 1820 of diagram 1800 may be configured to statistically analyze components and attributes of concept-related data 1805, which may include data representing a conceptual entity and ancillary data (e.g., subsets of data or metadata associated with a corresponding conceptual entity). According to some embodiments, data classifier 1820 may be configured to classify and/or quantify various "attributes" (or subsets thereof) by, for example, applying data model data 1874, which may be formed using machine learning or deep learning techniques, or the like. Further, data classifier 1820 is shown to include a descriptive state classifier 1821, a user account relevancy state classifier 1822, a resource relevancy state classifier 1824, a predicted action relevancy state classifier 1826, and an example of any other state classifier 1828.

In at least one example, one or more of data classifiers 1821, 1822, 1824, 1826, and 1828 may be configured to segregate, separate, or distinguish a number of data points representing similar (or statistically similar) attributes based on data associated with concept-related data 1805. Any number of data points may represent scalar data, vector data, tensor data, or the like. Data classifiers 1821, 1822, 1824, 1826, and 1828 may be configured to form one or more sets of corresponding clustered data 1830, each of which may include one or more clusters of data (e.g., in 3-4 groupings of data, or more). For example, data classifier 1824 may be configured to cluster data in groupings of four (4), with grouping 1831 relating to a first data resource and grouping 1832 relating to a second data source. Clusters 1830 of data may be grouped or clustered about a particular attribute of the data, such as a source of data (e.g., a type of data repository or data format), data describing a dataset (e.g., data describing an "overview" of a data catalog item), data describing relevancy of other user accounts (or related people) to a user account associated with user 1808, data describing relevancy of data resources to a user account associated with user 1808, and data representing suggested actions that user 1808 (or a program may perform) as a function of concept-related data 1805.

In the example shown, data model 1874 may be configured to apply data derived from clustered data 1830 to facilitate determination of classification values 1840a to 1840d based on conceptual entity data and other data included in concept-related data 1805. Descriptive state classifier 1821 may be configured to analyze subsets of clustered data 1833a relating to data providing an overview or description of a dataset, a data resource, a data term, or any dataset that may constitute a portion of the data catalog or linked thereto. Descriptive state classifier 1821 may identify, for example, a glossary term or a data resource in a data catalog may include units of metadata describing a description of tabular data (e.g., metadata unit 1a), a status description (e.g., metadata unit 2a), personal identifiable information ("PIP") (e.g., metadata unit 3a), whether external use outside of an enterprise is authorized (e.g., metadata unit 4a), whether a non-disclosure agreement ("NDA") relates to a data resource (e.g., metadata unit 5a), and any other descriptive information and any other units of metadata. In at least one example, descriptive state classifier 1821 may be configured to identify one or more relevant calculations for presentation in a user interface. For example, a calculation may be depicted and referred to as a calculation to determine "Daily Orders." Thus, a Daily Order calculation may include executable instructions to perform a calculation based on an example algorithmic process: [Daily Orders (in tabular data)]-[Daily Returned Orders (in tabular data)]*[(1-Average Loss (in tabular data)], which may be depicted, for example, in a conceptual interface portion as a relevant computation to surface as a function of a conceptual entity and associated ancillary data. According to some examples, descriptive state classifier 1821 may be configured to correlate data representing a conceptual entity based on application data 1802 against groupings of clustered data 1833a to determine one or more classification values 1840a that may represent classification of a subset of attributes of one or more descriptive data portions. Data representing relevant descriptive data may be referred to as entities (e.g., concepts) in a data catalog, a knowledge graph, an ontology, or any other data arrangement, schema, etc.

User account relevancy state classifier 1822 may be configured to analyze subsets of clustered data 1833b relating to data specifying related people or roles that may be relevant to a dataset, a data resource, a data term, or any other dataset that may constitute a portion of the data catalog or linked thereto. In at least one implementation, user account relevancy state classifier 1822 may identify data representing one or more related persons or users in relation to a glossary term, a data resource in a data catalog (e.g., tabular data, dashboard data, etc.), and the like, responsive to data representing a search for a concept in application data 1802. For example, subsets of attributes may be identified as clustered data 1833*b* to predict relevant roles or persons, such as a chief data officer ("CDO")(e.g., metadata unit 1*b*), a data steward (e.g., metadata unit 2*b*), a tech owner (e.g., an owner of the underlying technology and data, which may relate to metadata unit 3*b*), an analyst and/or data scientist (e.g., metadata unit 4*b*), an information technologist ("IT") (e.g., metadata unit 5*b*), a data engineer (e.g., metadata unit 6*b*), or the like. Subsets of attributes may predict via clustered data 1833*b* other users and user accounts based on any number of parameters, such as whether a user account or user is associated with being a "top user" or "frequent user" (e.g., metadata unit 7*b*) of one or more portions of data associated with any data correlatable with a conceptual entity identified at concept state classifier 1807. Hence, user account relevancy state classifier 1822 may be configured to identify users and user accounts based on types and amounts of queries of another user (e.g., metadata unit 8*b*), types and amounts of accesses by other users to a dataset associated with a conceptual entity (e.g., metadata unit 9*b*), a number or type of other users monitoring (e.g., "following") a dataset associated with a conceptual entity (e.g., metadata unit 10*b*), and any other equivalent data. According to some examples, user account relevancy state classifier 1822 may be configured to correlate data representing a conceptual entity based on application data 1802 against groupings of clustered data 1833*b* to determine one or more classification values 1840*b*. Classification values 1840*b* may represent classifications of a subset of attributes of one or more relevant portions of graph data relevant to related persons or users, whereby data representing related persons may be referred to as entities (e.g., concepts) in a data catalog, a knowledge graph, an ontology, or any other data arrangement, schema, etc.

Figure 30:
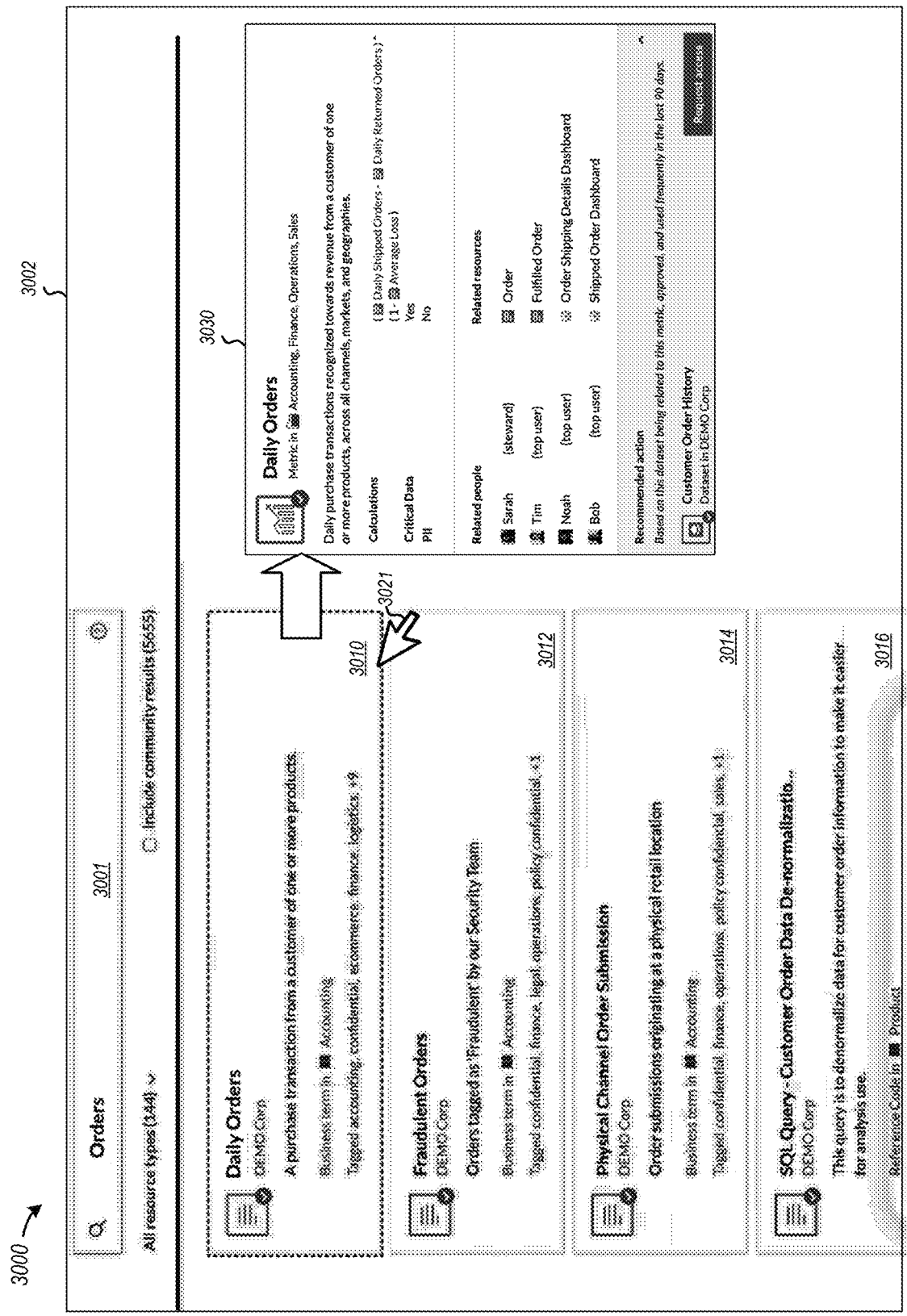

Resource relevancy state classifier 1824 may be configured to analyze subsets of clustered data 1833*c* relating to data specifying related resources that may be relevant to a dataset, a data resource, a data term, or any other dataset that may constitute a portion of the data catalog or linked thereto. In at least one implementation, resource relevancy state classifier 1824 may identify data representing one or more related resources in relation to a glossary term, a data resource in a data catalog (e.g., tabular data, dashboard data, etc.), and the like, responsive to data representing a search for a concept in application data 1802. For example, subsets of attributes may be identified as clustered data 1833*c* to predict relevant data resources that may be associated with a data catalog as a portion of graph data that may constitute data linked to data in a tabular data format 1812, such a "Daily Order" table, a "Retail Order" table, a "Fraudulent Order" table, etc., as depicted in FIG. 30, as well as "project data files" and the like. Resource relevancy state classifier 1824 of FIG. 18 may be configured to predict relevancy among a conceptual entity and one or more data catalog terms (e.g., business glossary terms), such as "Order," "Delivered Order," "Fulfilled Order," among other resources, terms, etc. Resource relevancy state classifier 1824 may also be configured to predict relevancy among a conceptual entity and one or more data files including data representing insight data (e.g., "project insights"), dashboard data, or any other subsets of data configured to provide dashboard data to a data visualization tool (e.g., Tableau®, Microsoft BI®, Looker®, Domo®, data.world™ insights, etc.). Data representing insight data may be configured to generate, track, analyze, and display data of interest in context of metrics or parameters based on graph data. Further, resource relevancy state classifier 1824 may be configured to predict relevancy among a conceptual entity and one or more data files including data representing technical data and data files, such as a data catalog configuration data file, a metadata profile data file (e.g., metadata-profile.ttl), etc., as well as any data file generated by, or including, queries (e.g., queries based on SQL, SPARQL, data.world "dwSQL," which may be proprietary, etc.). Examples of query data files include data catalog entities, such as a metadata profile generator query, a data lineage query (and associated data lineage data file), etc.

According to some examples, resource relevancy state classifier 1824 may be configured to correlate data representing a conceptual entity based on application data 1802 against groupings of clustered data 1833*c* to determine one or more classification values 1840*c* that may represent classification of a subset of attributes of one or more relevant portions of graph data relevant to related resources. As an example, data classifier 1824 may be configured to cluster data into at least a grouping 1831 relating to a first data resource, such as data points relating to a "Fulfilled Order" data table, and a grouping 1832 relating to a second data source, such as data points relating to an "Order" data table. According to some examples, resource relevancy state classifier 1824 may be configured to determine one or more classification values 1840*b*, such as a classification value representing a data identifier 1841 associated with a Fulfilled Order data table indicating a degree of relevancy to a conceptual entity included in application data 1802. In some examples, grouping 1837 of data may be grouped to relevant data points relating to a dashboard (e.g., a graphical or analytic data program) representing a "Order shipment Detail" data file, and grouping 1839 of data may be grouped to relevant data points relating to programmatic code configured to implement a dashboard displaying a "Shipped Order" dashboard data file.

Predicted action relevancy state classifier 1826 may be configured to analyze subsets of clustered data 1833*d* relating to data specifying relevant actions to predict, for example, subsets of recommended executable instructions to perform relevant actions as a function of a degree of relevancy to a conceptual entity identified in concept-related data 1805. Data 1805 may include data representing one or more alpha-numeric strings that may constitute, for instance, search term data transmitted from computing device 1809 to concept state classifier 1807. In accordance with some embodiments, a relevant or recommended action may refer to a subset of programmatic executable instructions selected based on a classification of data as a function of concept entity data and, optionally, data representing ancillary data. In one example, predicted action relevancy state classifier 1826 may be configured to identify a dataset, such as "Customer Order History" data that may be relevant to conceptual entity data and ancillary data. Predicted action relevancy state classifier 1826 may be further configured to provide a subset of executable instructions to obtain authorization to access the dataset (e.g., via a user input to request access from an owner of a dataset). In another example, predicted action state classifier 1826 may be configured to identify a dataset representing a subset of programmatic executable instructions to perform any action. For instance, predicted action relevancy state classifier 1826 may be configured to identify a dataset include programmatic executable instruction to perform a calculation based on an example algorithmic process: [[Daily Orders (referenced as tabular data)]-[Daily Returned Orders (referenced as tabular data)]]*[(1-Average Loss (referenced as tabular data)]. Other programmatic executable instructions to perform other calculations are possible. In other examples, predicted subsets of recommended executable instructions may be configured to implement or otherwise electronically to perform one or more actions relevant to a conceptual entity and/or ancillary included as at least a portion of application data 1802.

According to some examples, predicted action relevancy state classifier 1826 may be configured to determine one or more classification values 1840*d*, such as a classification value representing an identifier referencing one or more recommended or relevant subsets of programmatic executable instructions for execution to perform a recommended action based a degree of relevancy in view of a conceptual entity included in application data 1802 (e.g., as well as other contextual data, which may include ancillary data).

While any number of techniques may be implemented, data classifier 1820 may apply "k-means clustering," or any other clustering data identification techniques (e.g., hierarchical clustering, etc.) to form clustered data 1830 and to perform cluster analysis on such data (e.g., including centroid-based clustering). In some examples, data classifier 1820, as well as data classifiers 1821, 1822, 1824, 1826, and 1828, may be configured to detect patterns or classifications among datasets in graph data arrangement 1814 and other data through the use of Bayesian networks, clustering analysis, as well as other known machine learning techniques or deep-learning techniques (e.g., including any known artificial intelligence techniques, or any of k-NN algorithms (including any other clustering algorithms), linear support vector machine ("SVM") algorithms, regression and variant algorithms thereof (e.g., linear regression, non-linear regression, etc.), Principal Component Analysis ("PCA"). Also, any of data classifiers 1821, 1822, 1824, 1826, and 1828 may be configured to implement Bayesian inference and classification algorithms and the like, such as Naïve Bayes classifiers, or any other statistical or Bayesian empirical technique. Note that data classification techniques or any other probabilistic data calculation technique may integrate with, or use, applications such as TensorFlow®, which is maintained by Google Inc.™, or any other application configured to perform executable instructions to effectuate machine learning, deep learning and neural networks, or any predictive or probabilistic algorithms, and the like.

In some implementations, classification values 1840*a* to 1840*d*, any of which may be classified as being relevant to a conceptual entity, regardless of whether classification values 1840*a* to 1840*d* identify data representing related persons or users may be referred to as entities (e.g., concepts) in a data catalog, a knowledge graph, an ontology, or any other data arrangement, schema, etc.

In some examples, correlator 1880 may be implemented, optionally, to correlate classification values 1840*a* to 1840*d* to data stored as, for instance, data catalog data 1815, which may be generated, managed, and accessed via data catalog controller logic 1870.

In some examples, correlator 1880 may be implemented to correlate classification values 1840*a* to 1840*d* as a function of at least a portion of concept-related data 1805 that may include data (e.g., ancillary data) representing a first subset of attributes (e.g., data representing properties, etc., such as metadata), such as data representing descriptive data, project description data, or "overview" data. Examples of descriptive data may include a title/name of a resource, a glossary term, or the like, as well as text strings constituting a summarized description of the resource, glossary term, or any other data catalog entity. Descriptive data may include data representing one or more of the following: a status description (e.g., whether approved, pending approval, etc.), a type of applicable Personal Identifiable Information ("PIP") data, an indication whether a data catalog entity may be used externally (e.g., outside of an enterprise), an indication whether a non-disclosure agreement ("NDA") relates to a data catalog entity, an indication whether a policy classification applies (e.g., whether data are confidential, top secret, or whether any data governance requirement applies, etc.), an indication whether an associated link to policy data exists (e.g., an HTML link), an indication of data representing usage recommendations, an indication of data representing tags or labels describing metadata, and any other data, which be stored in any portion of any graph data arrangement in any data source 1810. Descriptive state classifier 1821 may be configured to generate classification values 1840*a* specifying the most relevant of the above-described descriptive data, at least in some cases.

At least a portion of concept-related data 1805 may include data (e.g., ancillary data) representing a second subset of attributes (e.g., data representing properties, etc., such as metadata), such as data representing user and user account data in which user account relevancy state classifier 1822 may consume to generate clustered data 1833*b*. Classification values 1840*b* may be generated and classified as a function of data representing attributes associated with a user and corresponding user account data, such as described herein. For example, user account relevancy state classifier 1822 may implement user and user account data to identify clusters of data 1833*b* relevant to a conceptual entity associated with application data 1802 to identify classified values 1840*b*.

At least a portion of concept-related data 1805 may include data (e.g., ancillary data) representing a third subset of attributes, such as data representing one or more data resources and associated data identifiers with which resource relevancy state classifier 1824 may use to generate clustered data 1833*c*, including one or more clusters 1831, 1832, 1837, and 1839. Classification values 1840*c* may be generated and classified as a function of data representing attributes associated with a types of data storage technologies (e.g., triple databases, relational databases, etc.) as well as data storage locations (e.g., internal or external to an enterprise). Also, classification values 1840*c* refer to one or more tables or portion of a graph data arrangement, one or more dashboard applications or analytically-generated visual data files, one or more glossary terms, and any other data catalog data. For example, classification data 1840*c* may refer to a relevant table associated with a "Fulfilled Order" dataset.

At least a portion of concept-related data 1805 may include data (e.g., ancillary data) representing a fourth subset of attributes, such as data representing one or more predicted actions relevant to a conceptual entity as identified at predicted action relevancy state classifier 1826, which may generate or use clustered data 1833*d*. Classification values 1840*d* may be generated and classified as a function of data representing attributes associated with predicted action data (e.g., subsets of code) relevant to conceptual entity data in concept-related data 1805. For example, predicted action data (e.g., recommended executable instructions to perform one or more actions), such as selecting programmatic code to implement or link to a dataset relevant to a conceptual entity by activating code to receive authorization to link to access a dataset. Any other action may be implemented based on classification values 1840*d*. In another example, selected programmatic code may be configured to activate query engine 1878 to generate a query (e.g., a federated query) automatically to retrieve relevant data or datasets identified via classification data values 1840*d*, or any other classification data value.

In one example, correlator 1880 may be configured to correlate data representing identifiers of any classification values 1840*a* to 1840*d* to data representing identifiers relevant to entities and data stored as data catalog data 1815. Data identifiers may include hashed data representations (e.g., compressed data identifying a correlatable conceptual entity). In at least one example, correlator 1880 may be configured to operate equivalent to attribute correlator 142 of FIG. 1. Correlator 1880 may be configured to electronically access or implement data representing clusters of data 1830 of FIG. 18, any of which may constitute data representing at least a portion of data model 1874.

In operation, correlator 1880 may be configured to implement logic to identify specific groupings of data 1830 to determine any of classification values 1840*a* to 1840*d* associated with a correlatable conceptual entity, such as data associated with data catalog data 1815. For example, correlator 1880 may be configured to assign or associate a data value representing a degree of relevancy as a measure of similarity between data (e.g., vector data, tensor data, etc., or any other numeric encoding) representing a conceptual entity and data (e.g., vector data, tensor data, etc., or any other numeric encoding) associated with a classification value 1840*a* to 1840*d*. Correlator 1880 may be configured to implement algorithms to determine a degree of relevancy, such as based on Euclidean distance, cosine similarity, or the like. In some instances, scalar data, vector data tensor data, and the like may include hashed data representations and may be determined using, for example, MD5, MD6, SHA-1, SHA-512, CRC-16, CRC-64, or any other hash function. In some examples, a degree of relevancy may correspond to an amount of interactions that a user access or implement data in a graph data arrangement over time. For example, a user may more frequently access "Retails Orders," as a conceptual entity than "Invalid Orders," as another conceptual entity, thereby indicating that "Retail Orders" is more relevant to the user than the conceptual other entity.

Further to FIG. 18, classification values 1840*a* to 1840*d* may be used to select subsets of programmatic executable instructions 1870*a* to consume data associated with one or more subsets of attributes based on, for example, criteria data of a targeted application. Classification values 1840*a* to 1840*d* also may be used to select subsets of programmatic executable instructions 1870*a* to select a subset of APIs to access, use, or link to various sources of data. Examples of criteria data may include data generated or identified to guide or coordinate display of metadata and associated attributes in a user interface or portions thereof. Criteria may also describe a type or function of an API to select as programmatic executable instructions 1870*a*. A target application may be configured to implement user interface logic at user interface module 1877 to generate one or more user interface portions, such as concept interface portions that may, for example, constitute a digitized implementation of "a concept card."

One or more subsets of attributes associated with a conceptual entity may be displayed, for example, in a concept user interface portion based on data generated at concept interface generator logic 1893. Example of concept data 1893*a*, which may be displayed in a concept interface portion can include for display one more subsets of attributes (e.g., cataloged metadata). First, a subset of attributes may be identified as a subset of data representing descriptive data for display (e.g., data describing "overview" information about a subset of data representing a portion of a data catalog). Second, subset of attributes may include a data resource for display (e.g., data representing a subset of a graph data arrangement, such as in a tabular format). Third, a subset of attributes may include data representing analytical or visually graphical data for display (e.g., data representing a dashboard, or the like). Fourth, a subset of the attributes may include data identifying a user or related users for display (e.g., data representing one or more user accounts). Fifth, a subset of attributes may include data representing recommended actions for display, which may be determined predictively. Sixth, any other subset of attributes or any combination of subsets of attributes may be selected for display in a user interface at any location within a user interface. Note that fewer or more subsets of attributes may be selected (e.g., by correlator 1880) to display in a concept interface portion of a user interface.

Diagram 1800 depicts data catalog controller logic 1870 including training logic 1872 configured to monitor interactions among computing device 1809 and data sources 1810, including data catalog data 1815 and any other data. Training logic 1872 may be configured to generate data representing a data model 1874. In the example shown, data model 1874 may be generated to classify data using clusters of data 1830. Training logic 1872 may be configured to implement any combination of supervised, semi-supervised, and unsupervised machine/deep learning algorithms to define and train data model 1874, regardless of labeling. In one example, training logic 1872 may perform unsupervised learning based on monitored user interactions with user 1808 datasets as well as other datasets associated with other users and interactions with other users (e.g., data representing text-based comments, dataset accesses, etc.).

In some examples, training logic 1872 may be configured to execute instructions constituting machine and deep learning algorithms, such as developed and maintained by TensorFlow™, Keras™ (e.g., Keras(dot)io), and any other equivalent algorithm. Training logic 1872 (e.g., Keras) may be configured to define and train data model 1874 by analyzing patterns of data (e.g., user interactions with data sources 1810 including data catalog data 1815) to adjust data values representing weights, feature representations, feature vectors, parametric data, or any other data, including embedding data. In some cases, dataset attributes (e.g., metadata) may provide labels, such as data representing a column header that may describe data or datatypes in a subset of columnar data. Training logic 1872 may be configured to use multi-class and multi-label techniques. Note that the example shown in FIG. 18 is intended to be non-limiting and may include or use any algorithmic process to, for example, generate selected subsets of programmatic execution data instructions 1870*a* or concept data 1893*a* for display in a conceptual interface portion, or both.

Figure 19:
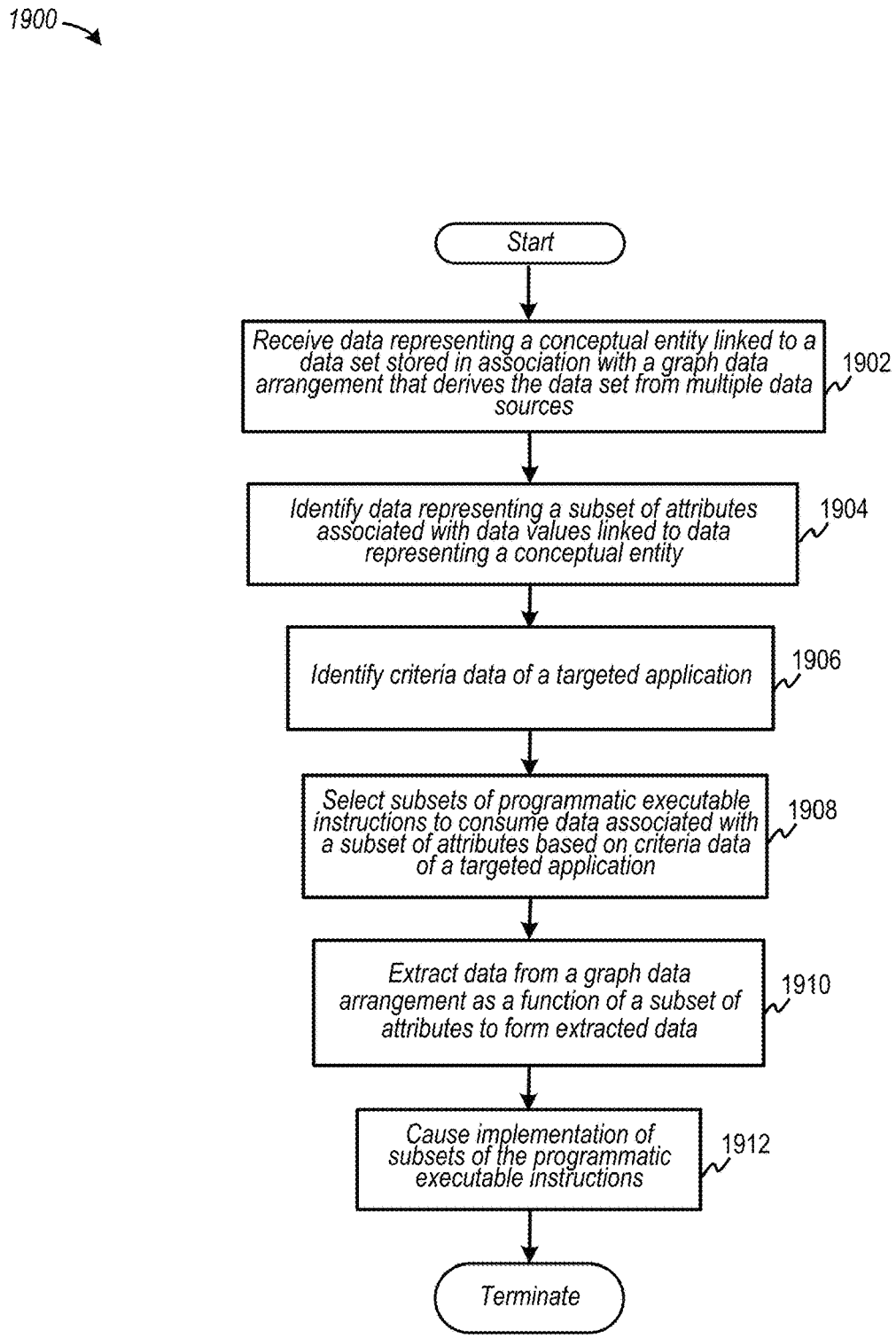
FIG. 19 is a flow diagram depicting an example of implementing a subset of data derived to invoke a subset of programmatic executable instructions, according to at least one example.

FIG. 19 is a flow diagram depicting an example of implementing a subset of data derived to invoke a subset of programmatic executable instructions, according to at least one example. Flow 1900 may be initiated at 1902, at which data may be received as, for example, a user input from a user interface or an input generated by data classification logic, or the like. In some examples, the data may include alpha-numeric and/or textual symbols representing a concept or any other entity. The data may be received as a term with to search a data catalog or any other portion of a graph-based data arrangement. In some cases, data representing a search term may be associated with a conceptual entity that can be linked to a dataset. The dataset may be stored as a portion of a graph data arrangement, which may derive its data from multiple data sources communicatively coupled to a computing system (e.g., via APIs). The computing system may be a computing platform that includes one or more processors and memory, such as a collaborative dataset consolation system. Elements depicted in diagram 1900 may include structures and/or functions as similarly-named or similarly-numbered elements depicted in other drawings.

At 1904, data representing a subset of attributes associated with data values linked to data representing a conceptual entity may be identified as a result, for example, from a search data representing a conceptual entity. According to some examples, one or more data values that may be linked to data representing a conceptual entity may include classified data values, one or more which may be generated by a data classifier. For example, a classified data value may be determined probabilistically or may be predicted using any rules-based algorithm or statistical algorithm, including, but not limited to, machine learning algorithms, deep learning algorithms, and the like. Any classified data value may be stored as metadata and a subset of graph-based data to implement, for example, a data catalog or any other data-driven algorithm using any data arrangement. In at least one example, data representing a subset of attributes (e.g., metadata) associated with data values (e.g., classified data values) may be linked to data representing a conceptual entity as a function of a degree of correlation, as set forth herein or as incorporated by reference, to identify relevant data.

A subset of attributes may include any observation data, or a unit thereof, that may be classified as being associated with a conceptual entity, such as a concept, a term (e.g., a technical term, a business glossary term, etc.), a topic, an ontological class, object, type, relationship, or event, as well as any other classification or type of data (e.g., a "class" of data) and any unit of data stored in association with a graph-based data arrangement (e.g., data formatted as a "triple" stored in, for example, as triple-based database or data store). A subset of attributes and associated data may refer to data describing or linking to other data (e.g., metadata) that can, for example, be formed as a metadata profile data file configured to implement a data catalog. In some examples, data (i.e., metadata) associated with at least one metadata profile data file may be identified. Note that data may include metadata linked to metadata, which, in turn, may be linked to any other subset of metadata.

At 1906, criteria data of a targeted application may be determined or otherwise identified. In some examples, criteria data may be configured to govern execution of subsets of programmatic executable instructions, such as programmatic execution data 1870a of FIG. 18. Criteria data may include executable instructions to perform selection of a subset of programmatic execution of instructions to implement relevant data based on data catalog data. In some examples, criteria data may include a portion of data in a data model 1874 of FIG. 18, whereby criteria data may be formed based on resultant data determined by training logic 1872 of FIG. 18. Examples of criteria data may include data generated or identified to guide or coordinate display of metadata and associated attributes in a user interface or portions thereof. For instance, user interface portion dimensions (e.g., as defined by a number pixels, such in X and Y dimensions) may be determined and implemented as a subset of programmatic executable instructions, which may be modified based on user interface portion dimensions (e.g., to modify display of a content interface portion). Criteria data may be generated automatically, semi-automatically, or with assistance of manual intervention by a user. According to at least one embodiment, criteria data may be configured to execute any subset of programmatic executable instructions as a function of a degree of correlation or any degree of relevancy to a conceptual entity. Criteria data may also be configured to guide display of a conceptual interface portion in an optimal position in a display (e.g., based on user preferences, whether explicit or learned implicitly via an automatically-generated data model). Further, a targeted application may include any computer-implemented method configured to perform a data operation.

In at least one example, a targeted application may include executable instructions configured to present or display one or more subsets of relevant data sources associated with, for example, a search related to or relevant to a "term," such as a conceptual entity that may refer to an enterprise concept, resource, definition (e.g., as a term or portion of a data dictionary or catalog), or the like. In at least one case, a targeted application may include (or may access) executable instructions to generate one or more user interface portions, such as concept interface portions that may, for example, constitute a digitized implementation of a "concept card."

At 1908 of FIG. 19, subsets of programmatic executable instructions (e.g., instruction data) may be selected to consume data associated with a subset of attributes responsive to criteria data of a targeted application, such as an application configured to implement executable instructions to perform a subset of actions. In some examples, subsets of programmatic executable instructions may be selected based on classification data values derived from, for example, clustered data identified or generated calculated using computer-implemented methods to provide one or more data classifier operations.

It at least one implementation, subsets of programmatic executable instructions may be predicted based on derived classification data values to select portions of SQL, SPARQL, Python, or any other programming language to access a graph-based data arrangement configured to include data representing a data catalog, a knowledge graph, and any underlying raw data and metadata, and the like. In some examples, subsets of programmatic executable instructions may be configured to convert or translate one programmatic executable instruction in a first language (e.g., any of SQL, SPARQL, Python, etc.) into another programmatic executable instruction in a second language (e.g., any of SQL, SPARQL, Python, etc.) based on a subset of predicted classification values.

In further implementation at 1908, subsets of programmatic executable instructions (e.g., instruction data) may be selected to consume data associated with a subset of attributes, such as subsets of metadata (e.g., associated with graph-based data arrangements, such as a data catalog). The subsets of programmatic executable instructions may be selected responsive to criteria data of a targeted application, such as an application configured to implement executable instructions to access selected metadata based on predicted classification data values. In one example, the criteria data of a targeted application may be configured to surface or otherwise display data relevant to a data catalog, which may be implemented in a data mesh, a data fabric, or any computing architecture. Amounts and types of data catalog to be displayed may be a function of derived classification data values.

At 1910, data from a graph data arrangement may be extracted as a function of a subset of attributes, thereby forming extracted data. In examples subsets of programmatic executable instructions may be configured to select portions of programming languages (e.g., select portions of SQL, SPARQL, Python, etc.) to extract data, such as metadata, via selected APIs or any other integration and connector programs. Portions of programming languages may be selected based on classification data values configured to access a "collector application" using APIs to extract metadata from any number or type of data sources (e.g., to generate, access, or modify a data catalog). Examples of APIs include REST APIs or any other type of code configured to access data (e.g., XMLHTTPRequest ("XMR") commands or any other type of fetch commands). Any type of files may be used, such as YAML configuration files in accordance with any API specification (e.g., OpenAPI specification, Swagger specification, etc.). In one example, a collector application may include data to instantiate or implement a data.world catalog collector, or "dwcc," application that may be configured to extract, aggregate, and manage metadata from databases, business intelligence tools (e.g., dashboard-related data files), and other enterprise data sources. A "dwcc" collector application may be configured to convert various data formats representing metadata into triple data (e.g., Resource Description Framework ("RDF") statements), at least in one example. A "dwcc" collector application may be equivalent to that produced and maintained in association with data.world of Austin, Texas, USA. Selected subsets of programmatic executable instructions to implement portions of a "dwcc" collector application may be configured to access JDBC data sources, such as those that may be associated with Databricks™, Dremio™, Hive™, MySQL, PostrgreSQL™, Snowflake™, and other like data sources. Further, an OpenAPI collector may be configured to implement API using OpenAPI to produce RDF statements to represent endpoints, operations, parameters, responses, schema structures, and the like.

Further to 1910, metadata from a graph data arrangement including a data catalog may be extracted as a function of a subset of attributes, thereby forming extracted metadata. Extracted metadata may be received into an application configured to access a data catalog, and, responsive to user input data, graph data arrangement data (e.g., data catalog data) may be modified based on extracted metadata.

At 1912, subsets of the programmatic executable instructions may be implemented to, for example, execute portions of programming languages or selected APIs, at least in some cases. For example, a subset of application programming interfaces, or APIs, may be activated to access or otherwise implement data from a graph data arrangement including a data catalog, knowledge graph, etc. In other cases, subsets of the programmatic executable instructions may be implemented to, for example, cause display of subsets of attributes associated with metadata as a function of classified data values. Subsets of the programmatic executable instructions may include instructions to generate a user interface and portions thereof.

One or more subsets of attributes may be displayed, for example, in a concept user interface portion. First, a subset of attributes may be identified as a subset of data representing descriptive data for display (e.g., data describing "overview" information about a subset of data representing a portion of a data catalog). Second, subset of attributes may include a data resource for display (e.g., data representing a subset of a graph data arrangement, such as in a tabular format). Third, a subset of attributes may include data representing analytical or visually graphical data for display (e.g., data representing a dashboard, or the like). Fourth, a subset of the attributes may include data identifying a user or related users for display (e.g., data representing one or more user accounts). Fifth, a subset of attributes may include data representing recommended actions for display, which may be determined predictively. Sixth, any other subset of attributes or any combination of subsets of attributes may be selected for display in a user interface at any location within a user interface.

Figure 20:
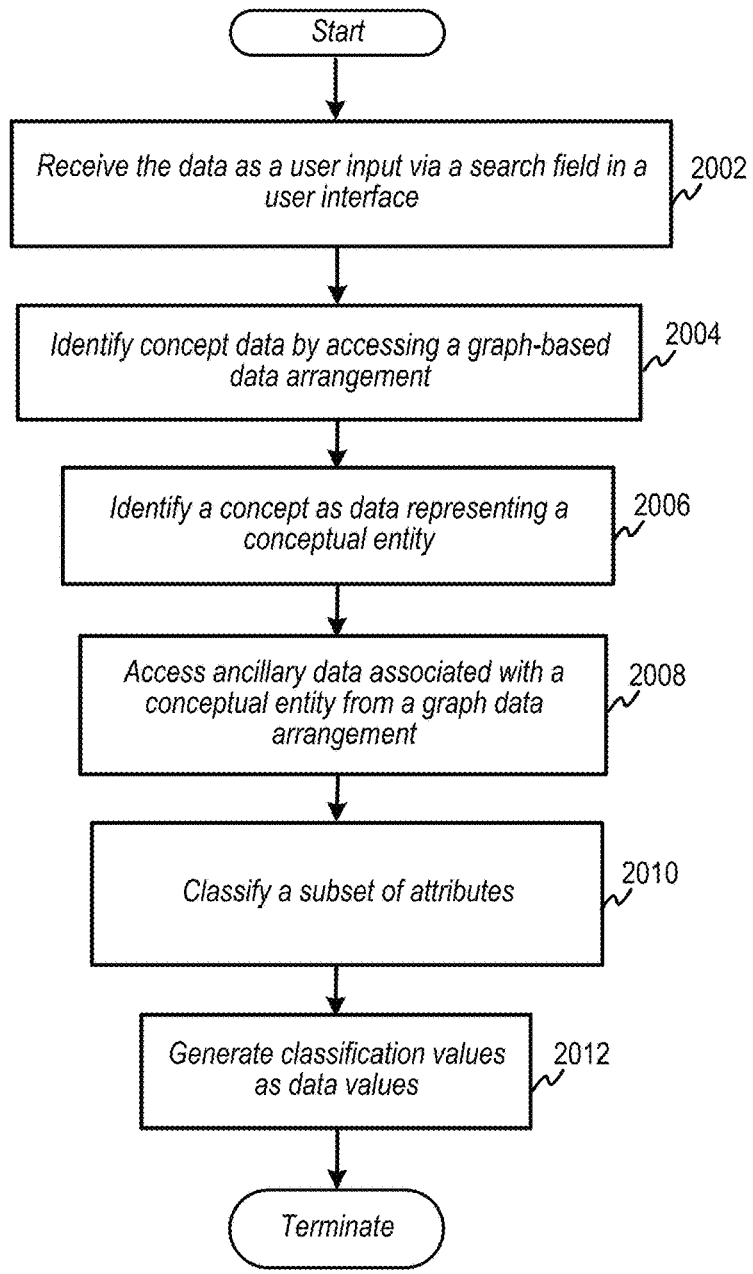
FIG. 20 is a flow diagram depicting an example of implementing computerized tools to generate a concept interface portion, according to at least one example.

FIG. 20 is a flow diagram depicting an example of implementing computerized tools to generate a concept interface portion, according to at least one example. In some implementations, a computerized tool may include hardware and/or computer-implemented methods configured to accept user inputs and to generate user interface outputs via user interface applications, concept state classifiers, data state classifiers, and any other logic configured to access and modify data representing data catalog data, knowledge graph data, or other graph-based data, or any combination thereof. In some examples, a computerized tool may be configured to interact with hardware and/or computer-implemented methods to generate an adapted display of a concept interface portion.

At 2002, data may be received as a user input via a search field in a user interface. In other implementations, a user input may be received via a cursor (e.g., by hovering over a portion of a user interface), via a touched portion of a user interface, or any other mechanism. The data may be a catalyst to explore, access, and/or modify a graph-based data catalog. In some examples, receive data may represent a conceptual entity associated with, or linked to, one or more datasets associated with a graph data arrangement including a data catalog.

At 2004, flow 2000 may be configured to identify concept data by, for example, accessing a graph-based data arrangement that may include data catalog data, knowledge graph data, or any other dataset. A concept entity input into computing device 1809 may be correlated with data in various data sources to determine similar or equivalent metadata entities in, for example, a data catalog.

At 2006, a concept may be identified, whereby a concept may include data representing conceptual entity (e.g., a data catalog entity, such as metadata referring to a glossary term, a resource, etc.). In some examples, a conceptual entity may identified using a natural language processing ("NLP") algorithm, such as a "word2vec" algorithm, or any other natural language process At 2008, ancillary data associated with a conceptual entity may be accessed in a graph data arrangement. Ancillary data, or descriptor data (e.g., metadata), may describe other attributes or data elements describing attributes as a unit of data, such as, for example, a label or annotation (e.g., header name) for a column, an index or column number, a data type associated with the data in a column, etc. Ancillary data may also be associated or correlated with a conceptual entity (e.g., as a search term matched against a data catalog).

At 2010, a subset of attributes may be classified to identify a subset of attributes including, but not limited to, a subset descriptive data, a subset of relevant users and user accounts, a subset of relevant resources, a subset of relevant recommended actions that can be predicted, and any other subset of relevant data. Further, each subset of attributes may be analyzed to determine (e.g., correlate) degrees of relevancy of each attribute (e.g., metadata) in a subset to a conceptual entity. At 2012, classification values can be generated as data values, which may be correlated with an entity in graph data arrangement, such as a data catalog.

Figure 21:
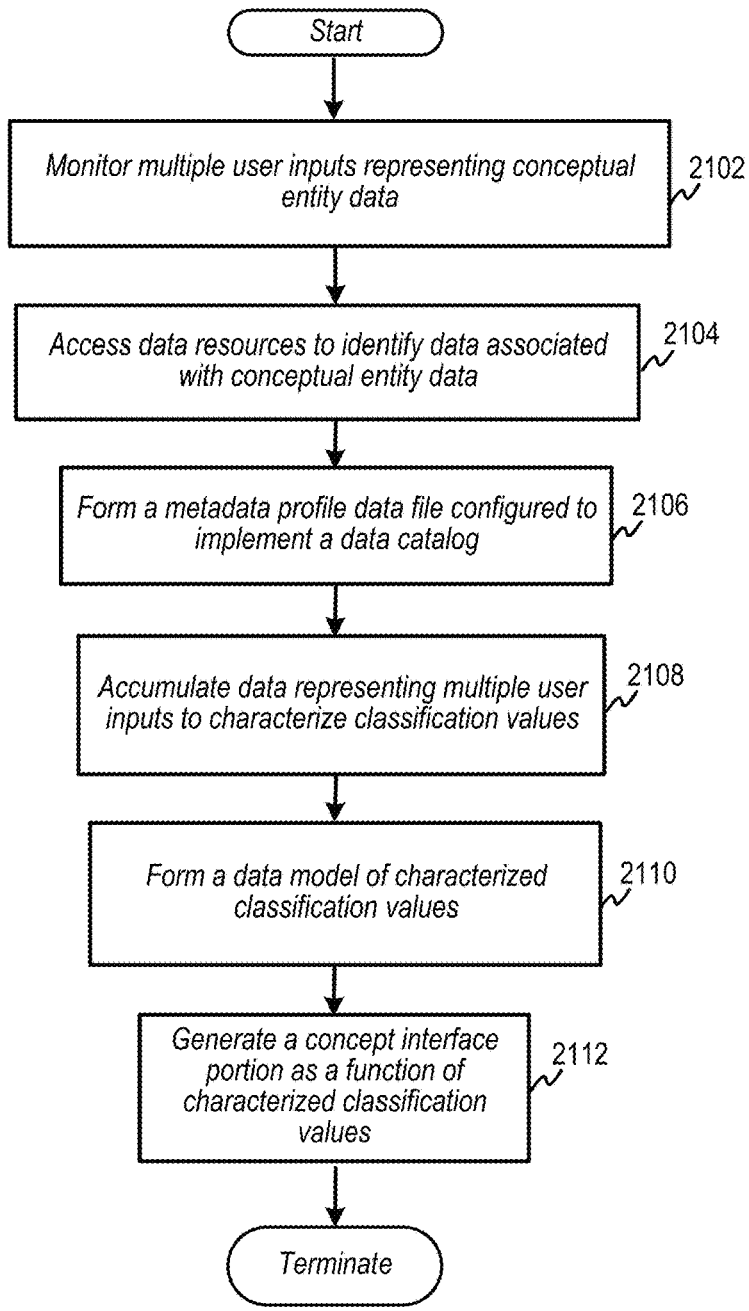
FIG. 21 is a flow diagram depicting an example of implementing computerized tools to implement and train a data model based on data interactions associated with a graph data arrangement, such as a data catalog, according to at least one example.

FIG. 21 is a flow diagram depicting an example of implementing computerized tools to implement and train a data model based on data interactions associated with a graph data arrangement, such as a data catalog, according to at least one example. In some implementations, a computerized tool may include hardware and/or computer-implemented methods configured to accept user inputs and to generate user interface outputs via user interface applications. Further, hardware and/or computer-implemented methods may be configured to build, generate, and train a data model used to operate concept state classifiers, data state classifiers, and any other logic configured to access and modify data representing data catalog data, knowledge graph data, or other graph-based data, or any combination thereof. In some examples, a computerized tool may be configured to interact with hardware and/or computer-implemented methods to generate an adapted display of a concept interface portion based on a trained data model.

At 2102, multiple user inputs representing conceptual entity data associated with any number of entities or data units of a graph data arrangement may be monitored. For example, training logic may be implemented to identify and archive interactions of a user and a computing device with various data sources to "learn," over time, relevant descriptive data, relevant user accounts (e.g., other users, such as data stewards, etc.), relevant resources, relevant actions in which a user predominantly engages or performs, as well as other data. The multiple user inputs may be referred to "input data" or "training data" to establish a data model to predict relevant subsets of attributes.

At 2104, data resources associated with conceptual entity data may be accessed to identify data associated with conceptual entity data. In some examples, data associated with conceptual entity data may include ancillary data (e.g., metadata), and any other entity data associated with a data catalog. Such data may be stored as archived data with which to train logic configured to implement a classifier.

At 2106, a metadata profile data file configured to implement a data catalog may be formed, generated or created either automatically, semi-automatically, or manually via data fields in which to input metadata linked to a data type or description (e.g., such as data, such as labeled or identified as CUSTOMER ID, which may link to PIT data as metadata).

At 2108, data representing multiple user inputs may be accumulated, aggregated, or summarized to facilitate classification of subsets of attributes to characterize data in associated with classification values. In some examples, user inputs may be clustered to form (e.g., in an unsupervised manner) groups of classified data.

At 2110, a data model of characterized classification values may be formed to, for example, determine relevant subsets of attributes with which to generate classification values. Further, classification values may be correlated, for example, in accordance to degrees of relevancy. In some examples, a degree of relevancy may correspond to a frequency with which a user accesses or interacts with a subset of attributes (e.g., a subset of resources, users, etc.).

At 2112, a concept interface portion may be generated as a function of characterized classification values for display in a user interface. A concept interface portion, as an electronic "concept card," may include a descriptive interface portion, a relevant user account interface portion, a relevant resource interface portion, and a predicted action interface portion. In one example, a size (e.g., in terms of pixels) of a concept interface portion may be determined based on a size of a user interface. In another example, any of descriptive interface portion, a relevant user account interface portion, a relevant resource interface portion, and a predicted action interface portion may be included in a concept interface portion based on, for example, degrees of relevancy of metadata associated with each interface portion. In yet another example, an amount of attributes (e.g., metadata) in a subset of attributes may be displayed in each portion based on degrees of relevancy.

Figures 22C, 23:
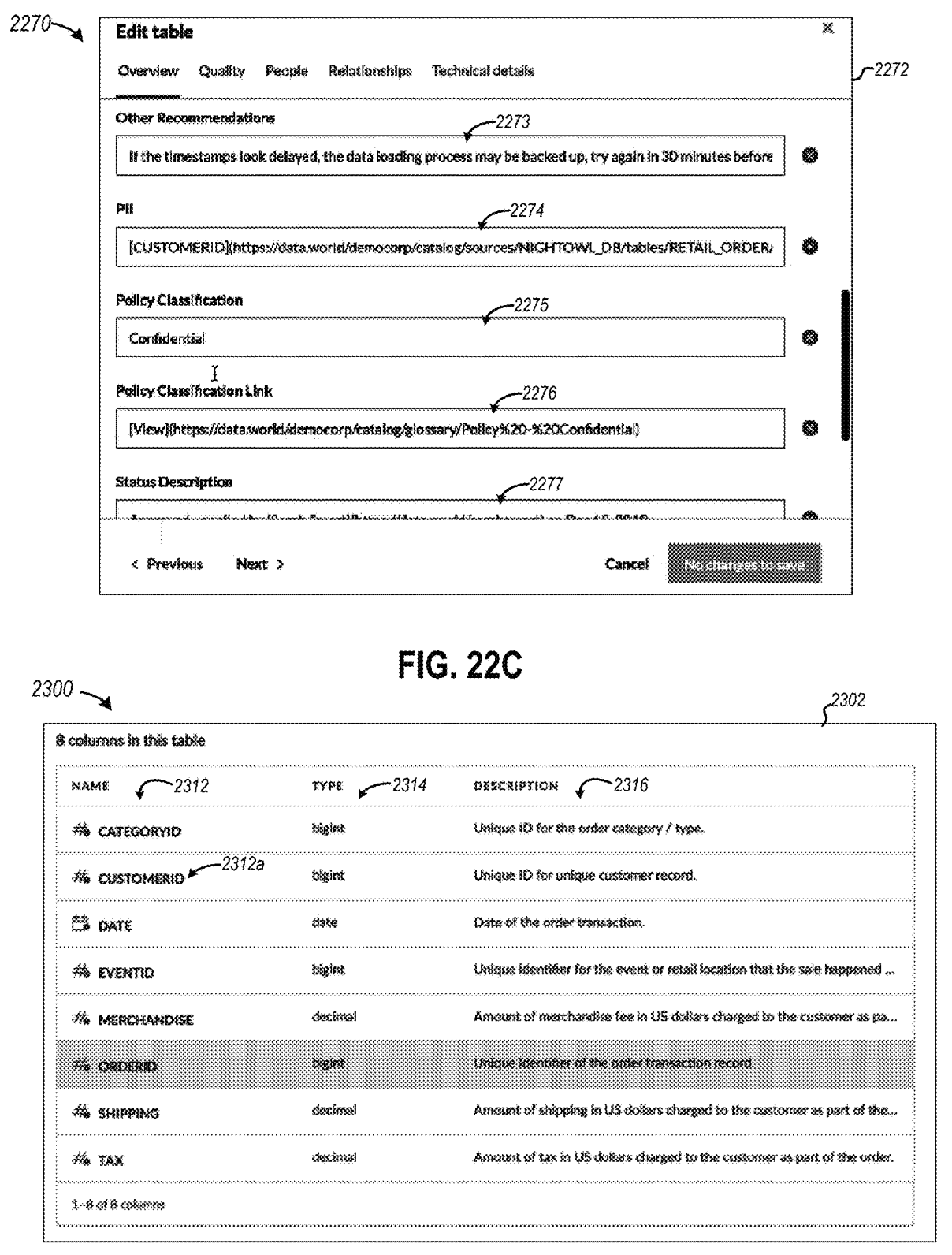

FIGS. 22A to 22C depict data fields with which to access and modify attributes of a resource, according to some examples. In some examples, data fields in FIGS. 22A to 22C may interact with a portion of a graph data arrangement associated with a resource of a data catalog as a conceptual entity. In this example, a resource is depicted in diagram 2200 of FIG. 22A a table of "Retail Order" data (expressible in tabular form) linked to a graph-based data, as displayed in user interface 2202. The table of "Retail Order" data may be referred to as a conceptual entity (e.g., metadata) titled or labeled as Retail_Order 2210.

In the example shown in diagram 2200, user interface 2202 may be generated using user interface logic in, for example, concept interface generation logic 1893. Further, user interface 2202 may be generated to include data catalog data as managed or controlled by data catalog controller logic 1870. Also, training logic 1872 may be configured to monitor and track data interactions with a portion of a data catalog that includes graph-based data associated with a resource, such as Retail_Order 2210. Elements depicted in diagram 2200 may include structures and/or functions as similarly-named or similarly-numbered elements depicted in other drawings. Further, elements 1870, 1872, and 1893, among others described herein, may be implemented in association with diagrams shown in FIGS. 22B to 32.

User interface 2202 may include data as descriptive data, such as "Overview" data 2212, as well as description data 2214. Data fields 2201 specify data associated with entities 2220 to 2227. Data associated with data fields 2201 or entities 2220 to 2227 may be referred to as metadata. Status description data 2220 may describe whether table data associated with "Retail Order" data is approved (or in another state, such as "pending," "deprecated," "rejected," or any other state of approval). Personal identifiable information ("PII") description data 2221 may describe one or more subsets of data that may be subject to privacy-related requirements or restrictions. For example, "CUSTOMERID" may refer to a calm of data that includes private, sensitive, and confidential information. External use data 2222 may include data specifying whether "Retail Order" data in table 2210 is available for external (e.g., public use), and NDA data 2223 may indicate whether "Retail Order" data in table 2210 may be share under terms of a non-disclosure agreement ("NDA").

Policy classification data 2224 may include data describing whether associated data is confidential, and, if so, a link 2225 to a policy describing terms of confidentiality. Also, policy classification data 2224 may describe data governance requirements. Usage recommendation data 2226 may include data specifying guidance on how to use data in table 2210, and other recommendations 2227 may include data describing other recommended guidance in applying data in table 2210.

Additional data regarding the table is depicted as data fields 2203. Catalog data 2231 may describe a name or identifier of an associate data catalog. Steward data 2243 may refer to a user who may facilitate the role of a data steward, and tech owner data 2245 may refer to a user who may a technologist, such as a data scientist, or any other role in which a user may be responsible for technological ownership of table 2210. Also, tag data 2249 may include data representing labels or any metadata identifier that may be generated automatically or manually. For example, a user input 2242 may be activated to access, modify, and "edit" data catalog data relevant to table 2210. Activation of user input 2242 may provide data fields such as presented in FIGS. 22B and 22C for data entry or modification.

FIG. 22B depicts a diagram 2250 including an example of a user interface 2252 with which to access, modify, and "edit" data catalog data. As shown, user interface 2252 may include a user input ("Overview") 2253 to access descriptive data, such as described in FIGS. 22B and 22C. Also shown, user input ("Quality") 2254 may be configured to access and modify a status description of table 2210 (e.g., whether approved or in another state). User input ("People") 2255 may be configured to access and modify data representing users and user accounts corresponding to table 2210 (e.g., data steward contact and user account information, data scientist contact and user account information, etc.). User input ("Relationships") 2256 may be configured to access and modify data representing datasets corresponding to table 2210 (e.g., tables, records, glossary terms, metadata profile data files, data catalog configuration files, etc.). User input ("Technical Details") 2257 may be configured to access and modify technical data representing datasets corresponding to table 2210 (e.g., a table identifier, a database source, a project ID, a schema, a location (e.g., based on a URI), a data synchronization schedule, and other technically-related data).

Further to diagram 2250 of FIG. 22B, data entry fields (i.e., user inputs) 2260, 2261, 2262, and 2263 may be configured to access, modify, and edit title data 2210 (of FIG. 22A), description data 2214 (of FIG. 22A), tag data 2249 (of FIG. 22A), and external use data 2222 (of FIG. 22A), respectively. FIG. 22C depicts a diagram 2270 including an example of a user interface 2272 with which to access, modify, and "edit" other data catalog data. As shown in user interface 2272, data entry fields (i.e., user inputs) 2273, 2274, 2275, 2276, and 2277 may be configured to access, modify, and edit other recommendation data 2227 (of FIG. 22A), "PIP" description data 2221 (of FIG. 22A), policy classification data 2224 (of FIG. 22A), policy classification link data 2225 (of FIG. 22A), and status description data 2220 (of FIG. 22A), respectively.

FIG. 23 is a diagram depicting attributes relating to a dataset described in FIGS. 22A to 22C, according to some examples. User input ("Relationships") 2256 of FIG. 22A may be configured to activate programmatic executable instructions to access, retrieve, and display subsets of data relevant to a resource. In the example shown, user interface 2302 of diagram 2300 may be configured to present user inputs 2312, 2314, and 2316. User inputs 2312 provide links to subsets of attributes (e.g., subsets of data or metadata), whereby each subset may relate to columnar data of data arranged in a tabular data format. As shown, user input ("CUSTOMERID") 2312a may be activated to access detailed data describing granular attributes and metadata that may constitute or correspond to identifier data of any number of customers.

FIG. 24 is a diagram depicting attributes relating to an example of data lineage of a dataset described in FIGS. 22A to 22C, according to some examples. User input ("Relationships") 2256 of FIG. 22A may be configured to activate programmatic executable instructions to access, retrieve, and display subsets of data lineage relevant to a resource, as an example. In the example shown, user interface 2402 of diagram 2400 may be configured to present user inputs 2412, 2420, 2440, and 2450 in a visual format to depict resources from which resource ("RETAIL_ORDER") 2440 is generated, as well as other resources, such as dashboard-generated analytic files depicted as Commission Model and Product data files. User interface elements associated with user inputs 2412, 2420, 2440, and 2450 may be activate to access or modify each resource (e.g.,VEND_CONTACT, VEND STATUS, etc.). As shown, user input ("CUST_STATUS") 2430 may be activated to access more granular data attributes and metadata associated with a "customer status."

FIG. 25 is a diagram depicting attributes relating to a dataset of terms referenced in resource tabular data of FIGS. 22A to 22C, according to some examples. Diagram 2500 shows a user interface 2502 depicting data catalog conceptual entities, such as business terms referenced in a resource table, whereby business terms may be defined and stored in graph-based data constituting at a portion of a data catalog. User input ("Relationships") 2256 of FIG. 22A may be configured to activate programmatic executable instructions to access, retrieve, and display subsets of data relevant to any number of glossary terms. In the example shown, user interface 2502 of diagram 2500 may be configured to present user inputs 2520 (e.g., associated with a glossary term link) and optional user inputs 2522 (e.g., to access a description of a glossary term). In some cases, data depicted as user inputs 2522 may be informational rather than user inputs. User inputs 2520 may provide links to subsets of attributes (e.g., subsets of data or metadata) each business term. As shown, user input ("Order") 2524 may be activated via cursor 2525 (or any other mechanism) to access granular attributes and metadata associated with a glossary term "order," as described in FIGS. 26A to 28. Again, note that interactions with any user interface elements may be monitored to train a data model to facilitate and improve accuracy of data classifiers described herein.

FIGS. 26A to 27 depict data fields with which to access and modify attributes of a data catalog entity, such as a glossary term, according to some examples. In some examples, data fields in FIGS. 26A to 27 may interact with a portion of a graph data arrangement associated with a glossary term of a data catalog as a conceptual entity. In the example shown in FIG. 26A, a glossary term and its attributes and metadata are depicted in diagram 2640. A glossary term of "Order" data (expressible in tabular form) may be linked to a graph-based data, as displayed in user interface 2642. The term "Order" data may be referred to as a conceptual entity (e.g., metadata) titled or labeled as Order 2644.

Also shown, user interface 2642 includes exemplary user interface elements 2644, 2645, 2646, 2647, and 2648, any of which may be configured as a user input (e.g., to access and modify associated data of a data catalog) or may be configured as a user output, such as displaying attributes or metadata associated with underlying graph-based data. User interface element 2644 may be configured to access or describe descriptive data (e.g., as a summary) of order-related data. User interface elements 2645, 2646, and 2647 may be configured to access, modify, or describe descriptive data relating to other relevant order-related data, such as "Delivered Order" data, "Paid Order" data, and "Fulfilled Order," respectively. User interface element 2648 may be configured to access, modify, generate, or describe data, as well as programmatic executable instructions, configured to perform a calculation or a computer-implemented method to derive data with which to implement "Order" data 2644.

Figure 26B:
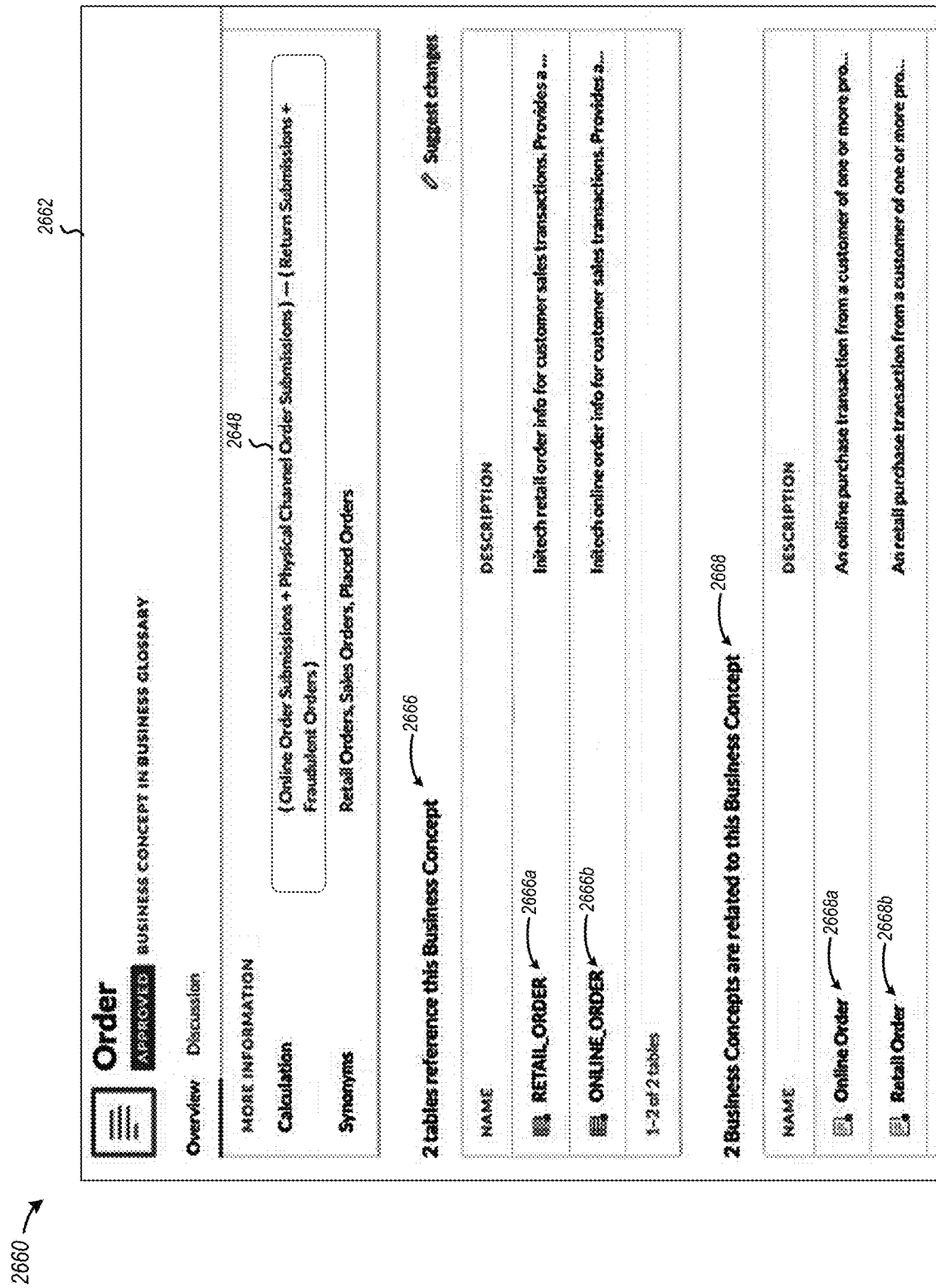

FIG. 26B is other data fields associated with a glossary term and its attributes and metadata, as described in FIG. 26A. As shown in diagram 2660 of FIG. 26B includes a user interface 2662, which, in turn, may include exemplary user interface elements 2648, 2666, 2666*a*, 2666*b*, 2668, 2668*a*, and 2668*b*, any of which may be configured as a user input (e.g., to access and modify associated data of a data catalog) or may be configured as a user output, such as displaying attributes or metadata associated with underlying graph-based data.

User interface element 2648 of FIGS. 26A and 26B may be configured to access, modify, generate, or describe data, as well as programmatic executable instructions, configured to perform a calculation or a computer-implemented method to derive data with which to implement "Order" data. For example, a calculation may derive a data value of "Order" based on the following: [[Online Order Submission data value]+[Physical Channel Order Submission data value]]-[[Return Submission data value]+[Fraudulent Orders data value]]. User interface element 2666 may be configured to access or describe tables or datasets that reference the glossary term "Order" data, such as user interface element 2666*a* (referencing a "RETAIL_ORDER" resource) and user interface element 2666*b* (referencing an "ONLINE_ORDER" resource). User interface element 2668 may be configured to access or describe other glossary terms that reference the glossary term "Order" data, such as user interface element 2668*a* (referencing a "Online Order" glossary term) and user interface element 2668*b* (referencing a "Retail Order" glossary term).

FIG. 27 is a diagram 2700 including an example of a user interface 2702 with which to access, modify, and "edit" a glossary term (e.g., a business term) as data catalog data. As shown, user interface 2702 may include user inputs ("Overview") 2753, user input ("Quality") 2754, user input ("People") 2755, user input ("Relationships") 2756, and user input ("Technical Details") 2757, any of which may function as described in FIG. 22B. Further to diagram 2700 of FIG. 27, user interface elements may be configured as user inputs. For example, data fields representing tags 2704 may include data representing any number of user inputs with which to associate a business term to any number of conceptual entities. Data field 2748 may include a data representing a calculation, such as a link (e.g., a URI, URL, etc.) to data sources providing programmatic executable instructions for performing a calculation.

FIG. 28 is a diagram depicting an example of a user interface with which to access, modify, and implement a data catalog configuration file as data catalog data, according to some examples. Diagram 2800 depicts a user interface 2802 that may be configured to include user interface elements 2806, 2806*a*, 2806*b*, 2806*c*, 2806*d*, 2810, 2812, and 2825 (e.g., as user inputs) to interact electronically with a data catalog configuration file that includes data and executable instructions to configure and manage metadata (e.g., to facilitate metadata management). Alternatively, any user interface element 2806, 2806*a*, 2806*b*, 2806*c*, 2806*d*, 2810, 2812, and 2825 may be implemented as a user output to display attributes or metadata associated with underlying graph-based data. In some examples, a data catalog configuration file may include data and/or executable instructions, including statements (e.g., RDF statements), representing one or more types or implementations of dataset attributes (e.g., metadata). A data catalog configuration file may reference or link to one or more metadata profile files, such as a document titled "metadata-profile.ttl" (e.g., as a Turtle file or document), as an example. A data catalog configuration file may also be implemented to "configure" metadata in a data catalog to access or modify data that may configure implementation of metadata and various layers of metadata (e.g., to facilitate operation of data or display of data in a user interface). In some examples, a data catalog configuration file may be implemented as a portion of a graph data arrangement and its components may be referred to as attributes (e.g., as metadata).

User interface element 2806 is shown to include other user interface elements directed to accessing or describing portions of a data catalog configuration file. For example, user interface element 2806*a* may be configured as a user input to access a data catalog file (e.g., catalog-records.ttl file). User interface element 2806*c* may be configured to access, modify, or display data identifying metadata associated with triple-based data (e.g., graph-based data, RDF data, etc.). User interface element 2806*b* may be configured to access, modify, or display data identifying data representing metadata as entities in data catalog, such as conceptual entities. User interface element 2806*d* may be configured to access, modify, or display data identifying data representing namespaces associated with data catalog attributes and metadata. For example, user interface element 2806*d* may be configured to provide access to predefined namespace prefixes that may refer to URIs to, for example, bind or map data representing a prefix to a URI, or any other data representing a linked data source.

User interface element 2810 may be configured to access, modify, or display data generated by an application or programmatic executable instructions, whereby the data may be metadata constituting a metadata profile (e.g., a metadata profile data file). User interface element 2812 may be configured to access, modify, or display data generated by an application or programmatic executable instructions to determine (e.g., by executing a query) data lineage or provenance, according to some examples. User interface element 2899 may be configured to, responsive to user input 2825, access, modify, or display data representing data files representing data and executable instructions to configure and manage metadata. Examples of such data files are depicted in FIGS. 29A to 29B.

FIG. 29A is a diagram depicting an example of a user interface with which to access, modify, and implement a data file to facilitate metadata in a data catalog data, according to some examples. Diagram 2900 depicts a user interface 2902 that may be configured to include user interface elements 2907 and 2910 to interact electronically with a metadata configuration file, such as "metadata-profile.ttl," that may include data and executable instructions to configure and manage metadata. User interface element 2907 may be configured to access, modify, or display data associated with various configuration data files, including data (e.g., attributes, metadata, etc.) representing datasets, business glossary terms, one or more relevant catalogs, lineage data, and the like. User interface element 2910 may be activated via user input 2925 (e.g., to select a file) to access, modify, or display data associated with attributes and metadata associated with a data catalog. As shown, user interface element 2910 depicts a portion of a metadata profile specifying data and/or executable instructions, including statements (e.g., RDF statements), to implement various namespaces as a function of "prefix." Note that at least one prefix may refer to "dcat," which may include data representing an RDF glossary or vocabulary as a "data catalog library" designed to facilitate interoperability between data catalogs implemented semantically (e.g., accessible via the Internet). An example of data representing DCAT is published and maintained by W3C at www(dot)w3(dot)org.

FIG. 29B is a diagram depicting another example of a user interface with which to access, modify, and implement a data file to facilitate metadata in a data catalog data, according to some examples. Diagram 2950 depicts a user interface 2952 that may be configured to include user interface elements 2920, which may include user interface elements 2930, 2960, and 2962.

User interface element 2920 may be configured to access, modify, or display customized data or adapted metadata 2930 associated with PII data, as set forth in data, executable instructions, statements (e.g., RDF statements and graph data), or any combination thereof, to facilitate implementation in a data catalog. Further to diagram 2950, user interface element(s) 2960 may specify presentation, display, and implementation data in, for example, RDF, RDFS, or the like. User interface element(s) 2962 may specify data, executable instructions, statements (e.g., proprietary statements) to access graph data and associated metadata, such as "dwec" instructional statements (or "dwcc" data or instructions) provided by data.world™ of Austin, TX, USA.

Figure 32:
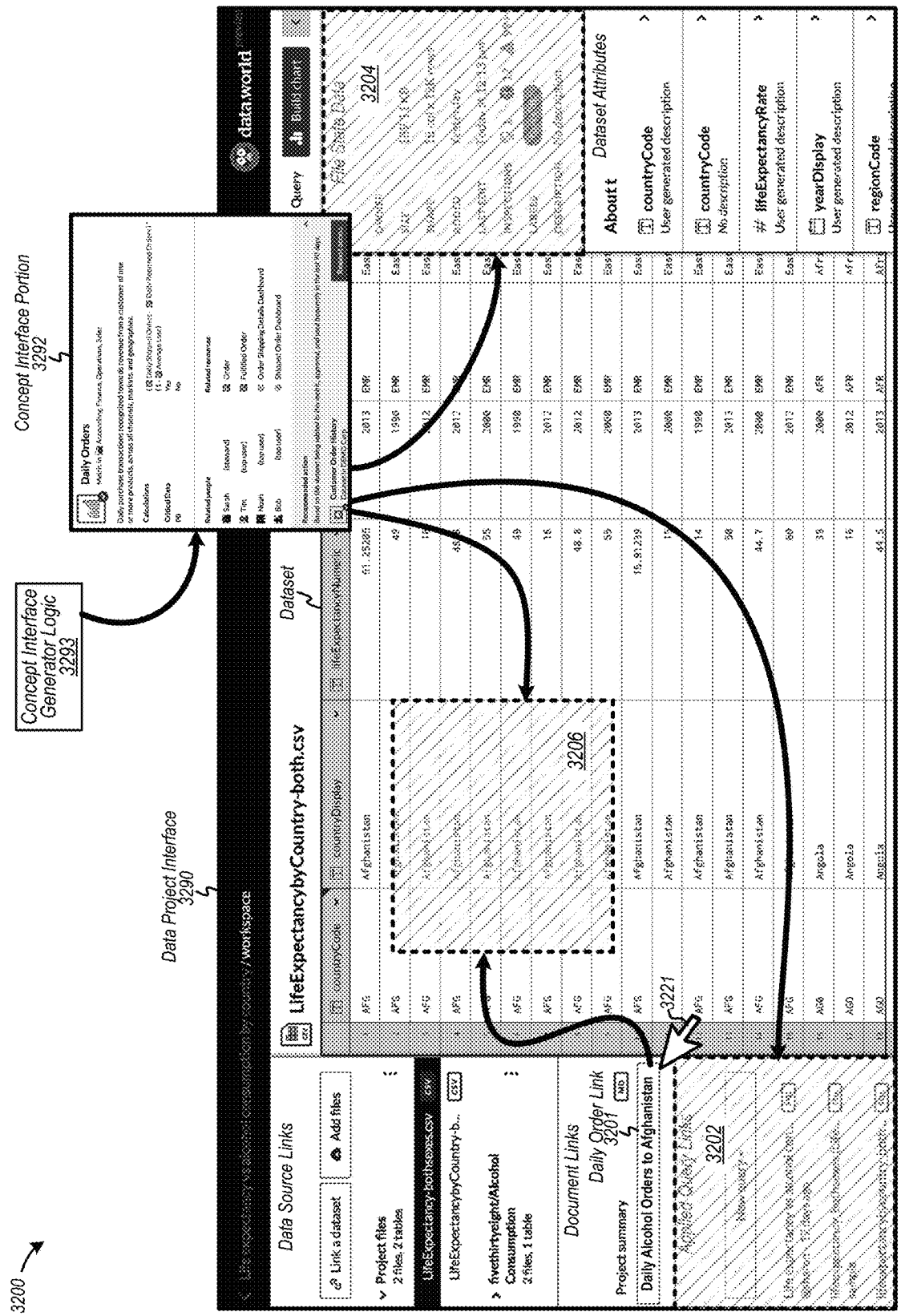

FIGS. 30 to 32 are diagrams depicting functionalities of computerized tools to implement conceptual interface portions, according to various examples. FIG. 30 is a diagram 3000 depicting an example of a user interface 3002 configured to receive a user input 3001, which may include data representing a conceptual entity. In the example shown, a text string "Orders" is entered into a data field constituting user input 3001. Responsive to entry of data entered as user input 3001, any number of results may be returned, displayed or surfaced. In the example shown, data representing "daily orders" 3010, "fraudulent orders" 3012, "physical channel order submission" 3014, and "SQL Query" 3016 data may be depicted in user interface 3002. Further, a user input 3021 may select "daily orders" 3010 to access, modify, or display data representing daily orders, such as depicted in a conceptual interface portion 3030. In some examples, conceptual interface portion 3030 may be referred to as an electronic "concept card."

FIG. 31 is a diagram depicting an example of a conceptual interface portion based on classification values derived from, for example, a conceptual entity related to a data catalog, according to some embodiments. Diagram 3100 includes conceptual interface portion (e.g., electronic "concept card") 3102, which may include one or more of a descriptive interface portion 3104, a relevant user account interface portion 3120, a relevant resource interface portion 3130, and a predicted action interface portion 3140. User interface elements depicted in diagram 3100 may include structures and/or functions as similarly-named or similarly-numbered elements depicted in other drawings, or may be derived from any structure or function as described herein.

Descriptive interface portion 3104 may include one or more user interface elements that may be configured to access, modify, or display data associated with descriptive attributes of one or more datasets (e.g., metadata describing at least one dataset). For example, user interface element 3105 may provide a user output describing characteristics of conceptual entity "Daily Orders." User interface element 3106 may be configured to access, modify, or display data associated with calculations associated with conceptual entity "Daily Orders." User interface element 3107 may be configured to access, modify, or display data associated with data (e.g., "critical data" such as private, sensitive, or confidential information) associated with conceptual entity "Daily Orders."User interface element 3108 may be configured to access, modify, or display data associated with personal identifiable information ("PIP") associated with conceptual entity "Daily Orders." Other relevant descriptive data may also be presented as part of descriptive interface portion 3104.

Relevant user account interface portion 3120 may include one or more user interface elements that may be configured to access, modify, or display data associated with relevant users and user accounts associated with one or more datasets. For example, user interface element 3122 may provide a user input or output identifying a user as a "data steward," which may be relevant to a conceptual entity associated with "Daily Orders." User interface element 3124 may be configured to access, modify, or display data associated with user-related attributes, such as "top users" (e.g., frequent or influential users) associated with "Daily Orders." Other relevant users and user accounts may also be presented as part of relevant user account interface portion 3120.

Relevant resource interface portion 3130 may include one or more user interface elements that may be configured to access, modify, or display data associated with relevant resources (e.g., tables, glossary terms, technical data, and other graph-based data) associated with one or more datasets. For example, user interface element 3132 may be configured to access, modify, or display data to identify one or more tables, such as "Order" and "Fulfilled Order," either of which may be relevant to a conceptual entity associated with "Daily Orders." User interface element 3134 may be configured to access, modify, or display data to identify one or more dashboard-generated analytic files (e.g., data files providing graphical and visual representations of data), such as "Order Shipping Details Dashboard" and "Shipped Order Dashboard," any of which may be relevant to a conceptual entity associated with "Daily Orders." Other relevant resources may also be presented as part of relevant resource interface portion 3130.

Predicted action interface portion 3140 may include one or more user interface elements that may be configured to access, modify, or display data associated with relevant actions that may be implemented by performing recommended programmatic executable instructions, whereby the actions may be relevant to supplement information regarding a conceptual entity (e.g., one or more search terms). For example, user interface element 3142 may be configured to access, modify, or display data to identify one or more actions, such as generating a subset of executable instructions to invoke a request to authorize access to link to a dataset identified as "Customer Order History." Other relevant actions may also be presented as part of predicted action interface portion 3140.

According to some examples, display of which types of interface portions 3104, 3120, 3130, and 3140 and amounts of user interface elements 3106 to 3108, 3122 to 3124, 3132 to 3134, and 3142 within corresponding portions may be determined by relevancy (e.g., a degree of relevancy). Relevancy of user interface portions with a conceptual entity may be based on classified data values and other bases, as described herein. In some cases, interface portions 3104, 3120, 3130, and 3140 may be based on criteria data, which may include data generated or identified to guide or coordinate display of metadata and associated attributes in a user interface or portions thereof. Criteria may also describe a type or function of an API to select a subset of programmatic executable instructions to access and display data in conceptual interface portion 3102.

In some examples, an electronic concept card may be configured to assist users to conveniently and expeditiously discover related descriptive data, people, resources, and other supporting information based on data from a knowledge graph, responsive to, for example, a given search topic (e.g., a conceptual entity entered as a search term). Also, suggested actions relevant to a conceptual entity or topic may be predicted as a recommended action to be performed. An electronic concept card may be considered as a "jumping off" point to browse and discover supplemental information regarding data for an organization (e.g., an enterprise).

FIG. 32 is a diagram depicting an example of conceptual interface generator logic configured to generate and implement a conceptual interface portion based on a conceptual entity related to a data catalog, according to some embodiments. Diagram 3200 includes a user interface, such as a data project interface 3290, configured to provide access to modify or display data associated with a dataset, which, in this example, depicts life expectancy by country including daily orders of alcohol. Further, diagram 3200 is shown to include conceptual interface generator logic 3293 may be configure to generate a conceptual interface portion 3292 in accordance with various classifications, classification values, correlations, degrees of relevancy, and the like, as described herein.

In the example shown, consider that a user input 3221 may be configured to activate generation of conceptual interface portion 3292 responsive to execution of programmatic instructions indicting selection of a daily order link 3201, which may be associated with daily alcohol orders to Afghanistan. In some examples, conceptual interface generator logic 3293 may be configure to generate conceptual interface portion 3292 sized to accommodate user interface portion dimensions of user interface 3290 (e.g., as defined by a number pixels, such in X and Y dimensions). In other examples, conceptual interface portion 3292 may be generated in accordance with criteria data that may guide display of conceptual interface portion 3292, such as at region 3202, region 3206, region 3204, or any other region. Regions 3202 to 3206 may be derived by learning a user's preferred optimal position in a display (e.g., based on user preferences, whether explicit or learned implicitly via an automatically-generated data model).

Although the foregoing examples have been described in some detail for purposes of clarity of understanding, the above-described inventive techniques are not limited to the details provided. There are many alternative ways of implementing the above-described invention techniques. The disclosed examples are illustrative and not restrictive.

The invention claimed is:

1. A computer-implemented method comprising:
receiving data representing a conceptual entity linked to a dataset stored in association with a graph data arrangement that derives the dataset from multiple data sources communicatively coupled to a computing system that includes one or more processors and memory;
identifying data representing a subset of attributes associated with data values linked to the data representing the conceptual entity;
identifying criteria data of a targeted application;
selecting subsets of programmatic executable instructions to consume data associated with the subset of attributes based on the criteria data of the targeted application;
extracting data from the graph data arrangement as a function of the subset of attributes to form extracted data; and
causing implementation of the subsets of the programmatic executable instructions to generate a concept interface portion of a concept card to be displayed, a size of the concept interface portion being determined based on a degree of relevancy of metadata associated with each concept interface portion of the concept card.

2. The computer-implemented method of claim 1 wherein causing implementation of the subsets of the programmatic executable instructions comprises:
activating a subset of application programming interfaces ("APIs") configured to access the data from the graph data arrangement.

3. The computer-implemented method of claim 2 further comprising:
receiving the extracted data into an application configured to access a data catalog; and
receiving user input data to modify the graph data arrangement based on the extracted data.

4. The computer-implemented method of claim 1 wherein identifying the data representing the subset of attributes comprises:
identifying metadata associated with at least one metadata profile data file.

5. The computer-implemented method of claim 1 wherein identifying the data representing the subset of attributes with data values comprises:
identifying the data values as classified data values.

6. The computer-implemented method of claim 1 further comprising:
linking data representing the subset of attributes associated with the data values linked to the data representing the conceptual entity as a function of a degree of correlation.

7. The computer-implemented method of claim 1 further comprising:
accessing data representing user interface dimensions; and
modifying implementation of the subsets of the programmatic executable instructions based on the user interface dimensions.

8. The computer-implemented method of claim 1 further comprising:
displaying data associated with the data representing the subset of attributes in a concept interface portion.

9. The computer-implemented method of claim 1 further comprising:
displaying data associated with the data representing the subset of attributes in a concept interface portion that includes a descriptive interface portion, a relevant user account interface portion, a relevant resource interface portion, and a predicted action interface portion.

10. The computer-implemented method of claim 1 wherein the targeted application is a user interface generation application.

11. The computer-implemented method of claim 1 wherein causing implementation of the subsets of the programmatic executable instructions comprises:
executing instructions to cause display of a concept interface portion in a user interface.

12. The computer-implemented method of claim 1 wherein receiving the data representing the conceptual entity comprises:
receiving the data as a user input via a search field in a user interface.

13. The computer-implemented method of claim 1 wherein receiving the data representing the conceptual entity comprises:

accessing data representing at least a portion of the graph data arrangement;

implementing a natural language processing ("NLP") algorithm to identify a concept; and classifying the concept as the data representing the conceptual entity to form a classified concept.

14. The computer-implemented method of claim 1 further comprising:

accessing ancillary data associated with the conceptual entity from the graph data arrangement;

classifying the subset of attributes; and generating classification values as the data values.

15. The computer-implemented method of claim 14 further comprising:

classifying the subset of attributes as one or more of descriptive data, relevant user account data, relevant resource data, and predicted action data.

16. The computer-implemented method of claim 14 further comprising:

clustering data to classify the subset of attributes.

17. The computer-implemented method of claim 1 further comprising:

monitoring multiple user inputs representing conceptual entity data;

training logic configured to implement a data classifier; and forming a data model with which to classify the subsets of attributes to select the subsets of programmatic executable instructions.

18. A system comprising:

a data store configured to receive streams of data via a network into an application computing platform; and a processor configured to execute instructions to implement an application configured to:

receive data representing a conceptual entity linked to a dataset stored in association with a graph data arrangement that derives the dataset from multiple data sources communicatively coupled to a computing system that includes one or more processors and memory;

identify data representing a subset of attributes associated with data values linked to the data representing the conceptual entity;

determine criteria data of a targeted application;

select subsets of programmatic executable instructions to consume data associated with the subset of attributes based on the criteria data of the targeted application;

extract data from the graph data arrangement as a function of the subset of attributes to form extracted data; and cause implementation of the subsets of the programmatic executable instructions to generate a concept interface portion of a concept card to be displayed, a size of the concept interface portion being determined based on a degree of relevancy of metadata associated with each concept interface portion of the concept card.

19. The system of claim 18 wherein the processor is further configured to:

activate a subset of application programming interfaces ("APIs") configured to access the data from the graph data arrangement.

20. The system of claim 18 wherein the processor is further configured to:

receive the extracted data into an application configured to access a data catalog; and receive user input data to modify the graph data arrangement based on the extracted data.

* * * * *